US008879857B2

(12) United States Patent
Raveendran et al.

(10) Patent No.: US 8,879,857 B2
(45) Date of Patent: Nov. 4, 2014

(54) REDUNDANT DATA ENCODING METHODS AND DEVICE

(75) Inventors: Vijayalakshmi R. Raveendran, San Diego, CA (US); Gordon Kent Walker, Poway, CA (US); Tao Tian, San Diego, CA (US); Phanikumar Bhamidipati, San Diego, CA (US); Fang Shi, San Diego, CA (US); Peisong Chen, San Diego, CA (US); Sitaraman Ganapathy Subramania, San Diego, CA (US); Seyfullah Halit Oguz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 2241 days.

(21) Appl. No.: 11/528,307

(22) Filed: Sep. 26, 2006

(65) Prior Publication Data

US 2007/0081588 A1    Apr. 12, 2007

Related U.S. Application Data

(60) Provisional application No. 60/721,416, filed on Sep. 27, 2005, provisional application No. 60/727,643, (Continued)

(51) Int. Cl.
*G06K 9/36* (2006.01)
*H04B 1/66* (2006.01)
(Continued)

(52) U.S. Cl.
CPC ... *H04N 19/00472* (2013.01); *H04N 19/00424* (2013.01); *H04N 7/0115* (2013.01); *H04N* (Continued)

(58) Field of Classification Search
CPC .......... H04N 19/00781; H04N 19/00472; H04N 19/00266; H04N 19/00278; H04N 19/0003; H04N 19/00218; H04N 19/0006; H04N 19/00721; H04L 65/1009; G06T 9/00
USPC .......... 382/232–253; 348/14.09, 159, 348/384.1–440.1; 375/240–241
See application file for complete search history.

(56) References Cited

U.S. PATENT DOCUMENTS 5,289,276 A   2/1994 Siracusa et al.
5,404,174 A   4/1995 Sugahara
(Continued)

FOREIGN PATENT DOCUMENTS

CL    01332005    10/2005
CL    10432005    12/2005
(Continued)

OTHER PUBLICATIONS

D.L. Donoho et al.: "Ideal spatial adaptation by wavelet shrinkage," Biometrika, vol. 8, pp. 1-30, 1994.
(Continued)

*Primary Examiner* — Manav Seth
(74) *Attorney, Agent, or Firm* — Brent A. Boyd

(57) ABSTRACT

Apparatus and methods of using content information for encoding multimedia data are described. A method of processing multimedia data includes A method of processing multimedia data, including obtaining content information of multimedia data, and encoding the multimedia data to form an encoded bitstream, said encoding comprising inserting at least one redundant block of intra-coded data into the encoded bitstream based on the content information. In some aspects, the encoding comprises encoding the multimedia data into a base layer and an enhancement layer, and wherein the intra-coded data is encoded using the quantization parameter for the base layer. In other aspects, the intra-coded data is encoded using the quantization parameter for the enhancement layer.

27 Claims, 41 Drawing Sheets

Related U.S. Application Data filed on Oct. 17, 2005, provisional application No. 60/727,644, filed on Oct. 17, 2005, provisional application No. 60/727,640, filed on Oct. 17, 2005, provisional application No. 60/730,145, filed on Oct. 24, 2005, provisional application No. 60/789,048, filed on Apr. 3, 2006, provisional application No. 60/789,377, filed on Apr. 4, 2006.

(51) Int. Cl.

| | | |
|---|---|---|
| *H04N 19/30* | (2014.01) | |
| *H04N 21/2389* | (2011.01) | |
| *H04N 19/137* | (2014.01) | |
| *H04N 19/36* | (2014.01) | |
| *H04N 5/14* | (2006.01) | |
| *H04N 19/40* | (2014.01) | |
| *H04N 19/577* | (2014.01) | |
| *H04N 19/132* | (2014.01) | |
| *H04N 19/61* | (2014.01) | |
| *H04N 21/2343* | (2011.01) | |
| *H04N 19/86* | (2014.01) | |
| *H04N 19/18* | (2014.01) | |
| *H04N 19/89* | (2014.01) | |
| *H04N 19/87* | (2014.01) | |
| *H04N 19/149* | (2014.01) | |
| *H04N 19/159* | (2014.01) | |
| *H04N 19/172* | (2014.01) | |
| *H04N 19/187* | (2014.01) | |
| *H04N 19/142* | (2014.01) | |
| *H04N 19/115* | (2014.01) | |
| *H04N 19/107* | (2014.01) | |
| *H04N 21/235* | (2011.01) | |
| *H04N 19/147* | (2014.01) | |
| *H04N 19/194* | (2014.01) | |
| *H04N 5/21* | (2006.01) | |
| *H04N 19/154* | (2014.01) | |
| *H04N 19/65* | (2014.01) | |
| *H04N 19/114* | (2014.01) | |
| *H04N 19/14* | (2014.01) | |
| *H04N 7/01* | (2006.01) | |

(52) U.S. Cl.

CPC ............... 21/2389 (2013.01); *H04N 19/00145* (2013.01); *H04N 19/00448* (2013.01); *H04N 5/144* (2013.01); *H04N 19/00721* (2013.01); *H04N 19/00127* (2013.01); *H04N 19/00781* (2013.01); *H04N 21/234309* (2013.01); *H04N 19/00909* (2013.01); *H04N 19/00296* (2013.01); *H04N 19/00933* (2013.01); *H04N 19/00921* (2013.01); *H04N 19/00181* (2013.01); *H04N 19/00218* (2013.01); *H04N 19/00266* (2013.01); *H04N 19/00321* (2013.01); *H04N 19/00163* (2013.01); *H04N 19/0006* (2013.01); *H04N 19/0003* (2013.01); *H04N 21/2353* (2013.01); *H04N 5/147* (2013.01); *H04N 19/00175* (2013.01); *H04N 19/00363* (2013.01); *H04N 5/21* (2013.01); *H04N 19/002* (2013.01); *H04N 19/00854* (2013.01); *H04N 19/00054* (2013.01); *H04N 7/012* (2013.01); *H04N 19/00157* (2013.01)

USPC ................. 382/232; 348/384.1; 375/240

(56) References Cited

U.S. PATENT DOCUMENTS

| | | | |
|---|---|---|---|
| 5,508,752 A | | 4/1996 | Kim et al. |
| 5,565,920 A | | 10/1996 | Lee et al. |
| 5,598,428 A | | 1/1997 | Sato |
| 5,619,272 A | | 4/1997 | Salmon et al. |
| 5,642,294 A | | 6/1997 | Taniguchi et al. |
| 5,642,460 A | * | 6/1997 | Shimoda ...................... 386/124 |
| 5,654,805 A | | 8/1997 | Boon |
| 5,682,204 A | | 10/1997 | Uz et al. |
| 5,684,917 A | * | 11/1997 | Yanagihara et al. ............. 386/80 |
| 5,686,962 A | | 11/1997 | Chung et al. |
| 5,699,119 A | | 12/1997 | Chung et al. |
| 5,745,645 A | * | 4/1998 | Nakamura et al. ............ 386/131 |
| 5,754,233 A | | 5/1998 | Takashima |
| 5,771,357 A | | 6/1998 | Kato et al. |
| 5,790,179 A | * | 8/1998 | Shibata et al. ............. 348/14.09 |
| 5,793,895 A | | 8/1998 | Chang et al. |
| 5,801,765 A | | 9/1998 | Gotoh et al. |
| 5,821,991 A | | 10/1998 | Kwok |
| 5,835,163 A | | 11/1998 | Liou et al. |
| 5,841,939 A | * | 11/1998 | Takahashi et al. ............. 386/68 |
| 5,864,369 A | | 1/1999 | Swan |
| 5,929,902 A | | 7/1999 | Kwok |
| 5,960,148 A | * | 9/1999 | Miyazawa ..................... 386/52 |
| 5,978,029 A | | 11/1999 | Boice et al. |
| 5,991,502 A | * | 11/1999 | Kawakami et al. ............ 386/109 |
| 6,012,091 A | * | 1/2000 | Boyce ........................... 709/219 |
| 6,014,493 A | * | 1/2000 | Shimoda ........................ 386/68 |
| 6,064,796 A | * | 5/2000 | Nakamura et al. ............ 386/131 |
| 6,091,460 A | | 7/2000 | Hatano et al. |
| 6,115,499 A | | 9/2000 | Wang et al. |
| 6,157,674 A | | 12/2000 | Oda et al. |
| 6,175,593 B1 | | 1/2001 | Kim et al. |
| 6,229,925 B1 | | 5/2001 | Alexandre et al. |
| 6,317,518 B1 | | 11/2001 | Enari |
| 6,333,950 B1 | | 12/2001 | Karasawa |
| 6,363,114 B1 | | 3/2002 | Kato |
| 6,370,672 B1 | | 4/2002 | Rick et al. |
| 6,449,002 B1 | | 9/2002 | Markman et al. |
| 6,473,459 B1 | | 10/2002 | Sugano et al. |
| 6,490,320 B1 | | 12/2002 | Vetro et al. |
| 6,501,796 B1 | | 12/2002 | Dusseux et al. |
| 6,507,618 B1 | | 1/2003 | Wee et al. |
| 6,538,688 B1 | | 3/2003 | Giles |
| 6,539,220 B1 | | 3/2003 | Sakai et al. |
| 6,553,068 B1 | | 4/2003 | Wake et al. |
| 6,574,211 B2 | | 6/2003 | Padovani et al. |
| 6,580,829 B1 | | 6/2003 | Hurst, Jr. et al. |
| 6,600,836 B1 | | 7/2003 | Morley et al. |
| 6,718,121 B1 | | 4/2004 | Shikunami |
| 6,721,492 B1 | * | 4/2004 | Togashi ........................ 386/109 |
| 6,724,819 B1 | | 4/2004 | Takaki et al. |
| 6,744,474 B2 | | 6/2004 | Markman |
| 6,773,437 B2 | | 8/2004 | Ogilvie et al. |
| 6,784,942 B2 | | 8/2004 | Selby et al. |
| 6,791,602 B1 | * | 9/2004 | Sasaki et al. .................. 348/159 |
| 6,798,834 B1 | | 9/2004 | Murakami et al. |
| 6,891,891 B2 | | 5/2005 | Pau et al. |
| 6,900,846 B2 | | 5/2005 | Lee et al. |
| 6,904,081 B2 | | 6/2005 | Frank |
| 6,909,745 B1 | | 6/2005 | Puri et al. |
| 6,928,151 B2 | | 8/2005 | Yamada et al. |
| 6,934,335 B2 | | 8/2005 | Liu et al. |
| 6,952,500 B2 | | 10/2005 | Sheraizin et al. |
| 6,959,044 B1 | | 10/2005 | Jin et al. |
| 6,970,506 B2 | | 11/2005 | Kim et al. |
| 6,985,635 B2 | | 1/2006 | Chen et al. |
| 6,987,728 B2 | | 1/2006 | Deshpande |
| 6,996,186 B2 | | 2/2006 | Ngai et al. |
| 7,009,656 B2 | | 3/2006 | Thomson et al. |
| 7,027,512 B2 | | 4/2006 | Jeon |
| 7,039,855 B2 | | 5/2006 | Nikitin et al. |
| 7,042,512 B2 | | 5/2006 | Yang et al. |
| 7,075,581 B1 | | 7/2006 | Ozgen et al. |
| 7,089,313 B2 | | 8/2006 | Lee et al. |
| 7,093,028 B1 | | 8/2006 | Shao et al. |

(56) References Cited

U.S. PATENT DOCUMENTS

| | | |
|---|---|---|
| 7,095,814 B2 | 8/2006 | Kyeong et al. |
| 7,095,874 B2 | 8/2006 | Moskowitz et al. |
| 7,123,816 B2 | 10/2006 | McGrath et al. |
| 7,129,990 B2 | 10/2006 | Wredenhagen et al. |
| 7,136,417 B2 | 11/2006 | Rodriguez |
| 7,139,551 B2 | 11/2006 | Jamadagni |
| 7,142,599 B2 | 11/2006 | Henocq |
| 7,154,555 B2 | 12/2006 | Conklin |
| 7,167,507 B2 | 1/2007 | Mailaender et al. |
| 7,203,236 B2 | 4/2007 | Yamada |
| 7,203,238 B2 | 4/2007 | Liu et al. |
| 7,280,708 B2 | 10/2007 | Song et al. |
| 7,339,980 B2 | 3/2008 | Grant et al. |
| 7,356,073 B2 | 4/2008 | Heikkila |
| 7,359,466 B2 | 4/2008 | Huang et al. |
| 7,430,336 B2 | 9/2008 | Raveendran |
| 7,433,982 B2 | 10/2008 | Peev et al. |
| 7,443,448 B2 | 10/2008 | Yang et al. |
| 7,474,701 B2 | 1/2009 | Boice et al. |
| 7,479,978 B2 | 1/2009 | Cho et al. |
| 7,483,581 B2 | 1/2009 | Raveendran et al. |
| 7,486,736 B2 | 2/2009 | Zhidkov |
| 7,528,887 B2 | 5/2009 | Wyman |
| 7,529,426 B2 | 5/2009 | Neuman |
| 7,536,626 B2 | 5/2009 | Agrawal et al. |
| 7,557,861 B2 | 7/2009 | Wyman et al. |
| 7,634,260 B2 | 12/2009 | Chun |
| 7,660,987 B2 | 2/2010 | Baylis et al. |
| 7,676,106 B2 | 3/2010 | Panusopone et al. |
| 7,705,913 B2 | 4/2010 | Jia et al. |
| 7,738,716 B2 | 6/2010 | Song |
| 7,840,112 B2 | 11/2010 | Rao |
| 8,060,720 B2 | 11/2011 | Uppala |
| 2001/0001614 A1 | 5/2001 | Boice et al. |
| 2001/0017888 A1 | 8/2001 | Bruls |
| 2001/0055337 A1 | 12/2001 | Matsuzaki et al. |
| 2002/0021485 A1 | 2/2002 | Pilossof |
| 2002/0037051 A1 | 3/2002 | Takenaka |
| 2002/0047936 A1 | 4/2002 | Tojo |
| 2002/0054621 A1 | 5/2002 | Kyeong et al. |
| 2002/0097791 A1 | 7/2002 | Hansen |
| 2002/0146071 A1 | 10/2002 | Liu et al. |
| 2002/0149703 A1 | 10/2002 | Adams et al. |
| 2002/0154705 A1 | 10/2002 | Walton et al. |
| 2002/0163964 A1 | 11/2002 | Nichols |
| 2003/0021485 A1 | 1/2003 | Raveendran et al. |
| 2003/0071917 A1 | 4/2003 | Selby et al. |
| 2003/0142762 A1 | 7/2003 | Burke |
| 2003/0219160 A1 | 11/2003 | Song et al. |
| 2004/0013196 A1 | 1/2004 | Takagi et al. |
| 2004/0045038 A1 | 3/2004 | Duff et al. |
| 2004/0073901 A1 | 4/2004 | Imamatsu |
| 2004/0125877 A1 | 7/2004 | Chang et al. |
| 2004/0136566 A1 | 7/2004 | Cho et al. |
| 2004/0190609 A1 | 9/2004 | Watanabe |
| 2004/0192274 A1 | 9/2004 | Vuori |
| 2004/0264790 A1 | 12/2004 | Song et al. |
| 2005/0022178 A1 | 1/2005 | Ghafoor et al. |
| 2005/0062885 A1 | 3/2005 | Kadono et al. |
| 2005/0063500 A1 | 3/2005 | Li et al. |
| 2005/0076057 A1 | 4/2005 | Sharma et al. |
| 2005/0078750 A1 | 4/2005 | Shen et al. |
| 2005/0081482 A1 | 4/2005 | Lembo |
| 2005/0134735 A1 | 6/2005 | Swartz |
| 2005/0168634 A1 | 8/2005 | Wyman et al. |
| 2005/0168656 A1 | 8/2005 | Wyman et al. |
| 2005/0185719 A1* | 8/2005 | Hannuksela ............ 375/240.27 |
| 2005/0192878 A1 | 9/2005 | Minear et al. |
| 2005/0195889 A1 | 9/2005 | Grant et al. |
| 2005/0195899 A1 | 9/2005 | Han |
| 2005/0201478 A1 | 9/2005 | Claussen et al. |
| 2005/0222961 A1 | 10/2005 | Staib et al. |
| 2005/0231635 A1 | 10/2005 | Lin |
| 2005/0249282 A1 | 11/2005 | Landsiedel et al. |
| 2005/0254692 A1 | 11/2005 | Caldwell |
| 2005/0265461 A1 | 12/2005 | Raveendran |
| 2006/0002340 A1 | 1/2006 | Criss et al. |
| 2006/0023788 A1 | 2/2006 | Otsuka et al. |
| 2006/0129646 A1 | 6/2006 | Rhee et al. |
| 2006/0133514 A1* | 6/2006 | Walker ............... 375/240.27 |
| 2006/0146934 A1 | 7/2006 | Caglar et al. |
| 2006/0153294 A1 | 7/2006 | Wang et al. |
| 2006/0159160 A1 | 7/2006 | Kim et al. |
| 2006/0166739 A1 | 7/2006 | Lin |
| 2006/0197879 A1 | 9/2006 | Covell et al. |
| 2006/0210184 A1 | 9/2006 | Song et al. |
| 2006/0215539 A1 | 9/2006 | Vrcelj et al. |
| 2006/0215761 A1 | 9/2006 | Shi et al. |
| 2006/0222078 A1 | 10/2006 | Raveendran et al. |
| 2006/0230162 A1 | 10/2006 | Chen et al. |
| 2006/0233239 A1 | 10/2006 | Sethi et al. |
| 2006/0239347 A1 | 10/2006 | Koul |
| 2006/0244840 A1 | 11/2006 | Eshet et al. |
| 2006/0282737 A1 | 12/2006 | Shi et al. |
| 2007/0014354 A1 | 1/2007 | Murakami et al. |
| 2007/0074266 A1 | 3/2007 | Raveendran et al. |
| 2007/0081586 A1 | 4/2007 | Raveendran et al. |
| 2007/0081587 A1 | 4/2007 | Raveendran et al. |
| 2007/0097259 A1 | 5/2007 | MacInnis et al. |
| 2007/0124443 A1 | 5/2007 | Nanda et al. |
| 2007/0124459 A1 | 5/2007 | Kasama |
| 2007/0160128 A1 | 7/2007 | Tian et al. |
| 2007/0160142 A1 | 7/2007 | Abrams, Jr. |
| 2007/0171280 A1 | 7/2007 | Raveendran et al. |
| 2007/0171972 A1 | 7/2007 | Tian et al. |
| 2007/0171986 A1* | 7/2007 | Hannuksela ............ 375/240.26 |
| 2007/0206117 A1 | 9/2007 | Tian et al. |
| 2007/0208557 A1 | 9/2007 | Li et al. |
| 2007/0252894 A1 | 11/2007 | Satou et al. |
| 2008/0151101 A1 | 6/2008 | Tian et al. |
| 2009/0074070 A1 | 3/2009 | Yin et al. |
| 2009/0092944 A1 | 4/2009 | Pirker |
| 2009/0122186 A1 | 5/2009 | Rodriguez et al. |
| 2009/0168880 A1 | 7/2009 | Jeon et al. |
| 2009/0244840 A1 | 10/2009 | Takawa et al. |
| 2010/0020886 A1 | 1/2010 | Raveendran et al. |
| 2010/0171814 A1 | 7/2010 | Routhier et al. |
| 2013/0308707 A1 | 11/2013 | Raveendran et al. |

FOREIGN PATENT DOCUMENTS

| | | |
|---|---|---|
| CL | 10452005 | 12/2005 |
| CL | 14732005 | 1/2006 |
| CL | 5422006 | 8/2006 |
| CL | 05432006 | 9/2006 |
| CL | 05392006 | 11/2006 |
| CL | 5402006 | 11/2006 |
| CL | 5442006 | 2/2007 |
| CL | 02052001 | 12/2008 |
| CN | 1328747 A | 12/2001 |
| CN | 1372769 | 10/2002 |
| CN | 1383327 A | 12/2002 |
| CN | 1395800 A | 2/2003 |
| CN | 1436423 A | 8/2003 |
| CN | 1647540 A | 7/2005 |
| CN | 1669314 A | 9/2005 |
| EP | 0547460 | 6/1993 |
| EP | 0644695 | 3/1995 |
| EP | 0690617 | 1/1996 |
| EP | 0946054 | 9/1999 |
| EP | 1005227 | 5/2000 |
| EP | 1022667 A2 | 7/2000 |
| EP | 1164792 | 12/2001 |
| EP | 1168731 | 1/2002 |
| EP | 1195992 A1 | 4/2002 |
| EP | 1209624 | 5/2002 |
| EP | 1265373 A2 | 12/2002 |
| EP | 1505488 | 2/2005 |
| EP | 1547016 A1 | 6/2005 |
| EP | 1615447 | 1/2006 |
| EP | 1657835 | 5/2006 |
| FR | 2646047 A1 | 10/1990 |
| JP | 3189292 A | 8/1991 |
| JP | 5064175 A | 3/1993 |

(56) References Cited

FOREIGN PATENT DOCUMENTS

| | | |
|---|---|---|
| JP | H0622298 A | 1/1994 |
| JP | 7222145 A | 8/1995 |
| JP | H07203433 A | 8/1995 |
| JP | 7298272 A | 11/1995 |
| JP | 7312756 A | 11/1995 |
| JP | 8046969 A | 2/1996 |
| JP | 08102938 | 4/1996 |
| JP | 8130716 A | 5/1996 |
| JP | 08214210 | 8/1996 |
| JP | 8251594 A | 9/1996 |
| JP | 09018782 | 1/1997 |
| JP | H09503890 A | 4/1997 |
| JP | 09284770 | 10/1997 |
| JP | 10013826 A | 1/1998 |
| JP | 10302396 A | 11/1998 |
| JP | 10313463 A | 11/1998 |
| JP | H114260 A | 1/1999 |
| JP | 11243547 A | 9/1999 |
| JP | 11316843 A | 11/1999 |
| JP | 2000032474 A | 1/2000 |
| JP | 2000059774 A | 2/2000 |
| JP | 2000115778 | 4/2000 |
| JP | 2000209553 A | 7/2000 |
| JP | 2000295626 | 10/2000 |
| JP | 2000350217 A | 12/2000 |
| JP | 2001045494 A | 2/2001 |
| JP | 2001169251 A | 6/2001 |
| JP | 3189292 B2 | 7/2001 |
| JP | 2001204026 A | 7/2001 |
| JP | 2001251629 A | 9/2001 |
| JP | 2001346207 A | 12/2001 |
| JP | 2001346214 A | 12/2001 |
| JP | 2002010259 A | 1/2002 |
| JP | 2002044668 A | 2/2002 |
| JP | 2002051336 A | 2/2002 |
| JP | 2002064817 A | 2/2002 |
| JP | 2002077833 A | 3/2002 |
| JP | 2002101416 A | 4/2002 |
| JP | 2002125227 A | 4/2002 |
| JP | 2002252834 A | 9/2002 |
| JP | 2002543714 T | 12/2002 |
| JP | 2003037844 A | 2/2003 |
| JP | 2003110474 A | 4/2003 |
| JP | 2003111079 A | 4/2003 |
| JP | 2003209837 A | 7/2003 |
| JP | 2003209848 A | 7/2003 |
| JP | 2003224847 A | 8/2003 |
| JP | 2003319341 A | 11/2003 |
| JP | 2003348583 A | 12/2003 |
| JP | 2004023288 A | 1/2004 |
| JP | 2004140488 A | 5/2004 |
| JP | 2004248124 A | 9/2004 |
| JP | 2005123732 A | 5/2005 |
| JP | 2005517342 A | 6/2005 |
| JP | 2006074684 A | 3/2006 |
| JP | 2007520126 T | 7/2007 |
| JP | 2008500935 A | 1/2008 |
| KR | 1020010099660 | 11/2001 |
| KR | 20020010171 A | 2/2002 |
| KR | 20020070199 A | 9/2002 |
| KR | 20030029507 A | 4/2003 |
| KR | 100389893 B1 | 6/2003 |
| KR | 20030073254 A | 9/2003 |
| KR | 1020040046320 | 6/2004 |
| KR | 20050089721 A | 9/2005 |
| KR | 20060011281 A | 2/2006 |
| TW | 536918 B | 6/2003 |
| WO | 9535628 | 12/1995 |
| WO | 9739577 | 10/1997 |
| WO | 9932993 A1 | 7/1999 |
| WO | 9943157 | 8/1999 |
| WO | 0019726 | 4/2000 |
| WO | 0067486 | 11/2000 |
| WO | WO0156298 | 8/2001 |
| WO | 0166936 A1 | 9/2001 |
| WO | WO0169936 | 9/2001 |
| WO | 0178389 A1 | 10/2001 |
| WO | WO0178398 A1 | 10/2001 |
| WO | WO0225925 | 3/2002 |
| WO | WO0243398 | 5/2002 |
| WO | 02087255 | 10/2002 |
| WO | 03052695 A2 | 6/2003 |
| WO | 03067778 A1 | 8/2003 |
| WO | WO2004008747 A2 | 1/2004 |
| WO | WO2004008757 A1 | 1/2004 |
| WO | 2004019273 | 3/2004 |
| WO | 2004054270 | 6/2004 |
| WO | WO2004049722 A1 | 6/2004 |
| WO | WO2004057460 A2 | 7/2004 |
| WO | WO2004070953 A2 | 8/2004 |
| WO | WO2004114667 A1 | 12/2004 |
| WO | WO2004114672 | 12/2004 |
| WO | WO2005006764 A1 | 1/2005 |
| WO | WO2005069917 | 8/2005 |
| WO | WO2005074147 A1 | 8/2005 |
| WO | WO2005081482 A1 | 9/2005 |
| WO | WO2005107266 | 11/2005 |
| WO | WO2005109900 | 11/2005 |
| WO | 2006099082 A2 | 9/2006 |
| WO | WO2006099242 | 9/2006 |
| WO | WO2007047755 | 4/2007 |

OTHER PUBLICATIONS

G.D. Haan et al.: "De-interlacing of video data," IEEE Transactions on Consumer Electronics, vol. 43, No. 3, pp. 1-7, 1991.

Lee J, "A fast frame type selection technique for very low bit rate coding using MPEG-1" Real-Time Imaging, Academic Press Limited, GB, vol. 5, No. 2, Apr. 1999, pp. 83-94, XP004429625.

Liang, Y. & Tan, Y.P., "A new content-based hybrid video transcoding method," 2001 International Conference on Image Processing, Oct. 7-10, 2001, vol. 4, pp. 429-432.

P. Haavisto et al.: "Scan rate up-conversions using adaptive weighted median filtering," Signal Processing of HDTV II, Elsevier Science Publishers, pp. 703-710, 1990.

R. Simonetti et al.: "Deinterlacing of HDTV Images for Multimedia Applications," Signal Processing of HDTV IV, Elsevier Science Publishers, pp. 765-772, 1993.

S.P. Ghaei et al.: "Improvement Wavelet denoising via empirical Wiener filtering," Proceedings of SPIE, vol. 3169, pp. 1-11, Jul. 1997.

International Search Report-PCT/US2006/037993, International Search Authority—European Patent Office—Mar. 5, 2007.

International Preliminary Report on Patentability—PCT/US2006/037993, International Search Authority—The International Bureau of WIPO—Geneva, Switzerland—Apr. 1, 2008.

Written Opinion—PCT/US2006/037993, International Search Authority—European Patent Office—Mar. 5, 2007.

F.M. Wang et al.: "Time recursive Deinterlacing for IDTV and Pyramid Coding," Signal Processing: Image Communications 2, pp. 1306-1309, 1990.

K. Jung et al.: "Deinterlacing using Edge based Motion Estimation," IEEE MWSCS, pp. 892-895, 1995.

C. Huang et al.: "A Robust Scene-Change Detection method for Video Segmentation," in IEEE Transactions on Circuits and Systems for Video Technology, vol. 11, No. 12, pp. 1281-1288; Dec. 2001.

D. Lelescu et al.: "Statistical Sequential Analysis for Real-Time Video Scene Change Detection on Compressed Multimedia Bitstream," IEEE Transactions on Multimedia, vol. 5, No. 1, pp. 106-117, Mar. 2003.

S. Lee et al.: "Fast Scene Change Detection using Direct Feature Extraction from MPEG Compressed Videos," in IEEE Transactions on Multimedia, vol. 2, No. 4, p. 240-254. Dec. 2000.

S. Pei et al.: "Effective Wipe Detection in MPEG Compressed Video Using Macroblock Type Information," in IEEE Transactions on Multimedia, vol. 4, No. 3, p. 309-319, Sep. 2002.

SMPTE RP 27.3-1989 "SMPTE Recommended Practice Specifications for Safe Action and Safe Title Areas Test Pattern for Television Systems" Society of Motion Picture and Television Engineers, pp. 1-3 Approved Mar. 29, 1989.

(56) References Cited

OTHER PUBLICATIONS

Mihaela Van Der Schaar et al., "A Hybrid Temporal- SNR Fine-Granular Scalability for Internet Video," IEEE Transactions on Circuits and Systems for Video Technology, IEEE Service Center, Piscataway, NJ, vol. 11, No. 3, Mar. 2001.

Kwon et al., "Overview of H.264/MPEG-4 part 10," Journal of Visual Communication and Image Representation, Academic Press, Inc., vol. 17, No. 2, Apr. 2006, pp. 186-216.

Rusert et al, "Enhanced interframe wavelet video coding considering the interrelation of spatio-temporal transform and motion compensation," Signal Processing. Image Communication, Elsevier Science Publishers, Amsterdam, NL, vol. 19, No. 7, Aug. 2004, pp. 617-635.

Girod et al., "Scalable codec architectures for Internet video-on-demand," Signals, Systems & Computers, 1997. Conference Record of the Thirty-First Asilomar Conference on Pacific Grove, CA, USA Nov. 2-5, 1997, Los Alamitos, CA, USA, IEEE Comput Soc, US, vol. 1, Nov. 2, 1997, pp. 357-367.

"MPEG Digital Video-Coding Standards," IEEE Signal Processing Magazine, IEEE Service Center, Piscataway, NJ, vol. 14, No. 5, Sep. 1997, pp. 82-100.

R4-030797, An Advanced Receiver Proposal for MIMO, TSG-RAN WG4 #28. Lucent Technologies, Sophia-Antipolis, Aug. 18-22, 2003, pp. 1-8.

Puri et ai., "Video coding using the H.264/MPEG-4 AVC compression standard" Signal Processing. Image Communication, Elsevier Science Publishers, Amsterdam NL vol. 19, No. 9, Oct. 1, 2004, pp. 793-849, XP004607150.

De Haan Gerard, et al., "Deinterlacing—An Overview," Proceeding of the IEEE, 1998, 86 (9), 1839-1857.

Boyce, Jill M.: "Packet loss resilient transmission of MPEG video over the Internet" Signal Processing: Image Communication, Elsevier Science Publishers, Amsterdam, NL, vol. 15, No. 1-2, Sep. 1999, pp. 7-24, XP004180635.

Translation of Office Action in Chinese application 200780010753.9 corresponding to U.S. Appl. No. 11/557,778, citing US5864369 and CN1372769 dated Jan. 27, 2011.

Translation of Office Action in Japan application 2008-533639 corresponding to U.S. Appl. No. 11/528,307, citing JP7298272 and JP2000350217 dated Jan. 18, 2011.

Wiegand, T. et al.: "Draft ITU-R Recommendation and Final Draft International Standard of Joint Video Specification," Joint Video Team (JVT) of ISO/IEC MPEG & ITU-T VCEG; Document: JVT-G050r1; 8th Meeting: Geneva, Switzerland, May 27, 2003.

Translation of Office Action dated Jan. 28, 2011 in Taiwanese application 096110382.

"Third Generation Partnership Project 2", May 17, 2004, Qualcomm.

European Search Report—EP10166125—Search Authority—Munich—Jul. 28, 2010.

Mailaender, L, et al., "Linear MIMO equalization for CDMA downlink signals with code reuse", Wireless Communications, IEEE Transactions on, Sep. 2005, vol. 4, Issue 5, pp. 2423-2434.

Fablet R., et al., "Motion Recognition Using Nonparametric Image Motion Models Estimated From Temporal and Multiscale Co-Occurence Statistics", IEEE Transaction on Pattern analysis and machine Intelligence, vol. 25, No. 12, pp. 1619-1624, Dec. 2003.

Peh C.H., et al., "Synergizing Spatial and Temporal Texture", IEEE Transaction on Image Processing, vol. 11, No. 10, pp. 1179-1191, Oct. 2002.

\* cited by examiner

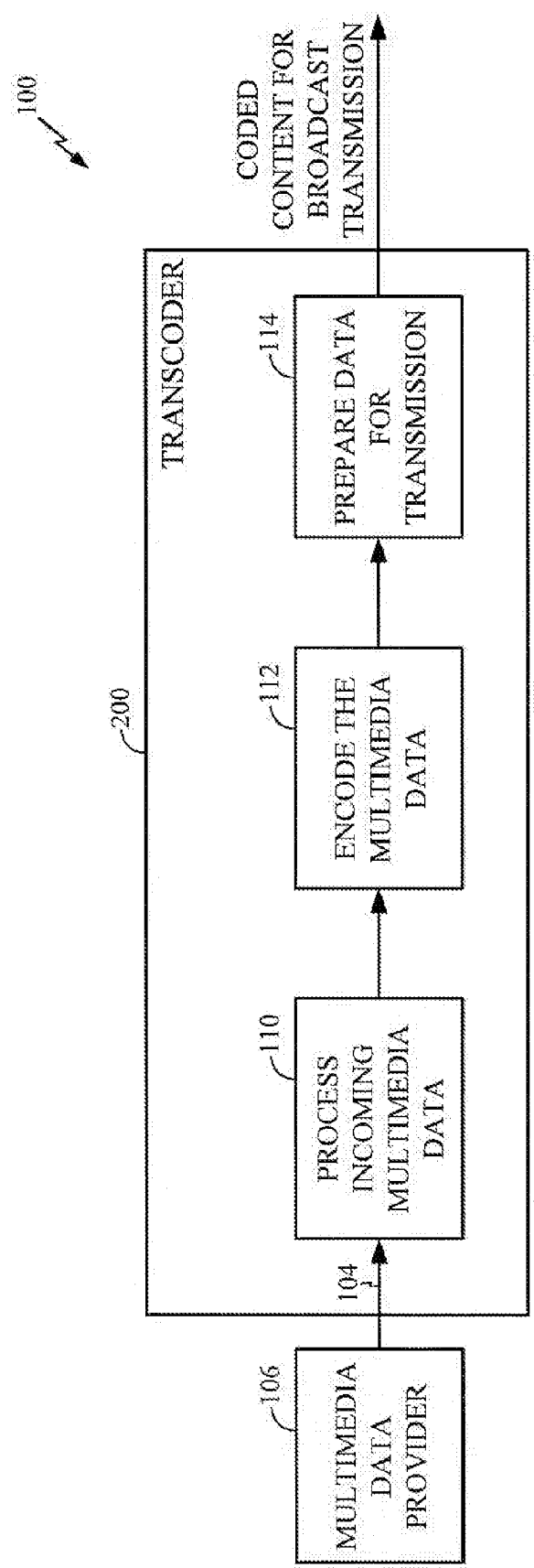

|  |  | (CLASS) |
|---|---|---|
| HL 5 | HM 6 | HH 8 |
| ML 2 | MM 3 | MH 7 |
| LL 1 | LM 2 | LH 4 |
| LOW | MEDIUM | HIGH |

MOTION: HIGH / MEDIUM / LOW (rows top to bottom)

TEXTURE (columns)

FIG. 8

Boundaries in a macroblock to be filtered (luma boundaries shown with solid lines and chroma boundaries shown with dashed lines)

Flowchart for Adaptive Assignment of Frame Types to Frames

REDUNDANT DATA ENCODING METHODS AND DEVICE

CLAIM OF PRIORITY UNDER 35 U.S.C. §119

The present Application for Patent claims priority to (a) Provisional Patent Application No. 60/721,416 entitled "A VIDEO TRANSCODER FOR REAL-TIME STREAMING AND MOBILE BROADCAST APPLICATIONS" filed Sep. 27, 2005, (b) Provisional Patent Application No. 60/789,377 entitled "A VIDEO TRANSCODER FOR REAL-TIME STREAMING AND MOBILE BROADCAST APPLICATIONS" filed Apr. 4, 2006, (c) Provisional Application No. 60/727,643 entitled "METHOD AND APPARATUS FOR SPATIO-TEMPORAL DEINTERLACING AIDED BY MOTION COMPENSATION FOR FIELD-BASED VIDEO" filed Oct. 17, 2005, (d) Provisional Application No. 60/727,644 entitled "METHOD AND APPARATUS FOR SHOT DETECTION IN VIDEO STREAMING" filed Oct. 17, 2005, (e) Provisional Application No. 60/727,640 entitled "A METHOD AND APPARATUS FOR USING AN ADAPTIVE GOP STRUCTURE IN VIDEO STREAMING" filed Oct. 17, 2005, (f) Provisional Application No. 60/730,145 entitled "INVERSE TELECINE ALGORITHM BASED ON STATE MACHINE" filed Oct. 24, 2005, and (g) Provisional Application No. 60/789,048 entitled "SPATIO-TEMPORAL DEINTERLACING AIDED BY MOTION COMPENSATION FOR FIELD-BASED MULTIMEDIA DATA" filed Apr. 3, 2006. All seven of these provisional patent applications are assigned to the assignee hereof and hereby expressly incorporated by reference herein.

REFERENCE TO CO-PENDING APPLICATIONS FOR PATENT

The present Application for Patent is related to U.S. patent application Ser. No. 11/373,577 entitled "CONTENT CLASSIFICATION FOR MULTIMEDIA PROCESSING" filed on Mar. 10, 2006, assigned to the assignee hereof and hereby expressly incorporated by reference herein.

BACKGROUND

1. Field

The present application is directed to apparatus and methods for video transcoding of video data for real-time streaming and, more particularly, to transcoding video data for real-time streaming in mobile broadcast application.

2. Background

Efficient video compression is useful in many multimedia applications such as wireless video streaming and video telephony, due to the limited bandwidth resources and the variability of available bandwidth. Certain video coding standards, such as MPEG-4 (ISO/IEC), H.264 (ITU), or similar video coding provide high efficiency coding well suited for applications such as wireless broadcasting. Some multimedia data, for example, digital television presentations, is generally coded according to other standards such as MPEG-2. Accordingly, transcoders are used to transcode or convert multimedia data coded according to one standard (e.g., MPEG-2) to another standard (e.g., H.264) prior to wireless broadcasting.

Improvements rate optimized codecs could offer advantages in error resiliency, error recovery, and scalability. Moreover, use of information determined from the multimedia data itself could also offer additional improvements for encoding, including error resiliency, error recovery, and scalability. Accordingly, a need exists for a transcoder that provide highly efficient processing and compression of multimedia data that uses information determined from the multimedia data itself, is scalable, and is error resilient for use in many multimedia data applications including mobile broadcasting of streaming multimedia information.

SUMMARY

Each of the inventive content based transcoding apparatuses and methods described and illustrated has several aspects, no single one of which is solely responsible for its desirable attributes. Without limiting the scope of this disclosure, its more prominent features will now be discussed briefly. After considering this discussion, and particularly after reading the section entitled "Detailed Description" one will understand how the features of this content driven transcoding provides improvements for multimedia data processing apparatuses and methods.

Inventive aspects described herein relate to using content information for various methods of encoding multimedia data and in various modules or components of an encoder, for example, an encoder used in a transcoder. A transcoder can orchestrate transcoding multimedia data using content information. The content information can be received from another source, for example, metadata that is received with the video. The transcoder can be configured to generate content information through a variety of different processing operation. In some aspects, the transcoder generates a content classification of the multimedia data, which is then used in one or more encoding processes. In some aspects, a content driven transcoder can determine spatial and temporal content information of the multimedia data, and use the content information for content-aware uniform quality encoding across channels, and content classification based compression/bit allocation.

In some aspects, content information (e.g., metadata, content metrics and/or a content classification)of multimedia data is obtained or calculated, and then provided to components of the transcoder for use in processing the multimedia data for encoding. For example, a preprocessor can use certain content information for scene change detection, performing inverse telecine ("IVTC"), de-interlacing, motion compensation and noise suppression (e.g., 2D wavelet transform) and spatio-temporal noise reduction, e.g., artifact removal, de-ringing, de-blocking, and/or de-noising. In some aspects, a preprocessor can also use the content information for spatial resolution down-sampling, e.g., determining appropriate "safe" and "action handling" areas when down-sampling from standard definition (SD) to Quarter Video Graphics Array (QVGA).

In some aspects, an encoder includes a content classification module that is configured to calculate content information. The encoder can use content classification for bit rate control (e.g., bit allocation) in determining quantization parameters (QP) for each MB, for motion estimation, for example, performing color motion estimation (ME), performing motion vector (MV) prediction, scalability in providing a base layer and an enhancement layer, and for error resilience by using a content classification to affect prediction hierarchy and error resiliency schemes including, e.g., adaptive intra refresh, boundary alignment processes, and providing redundant I-frame data in an enhancement layer. In some aspects, the transcoder uses the content classification in coordination with a data multiplexer for maintaining optimal multimedia data quality across channels. In some aspects, the encoder can use the content classification information for forcing I-frames to periodically appear in the encoded data to allow fast channel switching. Such implementations can also make use of I-blocks that may be required in the encoded data for error resilience, such that random access switching and error resilience (based on, e.g., content classification) can be effectively combined through prediction hierarchy to improve coding efficiency while increasing robustness to errors.

In one aspect a method of processing multimedia data includes obtaining content information of multimedia data, and encoding the multimedia data to form an encoded bitstream, said encoding comprising inserting at least one redundant block of intra-coded data into the encoded bitstream based on the content information. In some aspects, the content information comprises a content classification. The content classification can be based on a complexity of the multimedia data. In addition, the complexity can comprise a spatial complexity, a temporal complexity, or both a spatial complexity and a temporal complexity. In some instances, the amount of redundant data inserted is inversely proportionally to the complexity of the multimedia data. Illustrative aspects include examples where the intra-coded data comprises at least one frame of redundant data, the at least one frame of redundant data comprises an I-frame, the at least one redundant frame of intra-coded data comprises a channel switch frame, and/or the at least one redundant block of intra-coded data comprises substantially all of an I-frame. The encoding can include encoding the multimedia data into a base layer and an enhancement layer, and wherein the intra-coded data is encoded using the quantization parameter for the base layer, or the quantization parameter for the enhancement layer.

In another aspect, an apparatus for processing multimedia data includes means for obtaining content information of multimedia data, and means for encoding the multimedia data to form an encoded bitstream, said encoding comprising inserting at least one redundant block of intra-coded data into the encoded bitstream based on the content information.

In yet another aspect, an apparatus for processing multimedia data includes a content classifier configured to obtain content information of multimedia data, and an encoder configured to encode the multimedia data to form an encoded bitstream, said encoding comprising inserting at least one redundant block of intra-coded data into the encoded bitstream based on the content information.

In another aspect, a processor is configured to obtain content information of multimedia data, and encode the multimedia data to form an encoded bitstream, said encoding comprising inserting at least one redundant block of intra-coded data into the encoded bitstream based on the content information.

In another aspect, a machine-readable medium comprising instructions that upon execution cause a machine to obtain content information of multimedia data, and encode the multimedia data to form an encoded bitstream, said encoding comprising inserting at least one redundant block of intra-coded data into the encoded bitstream based on the content information.

BRIEF DESCRIPTION OF THE DRAWINGS

FIG. 1A is a block diagram of a media broadcast system including a transcoder for transcoding between different video formats.

FIG. 8 illustrates an example of a classification chart that illustrates one aspect of how associating texture and motion values with content classification.

It is noted that, where appropriate, like numerals refer to like parts throughout the several views of the drawings.

DETAILED DESCRIPTION

Figure 1B:
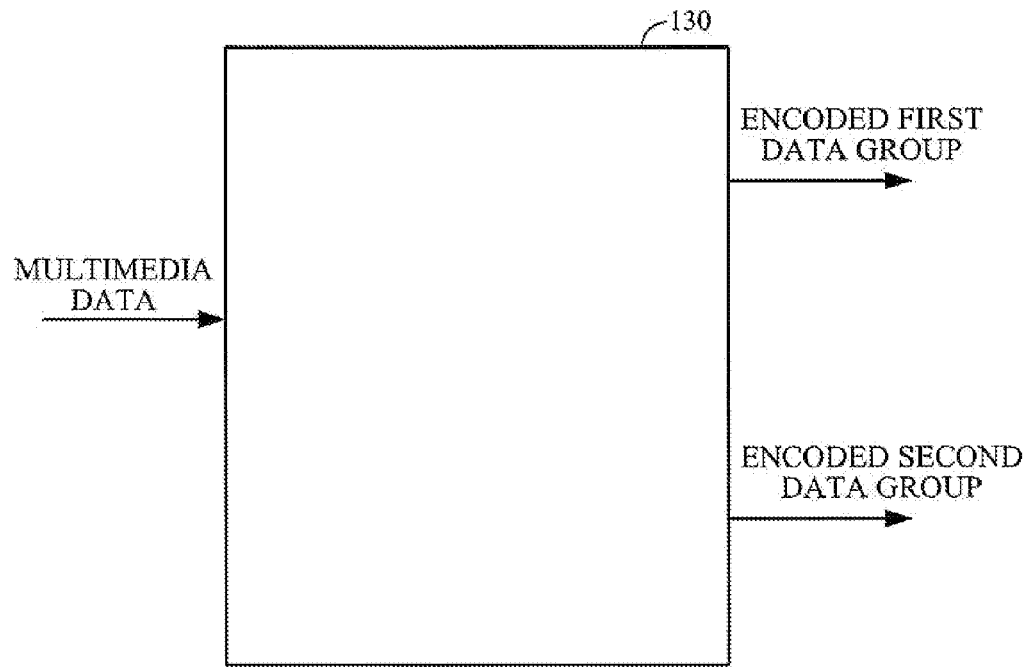
FIG. 1B is a block diagram of an encoder configured to encode multimedia data and provide an encoded first data group and an encoded second data group.

The following detailed description is directed to certain aspects discussed in this disclosure. However, the invention can be embodied in a multitude of different ways. Reference in this specification to "one aspect" or "an aspect" means that a particular feature, structure, or characteristic described in connection with the aspect is included in at least one aspect. The appearances of the phrase "in one aspect," "according to one aspect," or "in some aspects" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

The following description includes details to provide a thorough understanding of the examples. However, it is understood by one of ordinary skill in the art that the examples may be practiced even if every detail of a process or device in an example or aspect is not described or illustrated herein. For example, electrical components may be shown in block diagrams that do not illustrate every electrical connection or every electrical element of the component in order not to obscure the examples in unnecessary detail. In other instances, such components, other structures and techniques may be shown in detail to further explain the examples.

The present disclosure relates to controlling encoding and transcoding apparatus and methods using content information of the multimedia data being encoded. "Content information" or "content" (of the multimedia data) are broad terms meaning information relating to the content of multimedia data and can include, for example, metadata, metrics calculated from the multimedia data and content related information associated with one or more metrics, for example a content classification. Content information can be provided to an encoder or determined by an encoder, depending on the particular application. The content information can be used for many aspects of multimedia data encoding, including scene change detection, temporal processing, spatio-temporal noise reduction, down-sampling, determining bit rates for quantization, scalability, error resilience, maintaining optimal multimedia quality across broadcast channels, and fast channel switching. Using one ore more of these aspects, a transcoder can orchestrate processing multimedia data and produce content-related encoded multi-media data. Descriptions and figures herein that describe transcoding aspects can also be applicable to encoding aspects and decoding aspects.

The transcoder apparatus and methods relates to transcoding from one format to another, and is specifically described herein as relating to transcoding MPEG-2 video to enhanced, scalable H.264 format for transmission over wireless channels to mobile devices, illustrative of some aspects. However, the description of transcoding MPEG-2 video to H.264 format is not intended as limiting the scope of the invention, but is merely exemplary of some aspects of the invention. The disclosed apparatus and methods provide a highly efficient architecture that supports error resilient encoding with random access and layering capabilities, and can be applicable to transcoding and/or encoding video formats other than MPEG-2 and H.264 as well.

"Multimedia data" or simply "multimedia" as used herein, is a broad term that includes video data (which can include audio data), audio data, or both video data and audio data. "Video data" or "video" as used herein as a broad term referring to frame-based or field-based data, which includes one or more images or related sequences of images, containing text, image information and/or audio data, and can be used to refer to multimedia data (e.g., the terms can be used interchangeably) unless otherwise specified.

Described below are examples of various components of a transcoder and examples of processes that can use content information for encoding multimedia data.

FIG. 1A is block diagram illustrating a data flow of some aspects of a multimedia data broadcast system 100. In system 100, a multimedia data provider 106 communicates encoded multimedia data 104 to a transcoder 200. The encoded multimedia data 104 is received by the transcoder 200, which processes the multimedia data 104 into raw multimedia data in block 110. The processing in block 110 decodes and parses the encoded multimedia data 104, and further processes the multimedia data to prepare it for encoding into another format. The decoded multimedia data is provided to block 112 where the multimedia data is encoded to a predetermined multimedia format or standard. Once the multimedia data has been encoded, at block 114 it is prepared for transmission, via for example, a wireless broadcast system (e.g., a cellular phone broadcast network, or via another communication network). In some aspects, the received multimedia data 104 has been encoded according to the MPEG-2 standard. After the transcoded multimedia data 104 has been decoded, the transcoder 200 encodes the multimedia data to an H.264 standard.

FIG. 1B is a block diagram of an transcoder 130 that can be configured to perform the processing in blocks 110 and 112 of FIG. 1A. The transcoder 130 can be configured to receive multimedia data, decode and parse the multimedia data into packetized elementary streams (e.g., subtitles, audio, metadata, "raw" video, CC data, and presentation time stamps), encode the into a desired format, and provide encoded data for further processing or transmission. The transcoder 130 can be configured to provide encoded data in an two or more data groups, for example, an encoded first data group and an encoded second data group, which is referred to as layered encoding. In some examples of aspects, the various data groups (or layers) in a layered encoding scheme can be encoded at different levels of quality, and formatted such that data encoded in a first data group is of a lower quality (e.g., provides a lower visual quality level when displayed) than data encoded in a second data group.

Figure 1C:
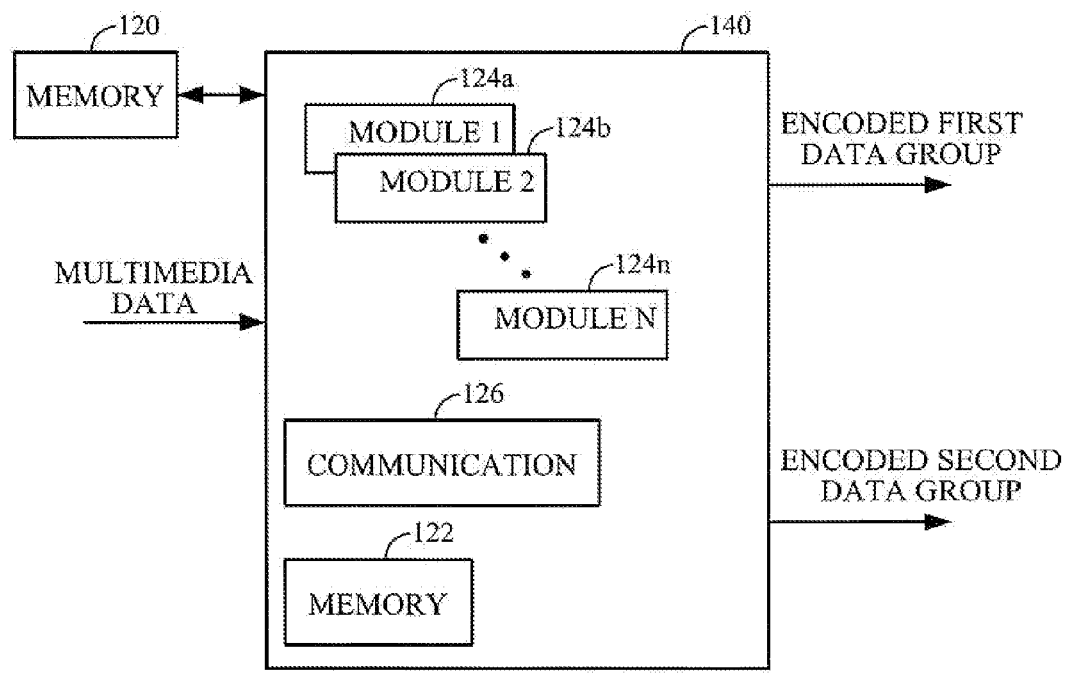
FIG. 1C is a block diagram of a processor configured to encode multimedia data.

FIG. 1C is a block diagram of a processor 140 that can be configured to transcode multimedia data, and can be configured to perform a portion or all of the processing depicted in blocks 110 and 112 of FIG. 1A. Processor 140 can include modules 124a . . . n perform one or more of the transcoding processes described herein, including decoding, parsing, pre-processing, and encoding, and use content information for processing. Processor 140 also includes internal memory 122 and can be configured to communicate with external memory 120, either directly or indirectly through another device. The processor 140 also includes a communications module 126 configured to communicate with one or more devices external to the processor 140, including to receive multimedia data and to provide encoded data, such as data encoded in a first data group and data encoded in a second data group. In some examples of aspects, the various data groups (or layers) in a layered encoding scheme can be encoded at different levels of quality, and formatted such that data encoded in a first data group is of a lower quality (e.g., provides a lower visual quality level when displayed) than data encoded in a second data group.

The transcoder 130 or the preprocessor 140 (configured for transcoding) components thereof, and processes contained therein, can be implemented by hardware, software, firmware, middleware, microcode, or any combination thereof. For example, a parser, decoder, preprocessor, or encoder may be standalone components, incorporated as hardware, firmware, middleware in a component of another device, or be implemented in microcode or software that is executed on a processor, or a combination thereof. When implemented in software, firmware, middleware or microcode, the program code or code segments that perform the motion compensation, shot classifying and encoding processes may be stored in a machine readable medium such as a storage medium. A code segment may represent a procedure, a function, a sub-program, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

Illustrative Example of a Transcoder Architecture

Figure 2:
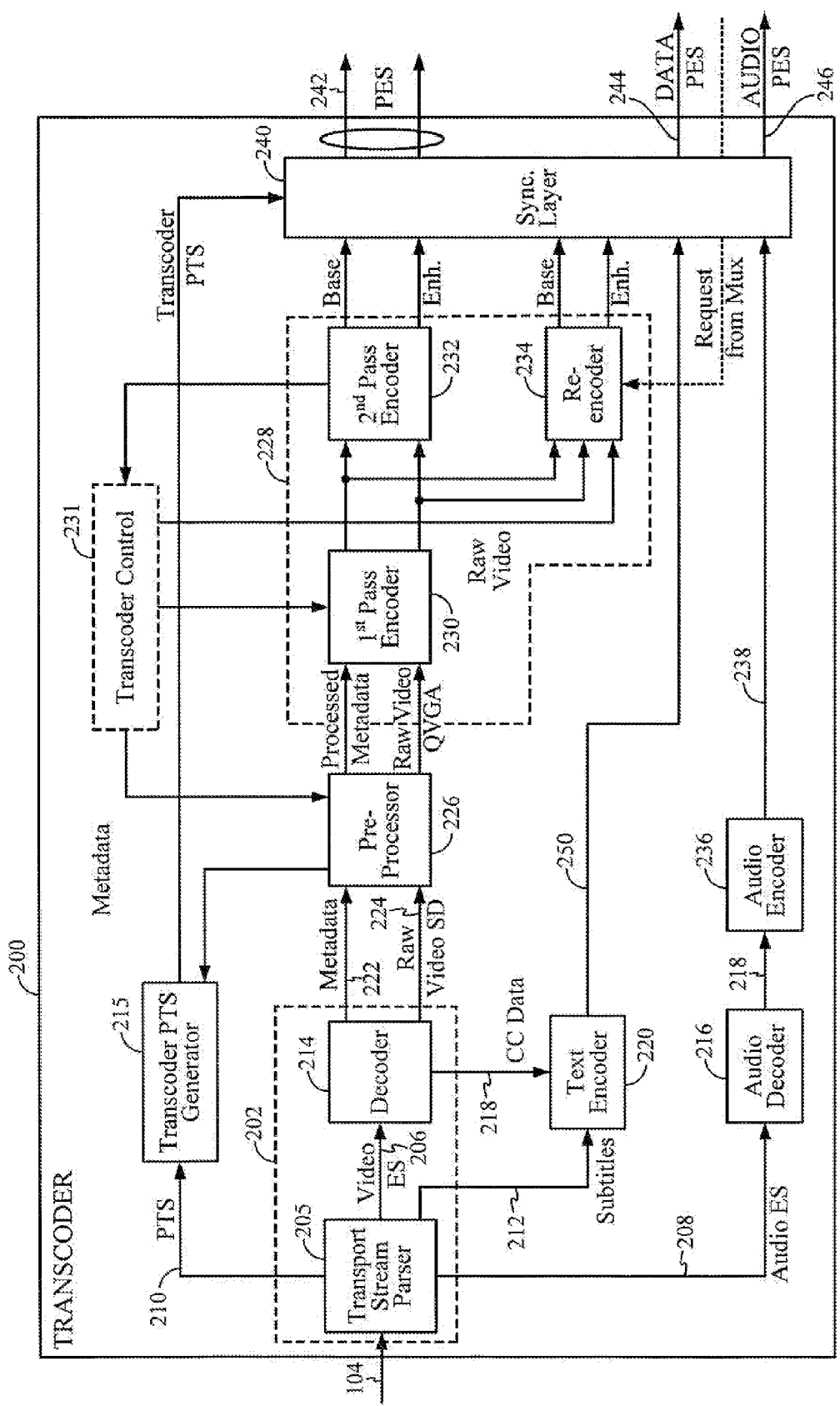
FIG. 2 is a block diagram of an example of the transcoder of the system of FIG. 1.

FIG. 2 illustrates a block diagram of an example of a transcoder that may be used for the transcoder 200 illustrated in the multimedia broadcast system 100 of FIG. 1. The transcoder 200 comprises a parser/decoder 202, a preprocessor 226, an encoder 228, and a synchronizing layer 240, further described below. The transcoder 200 is configured to use content information of the multimedia data 104 for one or more aspects of the transcoding process, as is described herein. Content information can be obtained from a source external to the transcoder 200, through multimedia metadata, or calculated by the transcoder, for example, by the preprocessor 226 or the encoder 228. The components shown in FIG. 2 are illustrative of an components that can be included in a transcoder that uses content information for one or more transcoding processes. In a particular implementation, one or more of the components of the transcoder 200 may be excluded or additional components may be included. Additionally, portions of the transcoder and transcoding processes are described so as to allow someone of skill in the art to practice the invention even if every detail of a process or a device may not be described herein.

Figure 5:
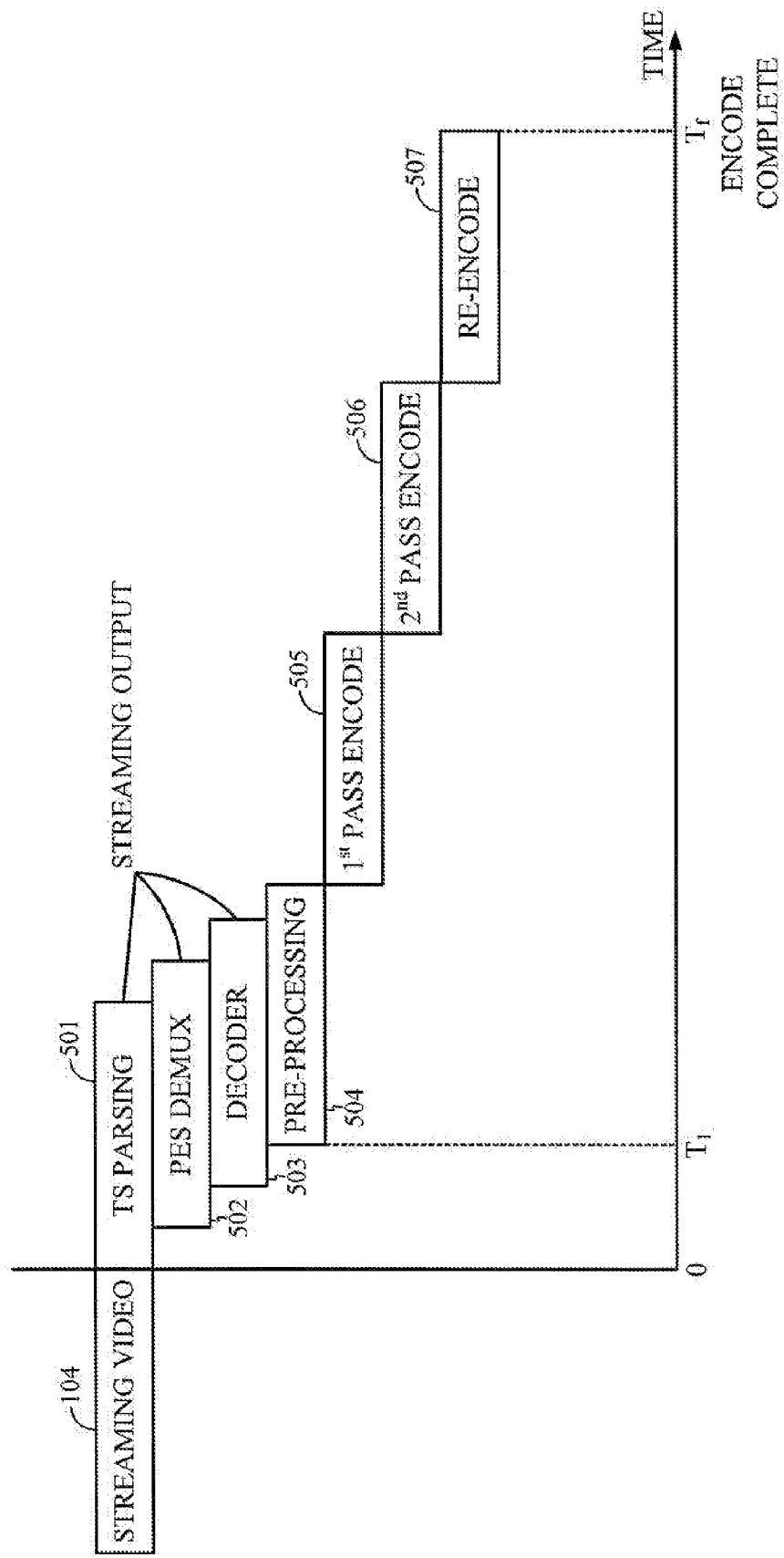
FIG. 5 is a system timing diagram illustrating a sequence of operations performed by the transcoder of FIG. 2.

FIG. 5 illustrates a timing diagram as a graphical illustration of temporal relationships of the operation of various components and/or processes of the transcoder 200. As shown in FIG. 5, encoded streaming video 104 (encoded multimedia data), such as MPEG-2 video, is first received at an arbitrary time zero (0) by the parser 205 (FIG. 2). Next, the video stream is parsed 501, demultiplexed 502 and decoded 503, such as by parser 205 in combination with decoder 214. As illustrated, these processes can occur in parallel, with slight timing offset, in order to provide stream output of processing data to the preprocessor 226 (FIG. 2). At a time $T_1$ once the preprocessor 226 has received enough data from decoder 214 to begin outputting processing results, the remaining processing steps become sequential in nature, with first pass encoding 505, second pass encoding 506, and re-encoding 507 occurring in sequence after preprocessing until completion of re-encoding at a time $T_f$.

The transcoder 200 described herein can be configured to transcode a variety of multimedia data, and many of the processes apply to whatever type of multimedia data is transcoded. Although some of the examples provided herein relate particularly to transcoding MPEG-2 data to H.264 data, these examples are not meant to limit the disclosure to such data. Encoding aspects described below can be applied to transcoding any suitable multimedia data standard to another suitable multimedia data standard.

Parser/Decoder

Referring again to FIG. 2, the parser/decoder 202 receives multimedia data 104. Parser/decoder 202 includes a transport stream parser ("parser") 205 that receives the multimedia data 104 and parses the data into a video elementary stream (ES) 206, an audio ES 208, presentation time stamps (PTS) 210 and other data such as subtitles 212. An ES carries one type of data (video or audio) from a single video or audio encoder. For example, a video ES comprises the video data for a sequence of data, including the sequence header and all the subparts of the sequence. A packetized elementary stream, or PES, consists of a single ES which has been made into packets, each typically starting with an added packet header. A PES stream contains only one type of data from one source, e.g. from one video or audio encoder. PES packets have variable length, not corresponding to the fixed packet length of transport packets, and may be much longer than a transport packet. When transport packets are formed from a PES stream, the PES header can be placed at the beginning of a transport packet payload, immediately following the transport packet header. The remaining PES packet content fills the payloads of successive transport packets until the PES packet is all used. The final transport packet can be filled to a fixed length, e.g., by stuffing with bytes, e.g., bytes=0xFF (all ones).

The parser 205 communicates the video ES 206 to a decoder 214 which is part of the parser/decoder 202 shown here. In other configurations the parser 205 and the decoder 214 are separate components. The PTS 210 are sent to a transcoder PTS generator 215, which can generate separate presentation time stamps particular to the transcoder 200 for use in arranging data to be sent from the transcoder 200 to a broadcast system. The transcoder PTS generator 215 can be configured to provide data to a sync layer 240 of the transcoder 200 to coordinate the synchronization of the data broadcast.

Figure 3:
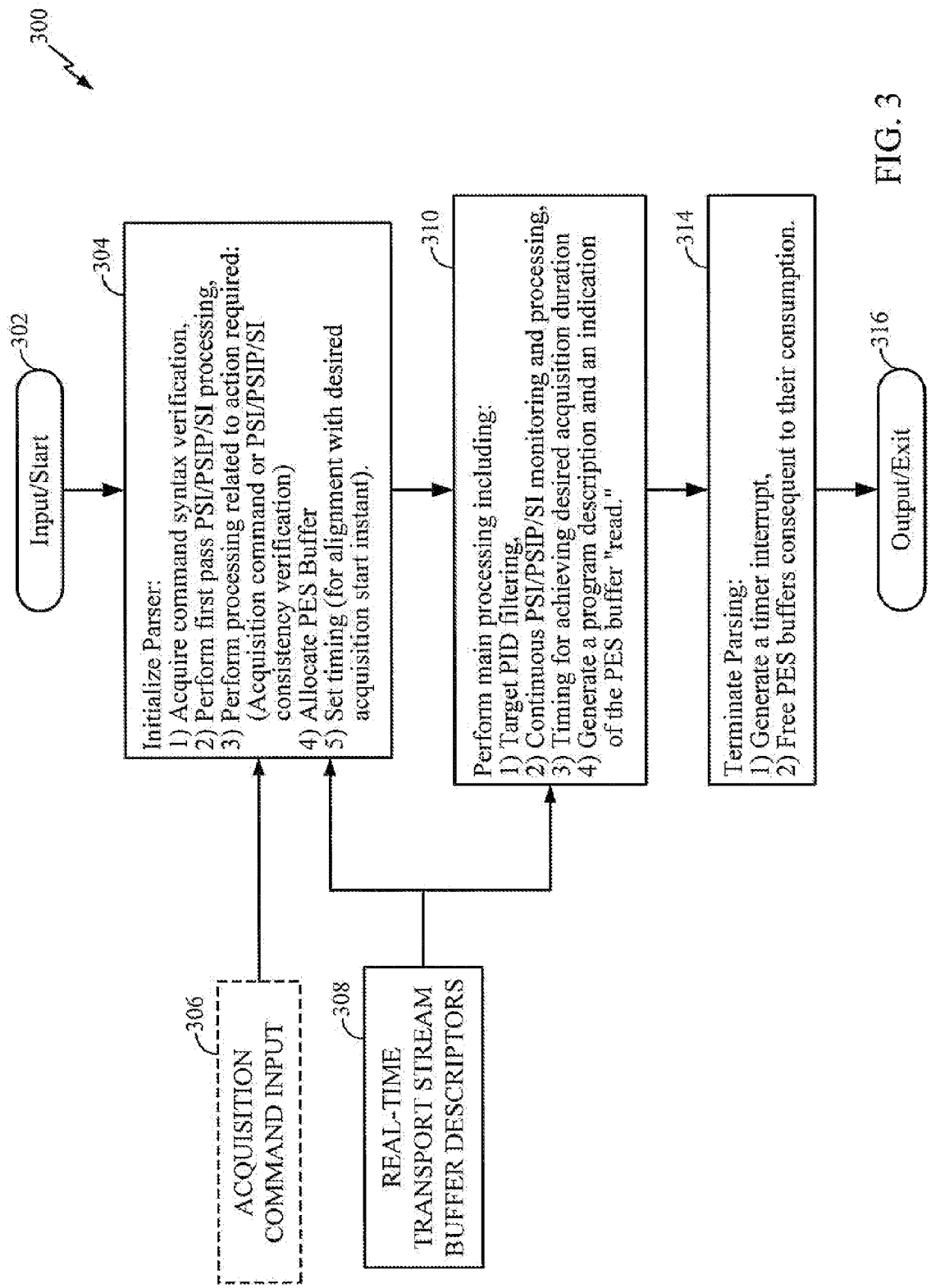
FIG. 3 is a flow diagram illustrating the operation of a parser used within the transcoder of FIG. 2.

FIG. 3 illustrates a flow diagram of one example of a process 300 that the parser 205 may follow when parsing out the various packetized elementary streams described above. Process 300 starts at block 302 when multimedia data 104 is received from a content provider 106 (FIG. 1). Process 300 proceeds to block 304 where initialization of the parser 205 is performed. Initialization may be triggered by an independently generated acquisition command 306. For example, a process that is independent from the parser 205 and is based on an externally received TV-schedule and channel lineup information may generate the acquisition command 306. Additionally, real-time transport stream (TS) buffer descriptors 308 may be input to assist in both initialization and for main processing.

As illustrated in block 304, initialization can include acquiring a command syntax verification, performing a first pass PSI/PSIP/SI (program specific information/program and system information protocol/system information) processing, performing processing specifically related to either the acquisition command or the PSI/PSIP/SI consistency verification, allocating PES buffers for each PES, and setting timing (e.g., for alignment with desired acquisition start instant). The PBS buffers hold the parsed ES data and communicate each parsed ES data to a corresponding audio decoder 216, text encoder 220, decoder 214, or transcoder PTS generator 215.

After initialization, process 300 proceeds to block 310 for main processing of the received multimedia data 104. Processing in block 310 can include target packet identifier (PID) filtering, continuous PSI/PSIP/SI monitoring and processing, and a timing process (e.g., for achieving a desired acquisition duration) so that the incoming multimedia data is passed into the appropriate PES buffers. As a result of processing the multimedia data in block 310, a program descriptor and indication of the PES buffer 'read' are generated, which will interface with the decoder 214 (FIG. 2) as described hereinbelow.

After block 310, the process 300 proceeds to block 314, where termination of the parsing operations occur, including generating a timer interrupt and freeing of PES buffers consequent to their consumption. It is noted that PES buffers will exist for all relevant elementary streams of the program cited in its descriptor such as audio, video, and subtitle streams.

Referring again to FIG. 2, the parser 205 sends the audio ES 208 to an audio decoder 216 for corresponding to the transcoder implementation and provides the encoded text 250 to the synch layer 240 and decoding of the audio information. The subtitle information 212 is delivered to a text encoder 220. Closed captioning (CC) data 218 from a decoder 214 is also provided to the text encoder 220, which encodes the subtitle information 212 and the CC data 218 in a format affected by the transcoder 200.

The parser/decoder 202 also includes the decoder 214, which receives the video ES 206. The decoder 214 can generate metadata associated with video data, decodes the encoded video packetized elementary stream into raw video 224 (for example, in standard definition format), and processes the video closed captioned data in the video ES stream.

Figure 4:
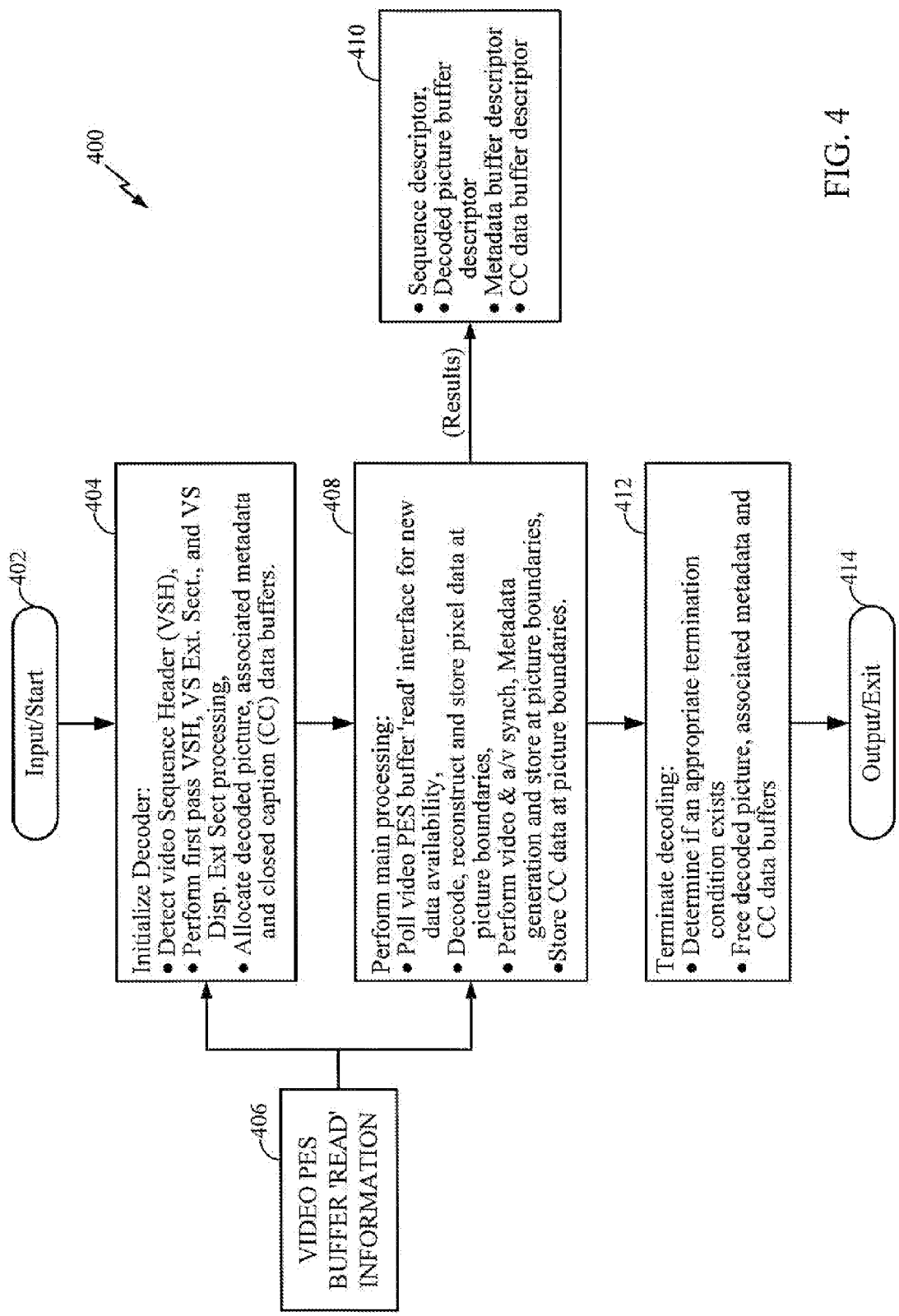
FIG. 4 is a flow diagram illustrating the operation of a decoder used within the transcoder of FIG. 2.

FIG. 4 shows a flow diagram illustrating one example of a decoding process 400 that can be performed by the decoder 214. Process 400 starts with input of a video elementary stream data 206 at block 402. The process 400 proceeds to block 404 where the decoder is initialized. Initialization may include a number of tasks, including detection of a video sequence header (VSH), performing first pass VSH, video sequence (VS), and VS Display Extension processing (including video format, color primaries, and matrix coefficients), and allocating data buffers to respectively buffer the decoded picture, associated metadata and closed caption (CC) data. Additionally, the video PES buffer 'read' information 406 provided by the parser 205 is input (e.g., which can be generated by process 300 in block 310 of FIG. 3).

After initialization at block 404, the process 400 proceeds to block 408 where the main processing of the video ES is performed by the decoder 214. Main processing includes polling the video PES buffer 'read' information or "interface" for new data availability, decoding the video ES, reconstructing and storing pixel data at picture boundaries synchronizing, video & a/v generating metadata and storing at picture boundaries, and CC data storing at picture boundaries. The results block 410, of the main processing 408 includes generation of sequence descriptors, decoded picture buffer descriptors, metadata buffer descriptors, and CC data buffer descriptors.

After the main processing 408, process 400 proceeds to block 412 where it performs a termination process. The termination process can include determining termination conditions, including no new data occurring for a particular duration above a predetermined threshold, detection of a sequence end code, and/or detection of an explicit termination signal. The termination process can further include freeing decoded picture, associated metadata, and CC data buffers consequent to their consumption by a preprocessor to be described below. Process 400 ends block 414, where it can enter a state of waiting for video ES to be received as input.

Preprocessor

Figure 6:
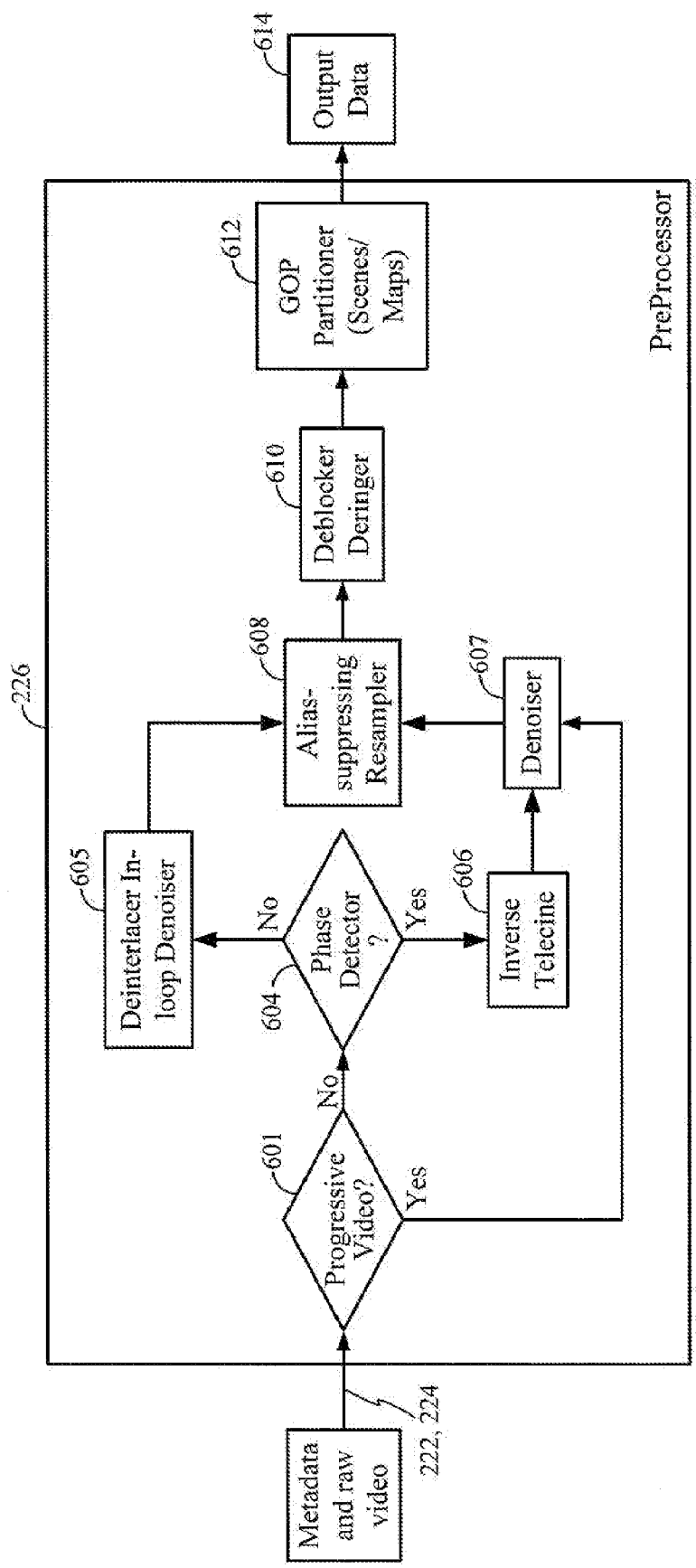
FIG. 6 is a flow diagram illustrating a sequence of operations and functions of a preprocessor that may be used in the transcoder of FIG. 2.

FIG. 2, and in more detail FIG. 6, illustrate a sample aspect of a preprocessor 226 that can use content information for one or more preprocessing operations. Preprocessor 226 receives metadata 222 and decoded "raw" video data 224 from the parser/decoder 202. The preprocessor 226 may be configured to perform certain types of processing on the video data 224 and the metadata 222 and provide processed multimedia (e.g., base layer reference frames, enhancement layer reference frames, bandwidth information, content information) and video to the encoder 228. Such preprocessing of multimedia data can improve the visual clarity, anti-aliasing, and compression efficiency of the data. Generally, the preprocessor 226 receives video sequences provided by the decoder 214 in the parser decoder 202 and converts the video sequences into progressive video sequences for further processing (e.g., encoding) by the encoder 228. In some aspects, the preprocessor 226 can be configured for numerous operations, including inverse telecine, deinterlacing, filtering (e.g., artifact removal, de-ringing, de-blocking, and de-noising), resizing (e.g., spatial resolution down-sampling from standard definition to Quarter Video Graphics Array (QVGA)), and GOP structure generation (e.g., calculating complexity map generation, scene change detection, and fade/flash detection).

The preprocessor 226 can use metadata from the decoder to affect one or more of the preprocessing operations. Metadata can include information relating to, describing, or classifying the content of the multimedia data ("content information"); in particular the metadata can include a content classification. In some aspects, the metadata does not include content information desired for encoding operations. In such cases the preprocessor 226 can be configured to determine content information and use the content information for preprocessing operations and/or provides content information to other components of the transcoder 200, e.g., the decoder 228. In some aspects, the preprocessor 226 can use such content information to influence GOP partitioning, determine appropriate type of filtering, and/or determine encoding parameters that are communicated to an encoder.

FIG. 6 shows an illustrative example of various process blocks that can be included in the preprocessor 226 and illustrates processing that can be performed by the preprocessor 226. In this example, the preprocessor 226 receives metadata and video 222, 224 and provides output data 614 comprising (processed) metadata and video to the encoder 228. Typically, there are three types of video that may be received. First, the received video can be progressive video, where no deinterlacing is required. Second, the video data can be telecined video, interlaced video converted from 24 fps movie sequences, in which case the video. Third, the video can be non-telecined interlaced video. Preprocessor 226 can process these types of video as described below.

At block 601, the preprocessor 226 determines if the received video data 222, 224 is progressive video. In some cases, this can be determined from the metadata if the metadata contains such information, or by processing of the video data itself. For example, an inverse telecine process, described below, can determine if the received video 222 is progressive video. If it is, the process proceeds to block 607 where filtering (e.g., denoiser) operations are performed on the video to reduce noise, such as white Gaussian noise. If the video data 222, 224 is not progressive video, at block 601 the process proceeds to block 604 to a phase detector 604.

Phase detector 604 distinguishes between video that originated in a telecine and that which began in a standard broadcast format. If the decision is made that the video was telecined (the YES decision path exiting phase detector 604), the telecined video is returned to its original format in inverse telecine 606. Redundant frames are identified and eliminated and fields derived from the same video frame are rewoven into a complete image. Since the sequence of reconstructed film images were photographically recorded at regular intervals of ¹/₂₄ of a second, the motion estimation process performed in a GOP partitioner 612 or the decoder 228 is more accurate using the inverse telecined images rather than the telecined data, which has an irregular time base.

Figure 38:
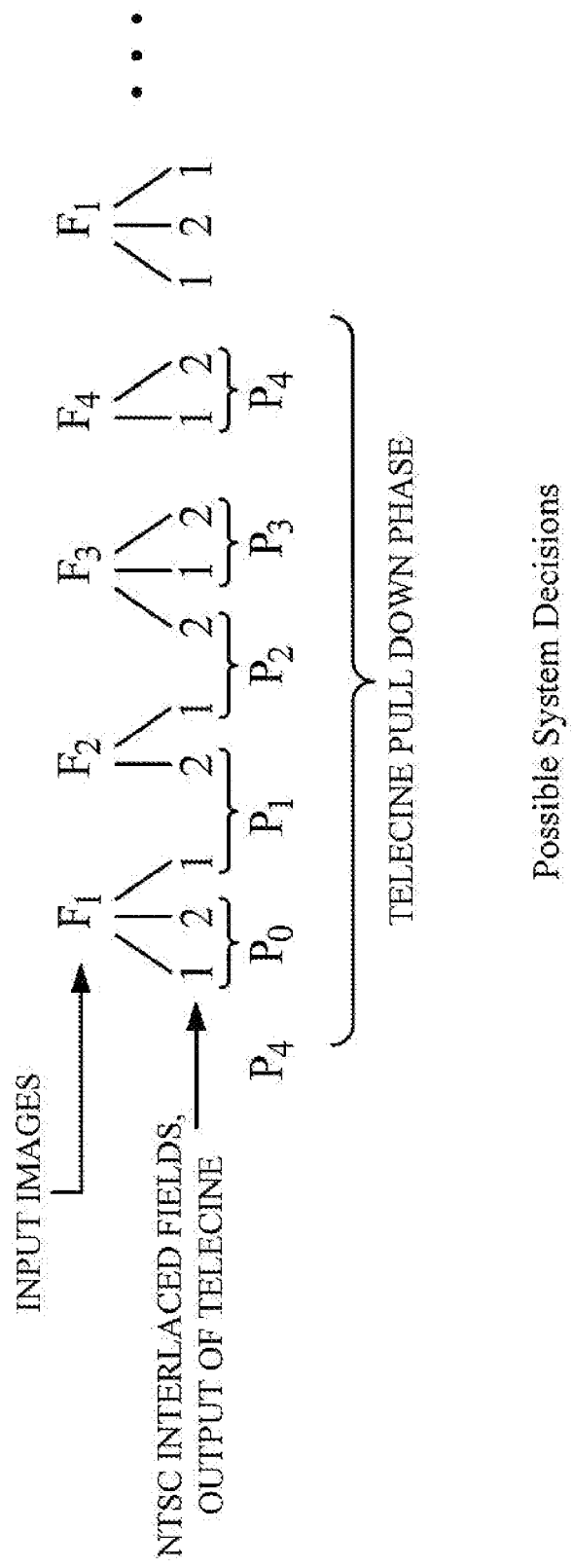
FIG. 38 is a diagram illustrating possible system decisions in an inverse telecine process.

In one aspect, the phase detector 604 makes certain decisions after receipt of a video frame. These decisions include: (i) whether the present video from a telecine output and the 3:2 pull down phase is one of the five phases $P_0, P_1, P_2, P_3$, and $P_4$ shown in FIG. 38; and (ii) the video was generated as conventional NTSC. That decision is denoted as phase $P_5$. These decisions appear as outputs of phase detector 604 shown in FIG. 2. The path from phase detector 604 labeled "YES" actuates the inverse telecine 606, indicating that it has been provided with the correct pull down phase so that it can sort out the fields that were formed from the same photographic image and combine them. The path from phase detector 604 labeled "NO" similarly actuates the deinterlacer 605 to separate an apparent NTSC frame into fields for optimal processing. The phase detector 604 can continuously analyze video frames that because different types of video may be received at any time. As an exemplary, video conforming to the NTSC standard may be inserted into the video as a commercial. After inverse telecine, the resulting progressive video is sent to a denoiser (filter) 607 which can be used to reduce white Gaussian noise.

When conventional NTSC video is recognized (the NO path from phase detector 601), it is transmitted to deinterlacer 605 for compression. The deinterlacer 605 transforms the interlaced fields to progressive video, and denoising operations can then be performed on the progressive video. One illustrative example of deinterlacing processing is described below.

Traditional analog video devices like televisions render video in an interlaced manner, i.e., such devices transmit even-numbered scan lines (even field), and odd-numbered scan lines (odd field). From the signal sampling point of view, this is equivalent to a spatio-temporal subsampling in a pattern described by:

$$F(x, y, n) = \begin{cases} \Theta(x, y, n), & \text{if } y\mod 2 = 0 \text{ for even fields,} \\ \Theta(x, y, n), & \text{if } y\mod 2 = 1 \text{ for odd fields,} \\ \text{Erasure}, & \text{otherwise,} \end{cases} \quad [1]$$

where $\Theta$ stands for the original frame picture, F stands for the interlaced field, and (x, y, n) represents the horizontal, vertical, and temporal position of a pixel respectively.

Without loss of generality, it can be assumed n=0 is an even field throughout this disclosure so that Equation 1 above is simplified as $$F(x, y, n) = \begin{cases} \Theta(x, y, n), & \text{if } y\mod 2 = n\mod 2, \\ \text{Erasure}, & \text{otherwise,} \end{cases} \quad [2]$$

Since decimation is not conducted in the horizontal dimension, the sub-sampling pattern can be depicted in the next n~y coordinate.

The goal of a deinterlacer is to transform interlaced video (a sequence of fields) into non-interlaced progressive frames (a sequence of frames). In other words, interpolate even and odd fields to "recover" or generate full-frame pictures. This can be represented by Equation 3:

$$F_o(x, y, n) = \begin{cases} F(x, y, n), & \text{if } y\mod 2 = n\mod 2, \\ F_i(x, y, n), & \text{otherwise,} \end{cases} \quad [3]$$

where $F_i$ represent deinterlacing results for missing pixels.

Figure 40:
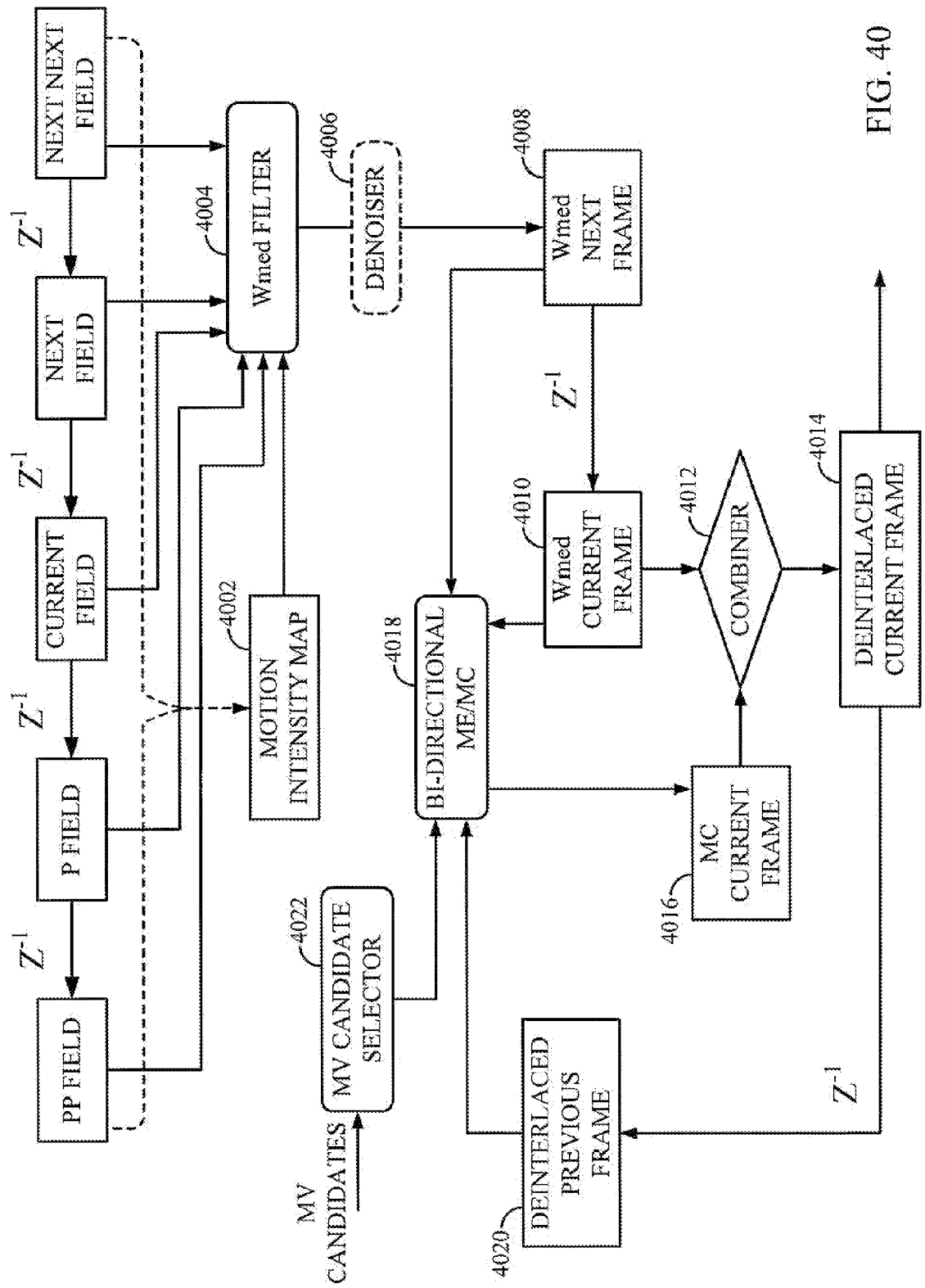
FIG. 40 is a diagram illustrating a spatio-temporal deinterlacing process.

FIG. 40 is a block diagram illustrating certain aspects of an aspect of a deinterlacer 605 that uses Wmed filtering and motion estimation to generate a progressive frame from interlaced multimedia data. The upper part of FIG. 40 shows a motion intensity map 4002 that can be generated using information from a current field, two previous fields (PP Field and P Field), and two subsequent fields (Next Field and Next Next field). The motion intensity map 4002 categorizes, or partitions, the current frame into two or more different motion levels, and can be generated by spatio-temporal filtering, described in further detail hereinbelow. In some aspects, the motion intensity map 4002 is generated to identify static areas, slow-motion areas, and fast-motion areas, as described in reference to Equations 4-8 below. A spatio-temporal filter, e.g., Wmed filter 4004, filters the interlaced multimedia data using criteria based on the motion intensity map, and produces a spatio-temporal provisional deinterlaced frame. In some aspects, the Wmed filtering process involves a horizontal a neighborhood of [−1, 1], a vertical neighborhood of [−3, 3], and a temporal neighborhood of five adjacent fields, which are represented by the five fields (PP Field, P Field, Current Field, Next Field, Next Next Field) illustrated in FIG. 40, with $Z^{-1}$ representing a delay of one field. Relative to the Current Field, the Next Field and the P Field are non-parity fields and the PP Field and the Next Next Field are parity fields. The "neighborhood" used for spatio-temporal filtering refers to the spatial and temporal location of fields and pixels actually used during the filtering operation, and can be illustrated as an "aperture" as shown, for example, in FIGS. 6 and 7.

The deinterlacer 605 can also include a denoiser (denoising filter) 4006 configured to filter the spatio-temporal provisional deinterlaced frame generated by the Wmed filter 4004. Denoising the spatio-temporal provisional deinterlaced frame makes the subsequent motion search process more accurate especially if the source interlaced multimedia data sequence is contaminated by white noise. It can also at least partly remove alias between even and odd rows in a Wmed picture. The denoiser 4006 can be implemented as a variety of filters including a wavelet shrinkage and wavelet Wiener filter based denoiser. A denoiser can be used to remove noise from the candidate Wmed frame before it is further processed using motion compensation information, and can remove noise that is present in the Wmed frame and retain the signal present regardless of the signal's frequency content. Various types of denoising filters can be used, including wavelet filters. Wavelets are a class of functions used to localize a given signal in both space and scaling domains. The fundamental idea behind wavelets is to analyze the signal at different scales or resolutions such that small changes in the wavelet representation produce a correspondingly small change in the original signal.

A wavelet shrinkage or a wavelet Wiener filter can be also be applied as the denoiser. Wavelet shrinkage consists of a wavelet transformation of the noisy signal, followed by a shrinking of the small wavelet coefficients to zero (or smaller value), while leaving the large coefficients unaffected. Finally, an inverse transformation is performed to acquire the estimated signal.

The denoising filtering boosts the accuracy of motion compensation in noisy environments. Wavelet shrinkage denoising can involve shrinking in the wavelet transform domain, and typically comprises three steps: a linear forward wavelet transform, a nonlinear shrinkage denoising, and a linear inverse wavelet transform. The Wiener filter is a MSE-optimal linear filter which can be used to improve images degraded by additive noise and blurring. Such filters are generally known in the art and are described, for example, in "Ideal spatial adaptation by wavelet shrinkage," referenced above, and by S. P. Ghael, A. M. Sayeed, and R. G. Baraniuk, "Improvement Wavelet denoising via empirical Wiener filtering," *Proceedings of SPIE*, vol. 3169, pp. 389-399, San Diego, July 1997, which is expressly incorporated by reference herein in its entirety.

In some aspects, a denoising filter is based on an aspect of a (4, 2) bi-orthogonal cubic B-spline wavelet filter. One such filter can be defined by the following forward and inverse transforms:

$$h(z) = \frac{3}{4} + \frac{1}{2}(z + z^{-1}) + \frac{1}{8}(z + z^{-2}) \text{ (forward transform)} \quad [4]$$

and $$g(z) = \frac{5}{4}z^{-1} - \frac{5}{32}(1 + z^{-2}) - \frac{3}{8}(z + z^{-3}) - \frac{3}{32}(z^2 + z^{-4}) \text{ (inverse transform)} \quad [5]$$

Application of a denoising filter can increase the accuracy of motion compensation in a noisy environment. Implementations of such filters are further described in "Ideal spatial adaptation by wavelet shrinkage," D. L. Donoho and I. M. Johnstone, *Biometrika*, vol. 8, pp. 425-455, 1994, which is expressly incorporated by reference herein in its entirety.

The bottom part of FIG. 40 illustrates an aspect for determining motion information (e.g., motion vector candidates, motion estimation, motion compensation) of interlaced multimedia data. In particular, FIG. 40 illustrates a motion estimation and motion compensation scheme that is used to generate a motion compensated provisional progressive frame of the selected frame, and then combined with the Wmed provisional frame to form a resulting "final" progressive frame, shown as deinterlaced current frame 4014. In some aspects, motion vector ("MV") candidates (or estimates) of the interlaced multimedia data are provided to the deinterlacer from external motion estimators and used to provide a starting point for bi-directional motion estimator and compensator ("ME/MC") 4018. In some aspects, a MV candidate selector 4022 uses previously determined MV's for neighboring blocks for MV candidates of the blocks being processed, such as the MVs of previous processed blocks, for example blocks in a deinterlaced previous frame 4020. The motion compensation can be done bi-directional, based on the previous deinterlaced frame 70 and a next (e.g., future) Wmed frame 4008. A current Wmed frame 4010 and a motion compensated ("MC") current frame 4016 are merged, or combined, by a combiner 4012. A resulting deinterlaced current frame 4014, now a progressive frame, is provided back to the ME/MC 4018 to be used as a deinterlaced previous frame 4020 and also communicated external to the deinterlacer 605 for subsequent processing.

It is possible to decouple deinterlacing prediction schemes comprising inter-field interpolation from intra-field interpolation with a Wmed+MC deinterlacing scheme. In other words, the spatio-temporal Wmed filtering can be used mainly for intra-field interpolation purposes, while inter-field interpolation can be performed during motion compensation. This reduces the peak signal-to-noise ratio of the Wmed result, but the visual quality after motion compensation is applied is more pleasing, because bad pixels from inaccurate inter-field prediction mode decisions will be removed from the Wmed filtering process.

After the appropriate inverse telecine or deinterlacing processing, at block 608 the progressive video is processed for alias suppressing and resampling (e.g., resizing). In some resampling aspects, a poly-phase resampler is implemented for picture size resizing. In one example of downsampling, the ratio between the original and the resized picture can be p/q, where p and q are relatively prime integers. The total number of phases is p. The cutoff frequency of the poly-phase filter in some aspects is 0.6 for resizing factors around 0.5. The cutoff frequency does not exactly match the resizing ratio in order to boost the high-frequency response of the resized sequence. This inevitably allows some aliasing. However, it is well-known that human eyes prefer sharp but a little aliased pictures to blurry and alias-free pictures.

Figure 41:
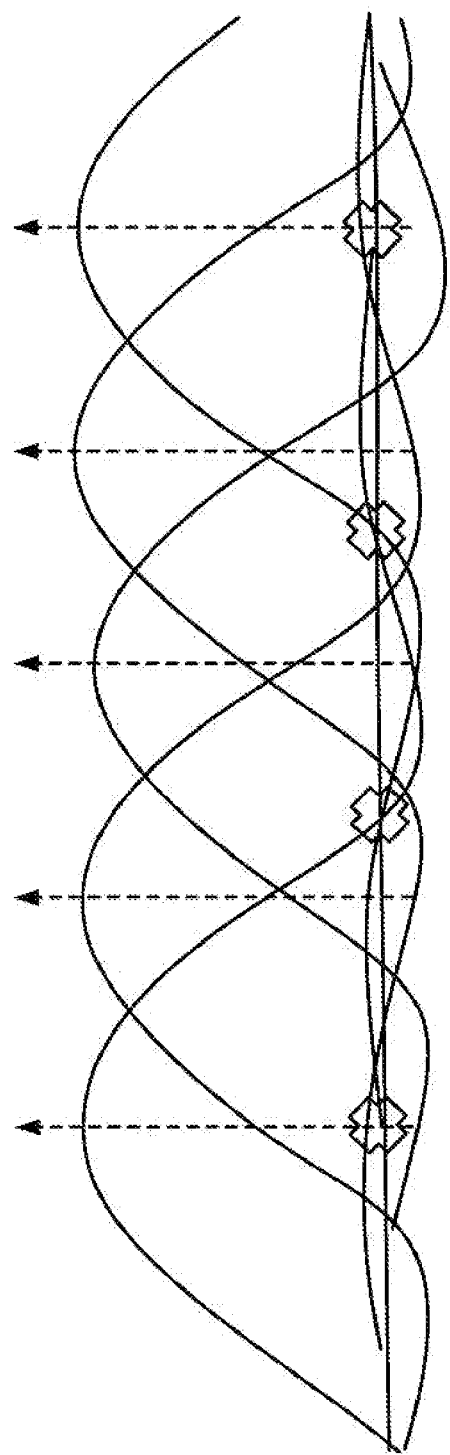
FIG. 41 illustrates an example of 1-D poly-phase resampling.

FIG. 41 illustrates an example of poly-phase resampling, showing the phases if the resizing ration is ¾. The cutoff frequency illustrated in FIG. 41 is ¾ also. Original pixels are illustrated in the above figure with vertical axes. A sinc function is also drawn centered around the axes to represent the filter waveform. Because we choose the cutoff frequency was chosen to be exactly the same as the resampling ration, the zeros of the sinc function overlap the position of the pixels after resizing, illustrated in FIG. 41 with crosses. To find a pixel value after resizing, the contribution can be summed up from the original pixels as shown in the following equation:

$$v(x) = \sum_{i=-\infty}^{\infty} u(i) \times \text{sinc}(\pi f_c(i - x)) \quad [6]$$

where $f_c$ is the cutoff frequency. The above 1-D poly-phase filter can be applied to both the horizontal dimension and the vertical dimension.

Another aspect of resampling (resizing) is accounting for overscan. In an NTSC television signal, an image has 486 scan lines, and in digital video could have 720 pixels on each scan line. However, not all of the entire image is visible on the television due to mismatches between the size and the screen format. The part of the image that is not visible is called overscan.

To help broadcasters put useful information in the area visible by as many televisions as possible, the Society of Motion Picture & Television Engineers (SMPTE) defined specific sizes of the action frame called the safe action area and the safe title area. See SMPTE recommended practice RP 27.3-1989 on *Specifications for Safe Action and Safe Title Areas Test Pattern for Television Systems*. The safe action area is defined by the SMPTE as the area in which "all significant action must take place." The safe title area is defined as the area where "all the useful information can be confined to ensure visibility on the majority of home television receivers."

Figure 25:
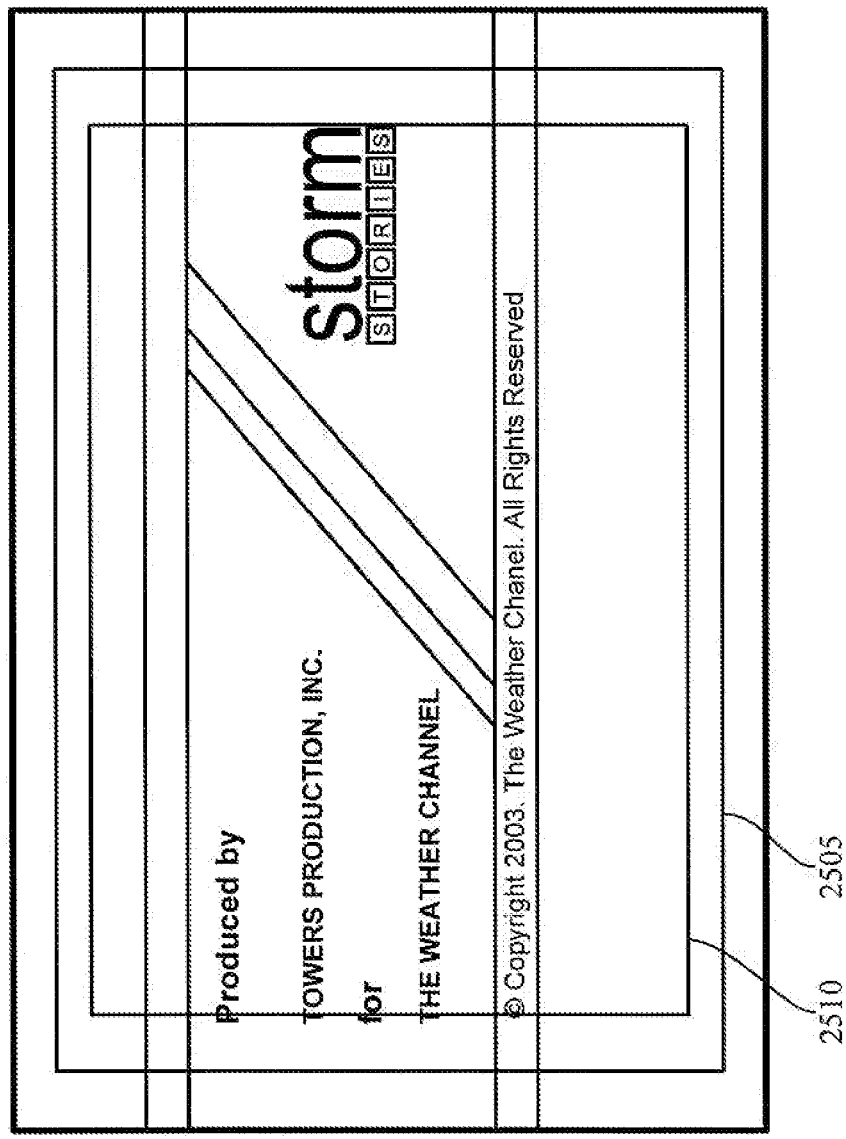
FIG. 25 is a graphic illustrating a safe action area and a safe title area of a frame of data.
Figure 26:
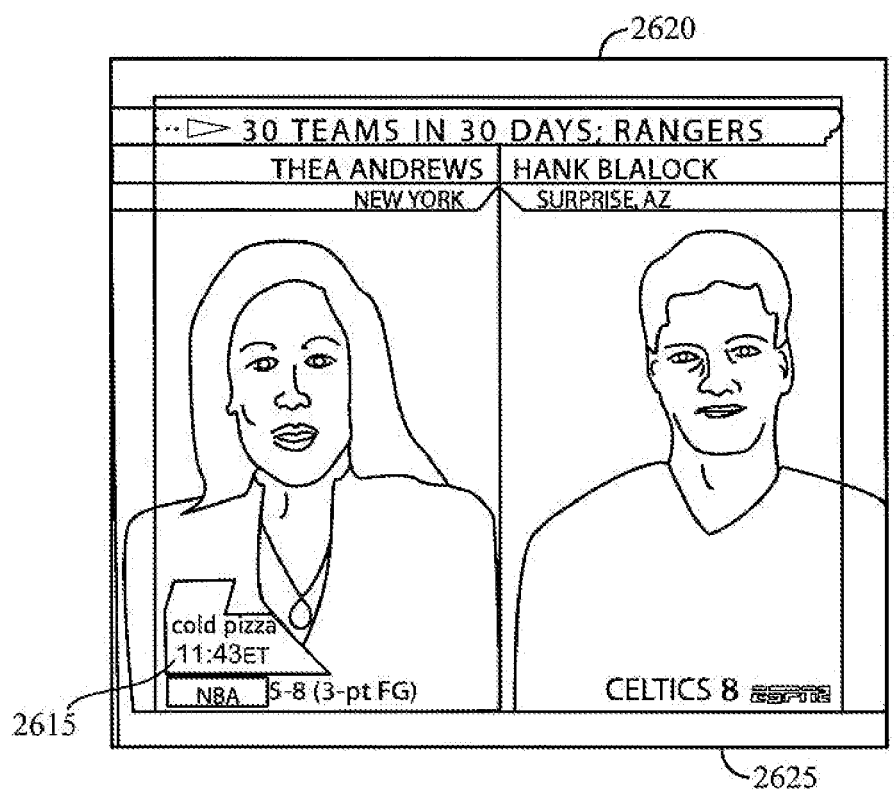
FIG. 26 is a graphic illustrating a safe action area of a frame of data.

For example, referring to FIG. 25, the safe action area 2510 occupies the center 90% of the screen, giving a 5% border all around. The safe title area 2505 occupies the center 80% of the screen, giving a 10% border. Referring now to FIG. 26, because the safe title area is so small, to add more contents in the image, some stations will put text into the safe action area, which is inside the white rectangular window 2615.

Usually black borders may be seen in the overscan. For example, in FIG. 26, black borders appear at the upper side 2620 and lower side 2625 of the image. These black borders can be removed in the overscan, because H.264 video uses boundary extension in motion estimation. Extended black borders can increase the residual. Conservatively, the boundary can be cut by 2%, and then do the resizing. The filters for resizing can be generated accordingly. Truncation is performed to remove the overscan before poly-phase downsampling.

Referring again to FIG. 6, the progressive video then proceeds to block 610 where deblocker and deringing operations are performed. Two types of artifacts, "blocking" and "ringing," commonly occur in video compression applications. Blocking artifacts occur because compression algorithms divide each frame into blocks (e.g., 8×8 blocks). Each block is reconstructed with some small errors, and the errors at the edges of a block often contrast with the errors at the edges of neighboring blocks, making block boundaries visible. In contrast, ringing artifacts appear as distortions around the edges of image features. Ringing artifacts occur because the encoder discards too much information in quantizing the high-frequency DCT coefficients. In some illustrative examples, both deblocking and deringing can use low-pass FIR (finite impulse response) filters to hide these visible artifacts.

Figure 39:
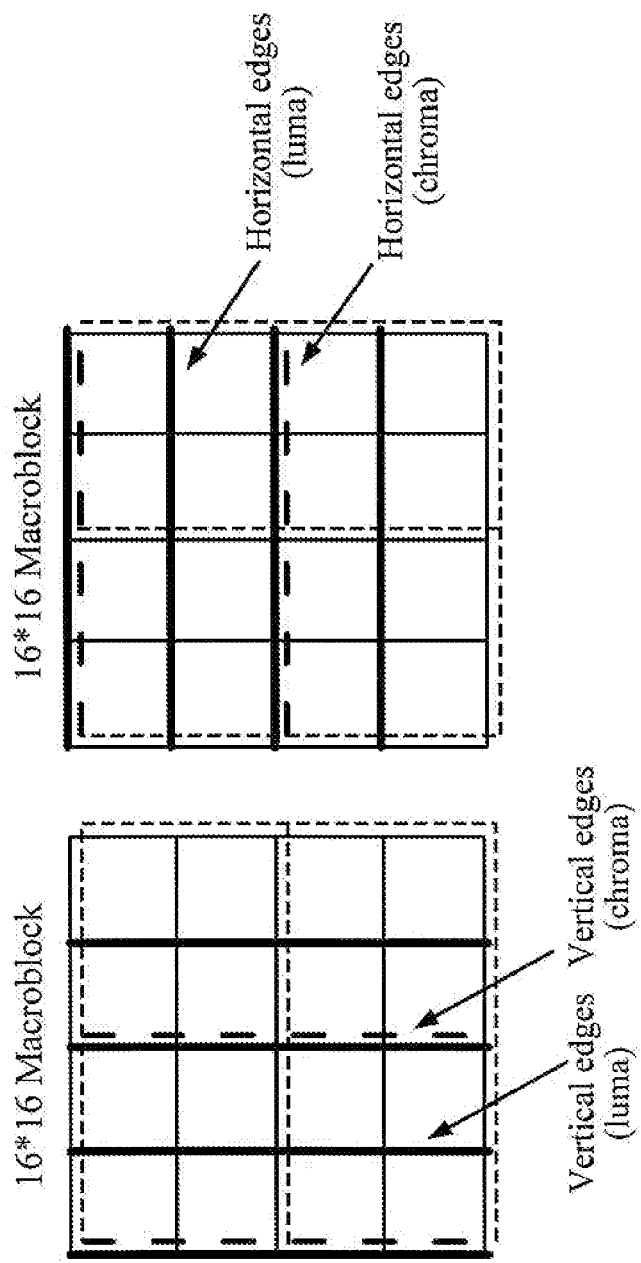
FIG. 39 illustrates boundaries in a macroblock to be filtered by a deblocking process.

In one example of deblocking processing, a deblocking filter can be applied to all the 4×4 block edges of a frame, except edges at the boundary of the frame and any edges for which the deblocking filter process is disabled. This filtering process shall be performed on a macroblock basis after the completion of the frame construction process with all macroblocks in a frame processed in order of increasing macroblock addresses. For each macroblock, vertical edges are filtered first, from left to right, and then horizontal edges are filtered from top to bottom. The luma deblocking filter process is performed on four 16-sample edges and the deblocking filter process for each chroma component is performed on two 8-sample edges, for the horizontal direction and for the vertical direction, as shown in FIG. 39. Sample values above and to the left of the current macroblock that may have already been modified by the deblocking process operation on previous macroblocks shall be used as input to the deblocking filter process on the current macroblock and may be further modified during the filtering of the current macroblock. Sample values modified during filtering of vertical edges can be used as input for the filtering of the horizontal edges for the same macroblock. A deblocking process can be invoked for the luma and chroma components separately.

In an example of deringing processing, a 2-D filter can be adaptively applied to smooth out areas near edges. Edge pixels undergo little or no filtering in order to avoid blurring.

GOP Partitioner

After deblocking and deringing, the progressive video is processed by a GOP partitioner 612. GOP positioning can include detecting shot changes, generating complexity maps (e.g., temporal, spatial bandwidth maps), and adaptive GOP partitioning. These are each described below.

A. Scene Change Detection

Shot detection relates to determining when a frame in a group of pictures (GOP) exhibits data that indicates a scene change has occurred. Generally, within a GOP, the frames may have no significant changes in any two or three (or more) adjacent frames, or there may be slow changes, or fast changes. Of course, these scene change classifications can be further broken down to a greater level of changes depending on a specific application, if necessary.

Detecting shot or scene changes is important for efficient encoding of video. Typically, when a GOP is not changing significantly, an I-frame at the beginning of the GOP is followed by a number of predictive frames can sufficiently encode the video so that subsequent decoding and display of the video is visually acceptable. However, when a scene is changing, either abruptly or slowly, additional I-frames and less predictive encoding (P-frames and B-frames) may be used to produce subsequently decoded visually acceptable results.

Shot detection and encoding systems and methods that improve the performance of existing encoding systems are described below. Such aspects can be implemented in the GOP partitioner 612 of the preprocessor 226 (FIG. 7), or included in an encoder device that may operate with or without a preprocessor. Such aspects utilizes statistics (or metrics) that include statistical comparisons between adjacent frames of video data to determine if an abrupt scene change occurred, a scene is slowly changing, or if there are camera flashlights in the scene which can make video encoding especially complex. The statistics can be obtained from a preprocessor and then sent to an encoding device, or they can be generated in an encoding device (e.g., by a processor configured to perform motion compensation). The resulting statistics aid scene change detection decision. In a system that does transcoding, often a suitable preprocessor or configurable processor exists. If the preprocessor perform motion-compensation aided deinterlacing, the motion compensation statistics are available and ready to use. In such systems, a shot detection algorithm may slightly increases system complexity.

The illustrative example of a shot detector described herein only needs to utilize statistics from a previous frame, a current frame, and a next frame, and accordingly has very low latency. The shot detector differentiates several different types of shot events, including abrupt scene change, cross-fading and other slow scene change, and camera flashlight.

By determining different type of shot events with different strategies in the encoder, the encoding efficiency and visual quality is enhanced.

Scene change detection can be used for any video coding system for it to intelligently conserve bits by inserting an I-frame at a fixed interval. In some aspects, the content information obtained by the preprocessor (e.g., either incorporated in metadata or calculated by the preprocessor 226) can be used for scene change detection. For example, depending on the content information, threshold values and other criteria described below may be dynamically adjusted for different types of video content.

Video encoding usually operates on a structured group of pictures (GOP). A GOP normally starts with an intra-coded frame (I-frame), followed by a series of P (predictive) or B (bi-directional) frames. Typically, an I-frame can store all the data required to display the frame, a B-frame relies on data in the preceding and following frames (e.g., only containing data changed from the preceding frame or is different from data in the next frame), and a P-frame contains data that has changed from the preceding frame. In common usage, I-frames are interspersed with P-frames and B-frames in encoded video. In terms of size (e.g., number of bits used to encode the frame), I-frames are typically much larger than P-frames, which in turn are larger than B-frames. For efficient encoding, transmission and decoding processing, the length of a GOP should be long enough to reduce the efficient loss from big I-frames, and short enough to fight mismatch between encoder and decoder, or channel impairment. In addition, macro blocks (MB) in P frames can be intra coded for the same reason.

Scene change detection can be used for a video encoder to determine a proper GOP length and insert I-frames based on the GOP length, instead of inserting an often unneeded I-frame at a fixed interval. In a practical streaming video system, the communication channel is usually impaired by bit errors or packet losses. Where to place I frames or I MBs may significantly impact decoded video quality and viewing experience. One encoding scheme is to use intra-coded frames for pictures or portions of pictures that have significant change from collocated previous pictures or picture portions. Normally these regions cannot be predicted effectively and efficiently with motion estimation, and encoding can be done more efficiently if such regions are exempted from inter-frame coding techniques (e.g., encoding using B-frames and P-frames). In the context of channel impairment, those regions are likely to suffer from error propagation, which can be reduced or eliminated (or nearly so) by intra-frame encoding.

Portions of the GOP video can be classified into two or more categories, where each region can have different intra-frame encoding criteria that may depend on the particular implementation. As an example, the video can be classified into three categories: abrupt scene changes, cross-fading and other slow scene changes, and camera flashlights.

Abrupt scene changes includes frames that are significantly different from the previous frame, usually caused by a camera operation. Since the content of these frames is different from that of the previous frame, the abrupt scene change frames should be encoded as I frames.

Cross-fading and other slow scene changes includes slow switching of scenes, usually caused by computer processing of camera shots. Gradual blending of two different scenes may look more pleasing to human eyes, but poses a challenge to video coding. Motion compensation cannot reduce the bitrate of those frames effectively, and more intra MBs can be updated for these frames.

Camera flashlights, or camera flash events, occur when the content of a frame includes camera flashes. Such flashes are relatively short in duration (e.g., one frame) and extremely bright such that the pixels in a frame portraying the flashes exhibit unusually high luminance relative to a corresponding area on an adjacent frame. Camera flashlights shift the luminance of a picture suddenly and swiftly. Usually the duration of a camera flashlight is shorter than the temporal masking duration of the human vision system (HVS), which is typically defined to be 44 ms. Human eyes are not sensitive to the quality of these short bursts of brightness and therefore they can be encoded coarsely. Because the flashlight frames cannot be handled effectively with motion compensation and they are bad prediction candidate for future frames, coarse encoding of these frames does not reduce the encoding efficiency of future frames. Scenes classified as flashlights should not be used to predict other frames because of the "artificial" high luminance, and other frames cannot effectively be used to predict these frames for the same reason. Once identified, these frames can be taken out because they can require a relatively high amount of processing. One option is to remove the camera flashlight frames and encode a DC coefficient in their place; such a solution is simple, computationally fast and saves many bits.

When any of the above categories if frames are detected, a shot event is declared. Shot detection is not only useful to improve encoding quality, it can also aid in identifying video content searching and indexing. One illustrative aspect of a scene detection process is described hereinbelow. In this example, a shot detection process first calculates information, or metrics, for a selected frame being processed for shot detection. The metrics can include information from bi-directional motion estimation and compensation processing of the video, and other luminance-based metrics.

Figure 29:
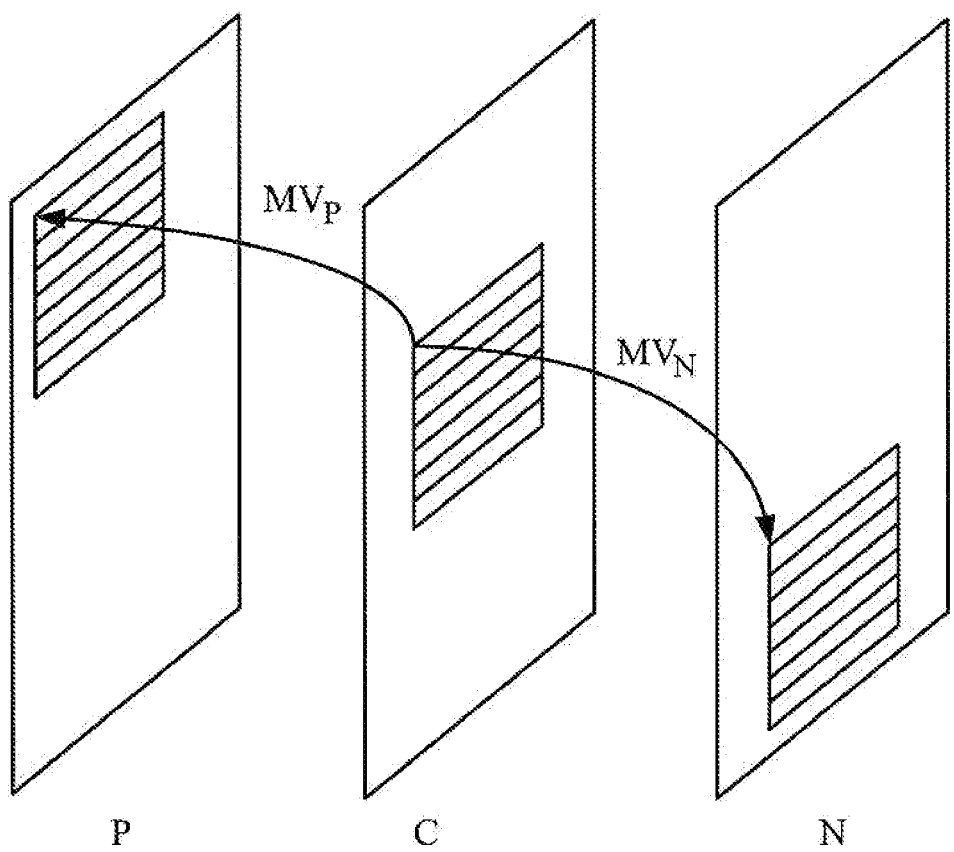
FIG. 29 illustrates motion compensation vectors between a current frame and a previous frame $MV_P$ and a current frame and a next frame $MV_N$.

To perform bi-directional motion estimation/compensation, a video sequence can be preprocessed with a bi-directional motion compensator that matches every 8×8 block of the current frame with blocks in two of the frames most adjacent neighboring frames, one in the past, and one in the future. The motion compensator produces motion vectors and difference metrics for every block. FIG. 29 is an illustration which shows an example of matching pixels of a current frame C to a past frame P and a future (or next) frame N, and depicts motion vectors to the matched pixels (past motion vector $MV_P$ and future motion vector $MV_N$. A general description of bi-directional motion vector generation and related encoding is generally described hereinbelow in reference to FIG. 32.

After determining bi-directional motion information (e.g., motion information which identifies MBs (best matched) in corresponding adjacent frames, additional metrics can be generated (e.g., by a motion compensator in the GOP partitioner 612 or another suitable component) by various comparisons of the current frame to the next frame and the previous frame. The motion compensator can produce a difference metric for every block. The difference metric can be a sum of square difference (SSD) or a sum of absolute difference (SAD). Without loss of generality, here SAD is used as an example.

For every frame, a SAD ratio, also referred to as a "contrast ratio," is calculated as below:

$$\gamma = \frac{\varepsilon + SAD_P}{\varepsilon + SAD_N} \qquad [6]$$

where $SAD_P$ and $SAD_N$ are the sum of absolute differences of the forward and the backward difference metric, respectively. It should be noted that the denominator contains a small positive number $\epsilon$ to prevent the "divide-by-zero" error. The nominator also contains an $\epsilon$ to balance the effect of the unity in the denominator. For example, if the previous frame, the current frame, and the next frame are identical, motion search should yield $SAD_P=SAD_N=0$. In this case, the above calculation generators $\gamma=1$ instead of 0 or infinity.

A luminance histogram can be calculated for every frame. Typically the multimedia images have a luminance depth (e.g., number of "bins") of eight bits. The luminance depth used for calculating the luminance histogram according to some aspects can be set to 16 to obtain the histogram. In other aspects, the luminance depth can be set to an appropriate number which may depend upon the type of data being processed, the computational power available, or other predetermined criteria. In some aspects, the luminance depth can be set dynamically based on a calculated or received metric, such as the content of the data.

The equation below illustrates one example of calculating a luminance histogram difference (lambda):

$$\lambda = \sum_{i=1}^{16} |N_{Pi} - N_{Ci}|/N \quad [7]$$

where $N_{Pi}$ is the number of blocks in the $i^{th}$ bin for the previous frame, and $N_{Ci}$ is the number of blocks in the $i^{th}$ bin for the current frame, and N is the total number of blocks in a frame. If the luminance histogram difference of the previous and the current frame are completely dissimilar (or disjoint), then $\lambda=2$.

Using this information, a frame difference metric (D) is calculated as follows:

$$D = \frac{\gamma_C}{\gamma_P} + A\lambda(2\lambda+1) \quad [8]$$

where A is a constant chosen by application, $$\gamma_C = \frac{\varepsilon + SAD_P}{\varepsilon + SAD_N}, \text{ and } \gamma_P = \frac{\varepsilon + SAD_{PP}}{\varepsilon + SAD_C}.$$

The selected (current) frame is classified as an abrupt scene change frame if the frame difference metric meets the criterion shown in Equation 9:

$$D = \frac{\gamma_C}{\gamma_P} + A\lambda(2\lambda+1) \geq T_1 \quad [9]$$

where A is a constant chosen by application, and $T_1$ is a threshold.

In one example simulation shows, setting A=1, and $T_1=5$ achieve good detection performance. If the current frame is an abrupt scene change frame, then $\gamma_C$ should be large and $\gamma_P$ should be small. The ratio $$\frac{\gamma_C}{\gamma_P}$$

can be used instead of $\gamma_C$ alone so that the metric is normalized to the activity level of the context.

Figure 16:
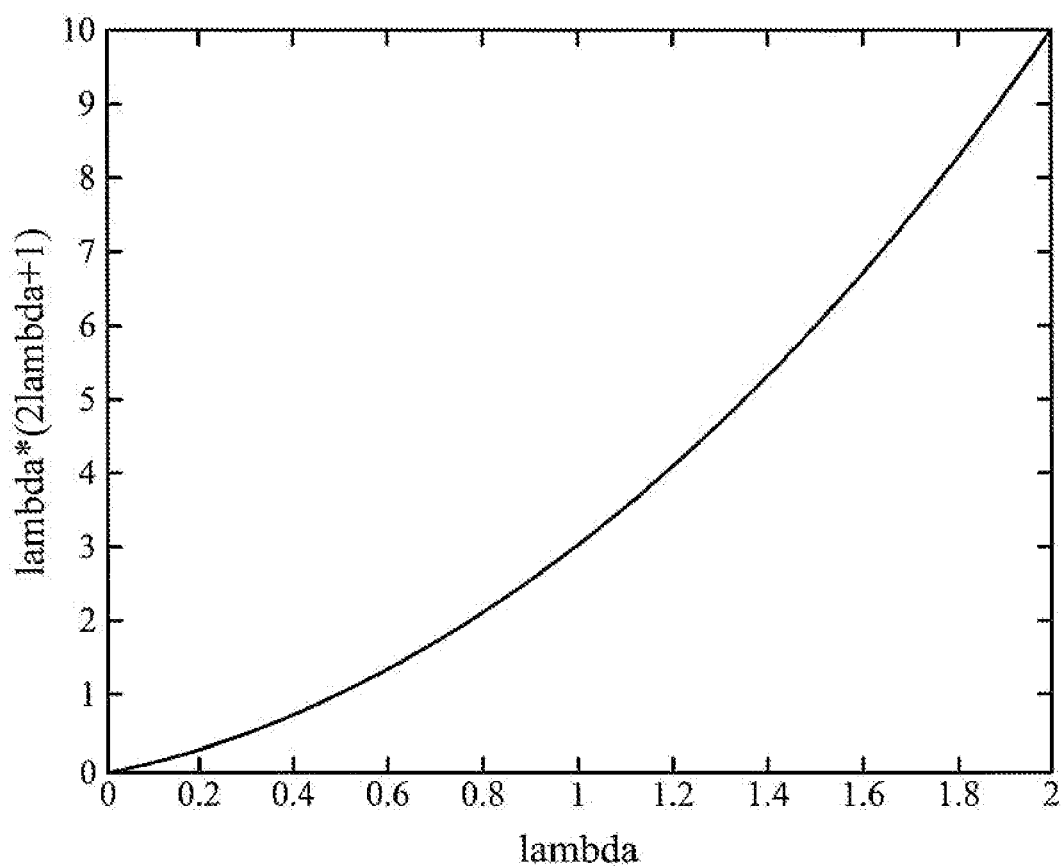
FIG. 16 is a graph illustrating a non-linear scene detection formula.

It should be noted that the above criterion uses the luminance histogram difference lambda ($\lambda$) in a non-linear way. FIG. 16 illustrates $\lambda*(2\lambda+1)$ is a convex function. When $\lambda$ is small (e.g., close to zero), it is barely preemphasis. The larger $\lambda$ becomes, the more emphasis is conducted by the function. With this pre-emphasis, for any $\lambda$ larger than 1.4, an abrupt scene change is detected if the threshold $T_1$ is set at 5.

The current frame is determined to be a cross-fading or slow scene change if the scene strength metric D meets the criterion shown in Equation 5:

$$T_2 \leq D < T_1 \quad [10]$$

for a certain number of continuous frames, where $T_1$ is the same threshold used above and $T_2$ is another threshold value.

A flashlight event usually causes the luminance histogram to shift to brighter side. In this illustrative aspect camera, the luminance histogram statistics are used to determine if the current frame comprises camera flashlights. A shot detection process can determine if the luminance of the current frame minus is greater than the luminance of the previous frame by a certain threshold $T_3$, and the luminance of the current frame is greater than the luminance of the next frame by the threshold $T_3$, as shown in Equations 11 and 12:

$$\overline{Y}_C - \overline{Y}_P \geq T_3 \quad [11]$$

$$\overline{Y}_C - \overline{Y}_N \geq T_3 \quad [12]$$

If the above criterion are not met, the current frame is not classified as comprising camera flashlights. If the criterion is met, the shot detection process determines if a backwards difference metric $SAD_P$ and the forward difference metric $SAD_N$ are greater than a certain threshold T4, as illustrated in the Equations below:

$$SAD_P \geq T_4 \quad [13]$$

$$SAD_N \geq T_4 \quad [14]$$

where $\overline{Y}_C$ is the average luminance of the current frame, $\overline{Y}_P$ is the average luminance of the previous frame, $\overline{Y}_N$ is the average luminance of the next frame, and SADP and SADN are the forward and backward difference metrics associated with the current frame.

The shot detection process determines camera flash events by first determining if the luminance of a current frame is greater than the luminance of the previous frame and the luminance of the next frame. If not, the frame is not a camera flash event; but if so it may be. The shot detection process then can evaluate whether the backwards difference metric is greater than a threshold $T_3$, and if the forwards difference metric is greater than a threshold $T_4$; if both these conditions are satisfied, the shot detection process classifies the current frame as having camera flashlights. If the criterion is not met, the frame is not classified as any type of shot even, or it can be given a default classification that identifies the encoding to be done on the frame (e.g., drop frame, encode as I-frame).

Some exemplary values for $T_1$, $T_2$, $T_3$, and $T_4$ are shown above. Typically, these threshold values are selected through testing of a particular implementation of shot detection. In some aspects, one or more of the threshold values $T_1, T_2, T_3$, and $T_4$ are predetermined and such values are incorporated into the shot classifier in the encoding device. In some aspects, one or more of the threshold values $T_1, T_2, T_3$, and $T_4$ can be set during processing (e.g., dynamically) based on using information (e.g., metadata) supplied to the shot classifier or based on information calculated by the shot classifier itself.

Figure 30:
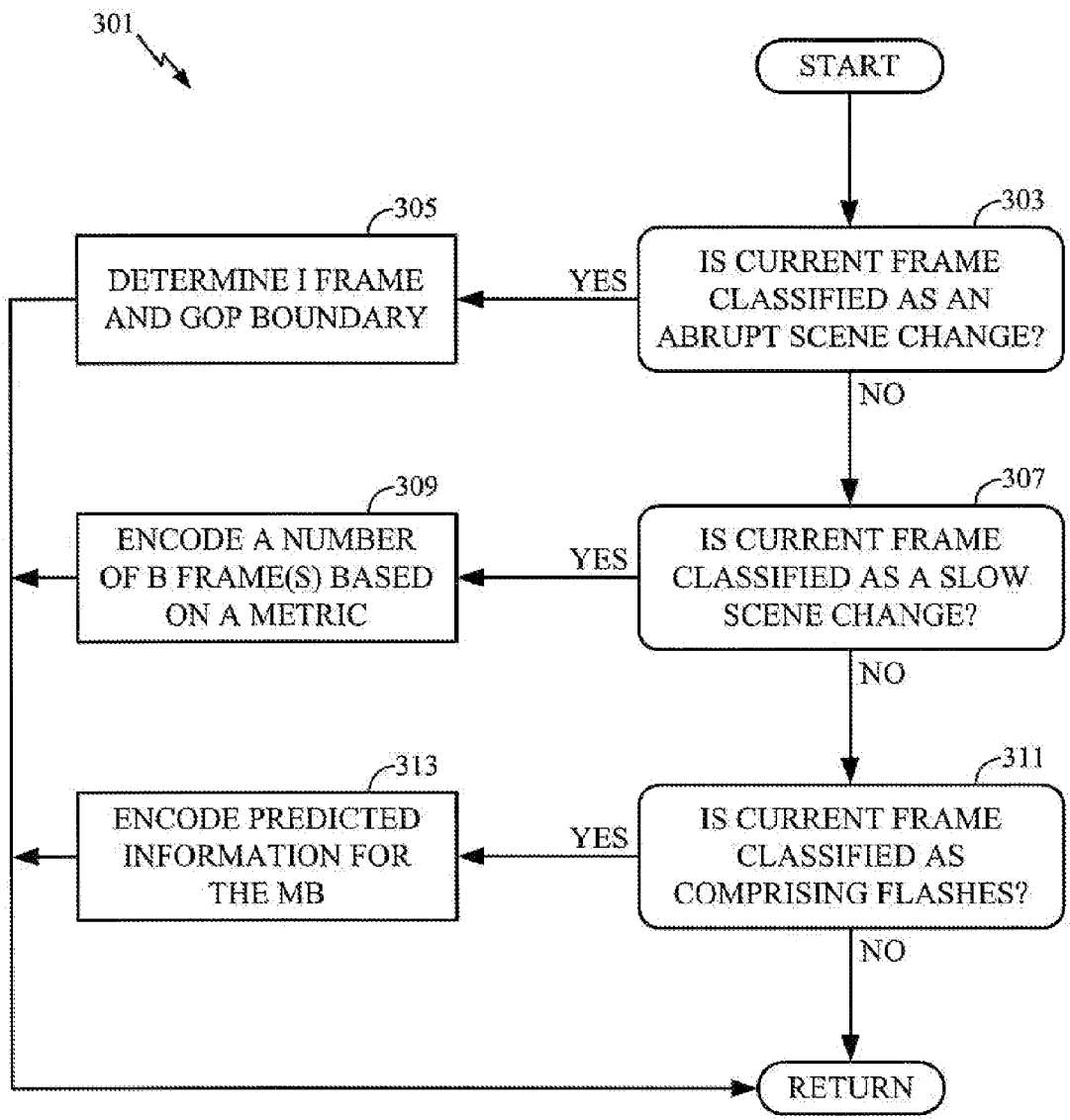
FIG. 30 is a flow diagram illustrating shot detection.

Encoding the video using the shot detection information is typically performed in the encoder, but is described here for completeness of the shot detection disclosure. Referring to FIG. 30, an encoding process 301 can use the shot detection information to encode the video based upon the detected shots in the sequence of frames. Process 301 proceeds to block 303, and checks to see if the current frame is classified as an abrupt scene change. If so, at block 305 the current frame can be encoded as an I-frame and a GOP boundary can be determined. If not, process 301 proceeds to block 307; if the current frame is classified as a portion of a slowly changing scene at block 309 the current frame, and other frames in the slow changing scene can be encoded as a predictive frame (e.g., P-frame or B-frame). Process 301 then proceeds to block 311 where it checks if the current frame is be classified as a flashlight scene comprising camera flashes. If so, at block 313 the frame can be identified for special processing, for example, removal or encoding a DC coefficient for the frame; if not, no classification of the current frame was made and the current frame can be encoded in accordance with other criteria, encoded as an I-frame, or dropped.

In the above-described aspect, the amount of difference between the frame to be compressed and its adjacent two frames is indicated by a frame difference metric D. If a significant amount of a one-way luminance change is detected, it signifies a cross-fade effect in the frame. The more prominent the cross-fade is, the more gain may be achieved by using B-frames. In some aspects, a modified frame difference metric is used as shown in the equation below:

$$D_1 = \begin{cases} \left(1 - \alpha + 2\alpha \frac{|d_P - d_N|}{d_P + d_N}\right) \times D, & \text{if } Y_P - \Delta \geq Y_C \geq Y_N + \Delta \text{ or} \\ & Y_P + \Delta \leq Y_C \leq Y_N - \Delta, \\ D, & \text{otherwise,} \end{cases} \quad [15]$$

where $d_P = |Y_C - Y_P|$ and $d_N = |Y_C - Y_N|$ are the luma difference between the current frame and the previous frame, and the luma difference between the current frame and the next frame, respectively, $\Delta$ represents a constant that can be determined in normal experimentation as it can depend on the implementation, and $\alpha$ is a weighting variable having a value between 0 and 1.

B. Bandwidth Map Generation

The preprocessor 226 (FIG. 6) can also be configured to generate a bandwidth map which can be used for encoding the multimedia data. In some aspects, a content classification module 712 in the encoder 228 (FIG. 7) generates the bandwidth map instead.

Figure 15:
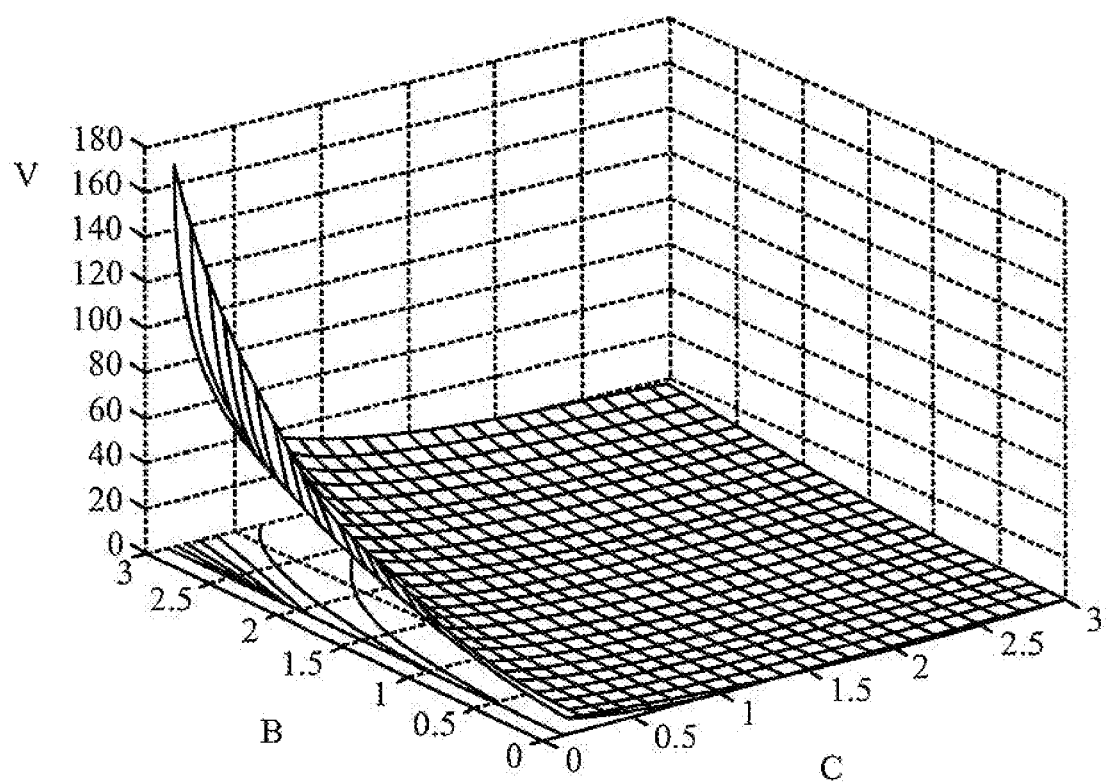
FIG. 15 is a graph illustrating the relationship between the encoding complexity, allocated bits, and human visual quality.

Human visual quality V can be a function of both encoding complexity C and allocated bits B (also referred to as bandwidth). FIG. 15 is a graph illustrating this relationship. It should be noted that the encoding complexity metric C considers spatial and temporal frequencies from the human vision point of view. For distortions more sensitive to human eyes, the complexity value is correspondingly higher. It can typically be assume that V is monotonically decreasing in C, and monotonically increasing in B.

To achieve constant visual quality, a bandwidth ($B_i$) is assigned to the $i^{th}$ object (frame or MB) to be encoded that satisfies the criteria expressed in the two equations immediately below:

$$B_i = B(C_i, V) \quad [16]$$

$$B = \sum_i B_i \quad [17]$$

In the two equations immediately above, $C_i$ is the encoding complexity of the $i^{th}$ object, B is the total available bandwidth, and V is the achieved visual quality for an object. Human visual quality is difficult to formulate as an equation. Therefore, the above equation set is not precisely defined. However, if it is assumed that the 3-D model is continuous in all variables, bandwidth ratio ($B_i/B$) can be treated as unchanged within the neighborhood of a (C, V) pair. The bandwidth ratio Pi is defined in the equation shown below:

$$\beta_i = B_i/B \quad [18]$$

Bit allocation can then be defined as expressed in the following equations:

$$\beta_i = \beta(C_i)$$

$$1 = \sum_i \beta_i \text{ for } (C_i, V) \in \delta(C_0, V_0) \quad [19]$$

where $\delta$ indicates the "neighborhood."

The encoding complexity is affected by human visual sensitivity, both spatial and temporal. Girod's human vision model is an example of a model that can be used to define the spatial complexity. This model considers the local spatial frequency and ambient lighting. The resulting metric is called $D_{csat}$. At a pre-processing point in the process, whether a picture is to be intra-coded or inter-coded is not known and bandwidth ratios for both are generated. Bits are allocated according to the ratio between $\beta_{INTRA}$ of different video objects. For intra-coded pictures, the bandwidth ratio is expressed in the following equation:

$$\beta_{INTRA} = \beta_{0INTRA} \log_{10}(1 + \alpha_{INTRA} Y^2 D_{csat}) \quad [20]$$

In the equation above, Y is the average luminance component of a macroblock, $\alpha_{INTRA}$ is a weighing factor for the luminance square and $D_{csat}$ term following it, $\beta_{0INTRA}$ is a normalization factor to guarantee $$1 = \sum_i \beta_i.$$

For example, a value for $\alpha_{INTRA} = 4$ achieves good visual quality. Content information (e.g., a content classification) can be used to set $\alpha_{INTRA}$ to a value that corresponds to a desired good visual quality level for the particular content of the video. In one example, if the video content comprises a "talking head" news broadcast, the visual quality level may be set lower because the information image or displayable portion of the video may be deemed of less importance than the audio portion, and less bits can be allocated to encode the data. In another example, if the video content comprises a sporting event, content information may be used to set $\alpha_{INTRA}$ to a value that corresponds to a higher visual quality level because the displayed images may be more important to a viewer, and accordingly more bits can be allocated to encode the data.

To understand this relationship, it should be noted that bandwidth is allocated logarithmically with encoding complexity. The luminance squared term $Y^2$ reflects the fact that coefficients with larger magnitude use more bits to encode. To prevent the logarithm from getting negative values, unity is added to the term in the parenthesis. Logarithms with other bases can also be used.

The temporal complexity is determined by a measure of a frame difference metric, which measures the difference between two consecutive frames taking into account the amount of motion (e.g., motion vectors) along with a frame difference metric such as the sum of the absolute differences (SAD).

Bit allocation for inter-coded pictures can consider spatial as well as temporal complexity. This is expressed below:

$$\beta_{INTER} = \beta_{0INTER} \log_{10}(1 + \alpha_{INTER} \cdot SSD \cdot D_{csat} exp(-\gamma \|MV_P + MV_N\|^2)) \quad [21]$$

In the above equation, $MV_P$ and $MV_N$ are the forward and the backward motion vectors for the current MB (see FIG. 29). It can be noted that $Y^2$ in the intra-coded bandwidth formula is replaced by sum of squared differences (SSD). To understand the role of $\|\mu MV_P + MV_N\|^2$ in the above equation, note the next characteristics of human visual system: areas undergoing smooth, predictable motion (small $\|\mu MV_P + MV_N\|^2$) attract attention and can be tracked by the eye and typically cannot tolerate any more distortion than stationary regions. However, areas undergoing fast or unpredictable motion (large $\mu MV_P + MV_N \mu^2$) cannot be tracked and can tolerate significant quantization. Experiments show that $\alpha_{INTER}=1$, $\gamma=0.001$ achieves good visual quality.

C. Adaptive GOP Partitioning

In another illustrative example of processing that may be performed by the preprocessor 226, the GOP Partitioner 612 of FIG. 6 can also adaptively change the composition of a group of pictures coded together, and is discussed in reference to an example using MPEG2. Some older video compression standards (e.g., MPEG2) does not require that a GOP have a regular structure, though one can be imposed. The MPEG2 sequence always begins with an I frame, i.e., one which has been encoded without reference to previous pictures. The MPEG2 GOP format is usually prearranged at the encoder by fixing the spacing in the GOP of the P or predictive pictures that follow the I frame. P frames are pictures that have been in part predicted from previous I or P pictures. The frames between the starting I frame, and the succeeding P frames are encoded as B-frames. A "B" frame (B stands for bi-directional) can use the previous and next I or P pictures either individually or simultaneously as reference. The number of bits needed to encode an I frame on the average exceeds the number of bits needed to encode a P frame; likewise the number of bits needed to encode a P frame on the average exceeds that required for a B-frame. A skipped frame, if it is used, would require no bits for its representation.

The concept underlying the use of P and B-frames, and in more recent compression algorithms, the skipping of frames to reduce the rate of the data needed to represent the video is the elimination of temporal redundancy. When temporal redundancy is high—i.e., there is little change from picture to picture—use of P, B, or skipped pictures efficiently represents the video stream, because I or P pictures decoded earlier are used later as references to decode other P or B pictures.

Adaptive GOP partitioning is based on using this concept adaptively. Differences between frames are quantified and a decision to represent the picture by a I, P, B, or skipped frame is automatically made after suitable tests are performed on the quantified differences. An adaptive structure has advantages not available in a fixed GOP structure. A fixed structure would ignore the possibility that little change in content has taken place; an adaptive procedure would allow far more B-frames to be inserted between each I and P, or two P frames, thereby reducing the number of bits needed to adequately represent the sequence of frames. Conversely when the change in video content is significant, the efficiency of P frames is greatly reduced because the difference between the predicted and the reference frames is too large. Under these conditions, matching objects may fall out of the motion search regions, or the similarity between matching objects is reduced due to distortion caused by changes in camera angle. At that point the P frames or the I and its adjacent P frame should be chosen to be closer to each other and fewer B-frames should be inserted. A fixed GOP could not make that adjustment.

In the system disclosed here, these conditions are automatically sensed. The GOP structure is flexible and is made to adapt to these changes in content. The system evaluates a frame difference metric, which can be thought of as measure of distance between frames, with the same additive properties of distance. In concept, given frames $F_1$, $F_2$, and $F_3$ having the inter-frame distances $d_{12}$ and $d_{23}$, the distance between $F_1$ and $F_3$ is taken as being at least $d_{12}+d_{23}$. Frame assignments are made on the basis of this distance-like metric.

The GOP partitioner operates by assigning picture types to frames as they are received. The picture type indicates the method of prediction that may be required in coding each block:

I-pictures are coded without reference to other pictures. Since they stand alone they provide access points in the data stream where decoding can begin. An I encoding type is assigned to a frame if the "distance" to its predecessor frame exceeds a scene change threshold.

P-pictures can use the previous I or P pictures for motion compensated prediction. They use blocks in the previous fields or frames that may be displaced from the block being predicted as a basis for encoding. After the reference block is subtracted from the block being considered, the residual block is encoded, typically using the discrete cosine transform for the elimination of spatial redundancy. A P encoding types is assigned to a frame if the "distance" between it and the last frame assigned to be a P frame exceeds a second threshold, which is typically less than the first.

B-frame pictures can use the previous and next P- or I-pictures for motion compensation as described above. A block in a B picture can be forward, backward or bi-directionally predicted; or it could be intra-coded without reference to other frames. In H.264 a reference block can be a linear combination of as many as 32 blocks from as many frames. If the frame cannot be assigned to be an I or P type, it is assigned to be a B type, if the "distance" from it to its immediate predecessor is greater than a third threshold, which typically is less than the second threshold.

If the frame cannot be assigned to become a B-frame encoded, it is assigned to "skip frame" status. This frame can be skipped because it is virtually a copy of a previous frame.

Evaluating a metric that quantifies the difference between adjacent frames in the display order is the first part of this processing that takes place. This metric is the distance referred to above; with it, every frame is evaluated for its proper type. Thus, the spacing between the I and adjacent P, or two successive P frames, can be variable. Computing the metric begins by processing the video frames with a block-based motion compensator, a block being the basic unit of video compression, composed usually of 16×16 pixels, though other block sizes such as 8×8, 4×4 and 8×16 are possible. For frames consisting of two deinterlaced fields, the motion compensation can be done on a field basis, the search for the reference blocks taking place in fields rather than frames. For a block in the first field of the current frame a forward reference block is found in fields of the frame that follows it; likewise a backward reference block found in fields of the frame that immediately precedes the current field. The current blocks are assembled into a compensated field. The process continues with the second field of the frame. The two compensated fields are combined to form a forward and a backward compensated frame.

For frames created in the inverse telecine 606, the search for reference blocks is on a frame basis only, since only reconstructed film frames. Two reference blocks and two differences, forward and backward, are found, leading also to a forward and backward compensated frame. In summary, the motion compensator produces motion vectors and difference metrics for every block; but a block is part of a NTSC field in the case of the output of deinterlacer 605 being processed and is part of a film frame if the inverse telecine's output is processed. Note that the differences in the metric are evaluated between a block in the field or frame being considered and a block that best matches it, either in a preceding field or frame or a field or frame that immediately follows it, depending on whether a forward or backward difference is being evaluated. Only luminance values enter into this calculation.

The motion compensation step thus generates two sets of differences. These are between blocks of current values of luminance and the luminance values in reference blocks taken from frames that are immediately ahead and immediately behind the current one in time. The absolute value of each forward and each backward difference is determined for each pixel and each is separately summed over the entire frame. Both fields are included in the two summations when the deinterlaced NTSC fields that comprise a frame are processed. In this way, $SAD_P$, and $SAD_N$, the summed absolute values of the forward and backward differences are found.

For every frame a SAD ratio is calculated using the relationship, $$\gamma = \frac{\varepsilon + SAD_P}{\varepsilon + SAD_N} \quad [22]$$

where $SAD_P$ and $SAD_N$ are the summed absolute values of the forward and backward differences respectively. A small positive number is added to the numerator $\varepsilon$ to prevent the "divide-by-zero" error. A similar $\varepsilon$ term is added to the denominator, further reducing the sensitivity of $\gamma$ when either $SAD_P$ or $SAD_N$ is close to zero.

In an alternate aspect, the difference can be the SSD, the sum of squared differences, and SAD, the sum of absolute differences, or the SATD, in which the blocks of pixel values are transformed by applying the two dimensional Discrete Cosine Transform to them before differences in block elements are taken. The sums are evaluated over the area of active video, though a smaller area may be used in other aspects.

The luminance histogram of every frame as received (non-motion compensated) is also computed. The histogram operates on the DC coefficient, i.e., the (0,0) coefficient, in the 16×16 array of coefficients that is the result of applying the two dimensional Discrete Cosine Transform to the block of luminance values if it were available. Equivalently the average value of the 256 values of luminance in the 16×16 block may be used in the histogram. For images whose luminance depth is eight bits, the number of bins is set at 16. The next metric evaluates the histogram difference $$\lambda = \frac{1}{N} \sum_{i=1}^{16} |N_{Pi} - N_{Ci}| \quad [23]$$

In the above, $N_{Pi}$ is the number of blocks from the previous frame in the $i^{th}$ bin, and $N_{ci}$ is the number of blocks from the current frame that belong in the $i^{th}$ bin, N is the total number of blocks in a frame.

These intermediate results are assembled to form the current frame difference metric as $$D = \frac{\gamma_C}{\gamma_P} + \lambda(2\lambda + 1), \quad [24]$$

where $\gamma_C$ is the SAD ratio based on the current frame and $\gamma_P$ is the SAD ratio based on the previous frame. If a scene has smooth motion and its luma histogram barely change, then D≈1. If the current frame displays an abrupt scene change, then $\gamma_C$ will be large and $\gamma_P$ should be small. The ratio $$\frac{\gamma_C}{\gamma_P}$$

instead of $\gamma_C$ alone is used so that the metric is normalized to the activity level of the context.

Figure 42:
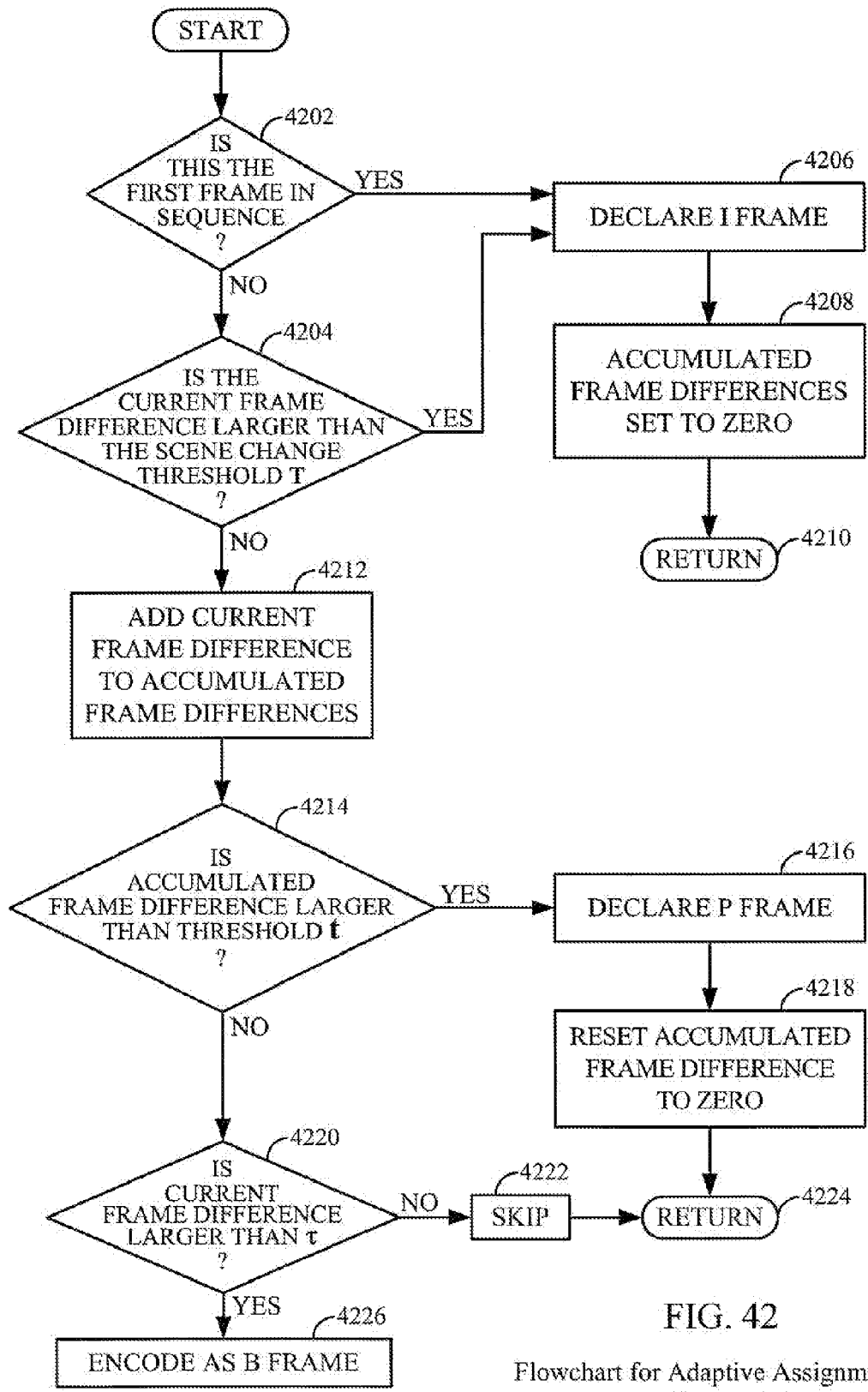
FIG. 42 is a flow diagram illustrating an example of adaptive GOP structure in video streaming.

FIG. 42 illustrates the process of assigning compression types to frames. D, the current frame difference defined in Equation 19, is the basis for decisions made with respect to frame assignments. As decision block 4202 indicates, if a frame under consideration is the first in a sequence, the decision path marked YES is followed to block 4206, thereby declaring the frame to be an I frame. The accumulated frame differences is set to zero in block 4208, and the process returns (in block 4210) to the start block. If the frame being considered is not the first frame in a sequence, the path marked NO is followed from block 4202 where the decision was made, and in test block 4204 the current frame difference is tested against the scene change threshold. If the current frame difference is larger than that threshold, the decision path marked YES is followed to block 4206, again leading to the assignment of an I-frame.

If the current frame difference is less than the scene change threshold, the NO path is followed to block 4212 where the current frame difference is added the accumulated frame difference. Continuing through the flowchart at decision block 4214, the accumulated frame difference is compared with threshold t, which is in general less than the scene change threshold. If the accumulated frame difference is larger than t, control transfers to block 4216, and the frame is assigned to be a P frame; the accumulated frame difference is then reset to zero in step 4218. If the accumulated frame difference is less than t, control transfers from block 4214 to block 4220. There the current frame difference is compared with τ, which is less than t. If the current frame difference is smaller than τ, the frame is assigned to be skipped in block 4222 and then the process returns; if the current frame difference is larger than τ, the frame is assigned to be a B-frame in block 4226.

Encoder

Referring back to FIG. 2, the transcoder 200 includes an encoder 228 that receives processed metadata and raw video from the preprocessor 226. The metadata can include any information originally received in the source video 104 and any information calculated by the preprocessor 226. The encoder 228 includes a first pass encoder 230, a second pass encoder 232, and a re-encoder 234. The encoder 228 also receives input from the transcoder control 231 which can provide information (e.g., metadata, error resilience information, content information, encoded bitrate information, base-layer and enhancement-layer balance information, and quantization information) from the second pass encoder 232 to the first pass encoder 230, the re-encoder 234, as well as the preprocessor 226. The encoder 228 encodes the received video using content information received from the preprocessor 226 and/or content information that is generated by the encoder 228 itself, for example, by the content classification module 712 (FIG. 7).

Figure 7:
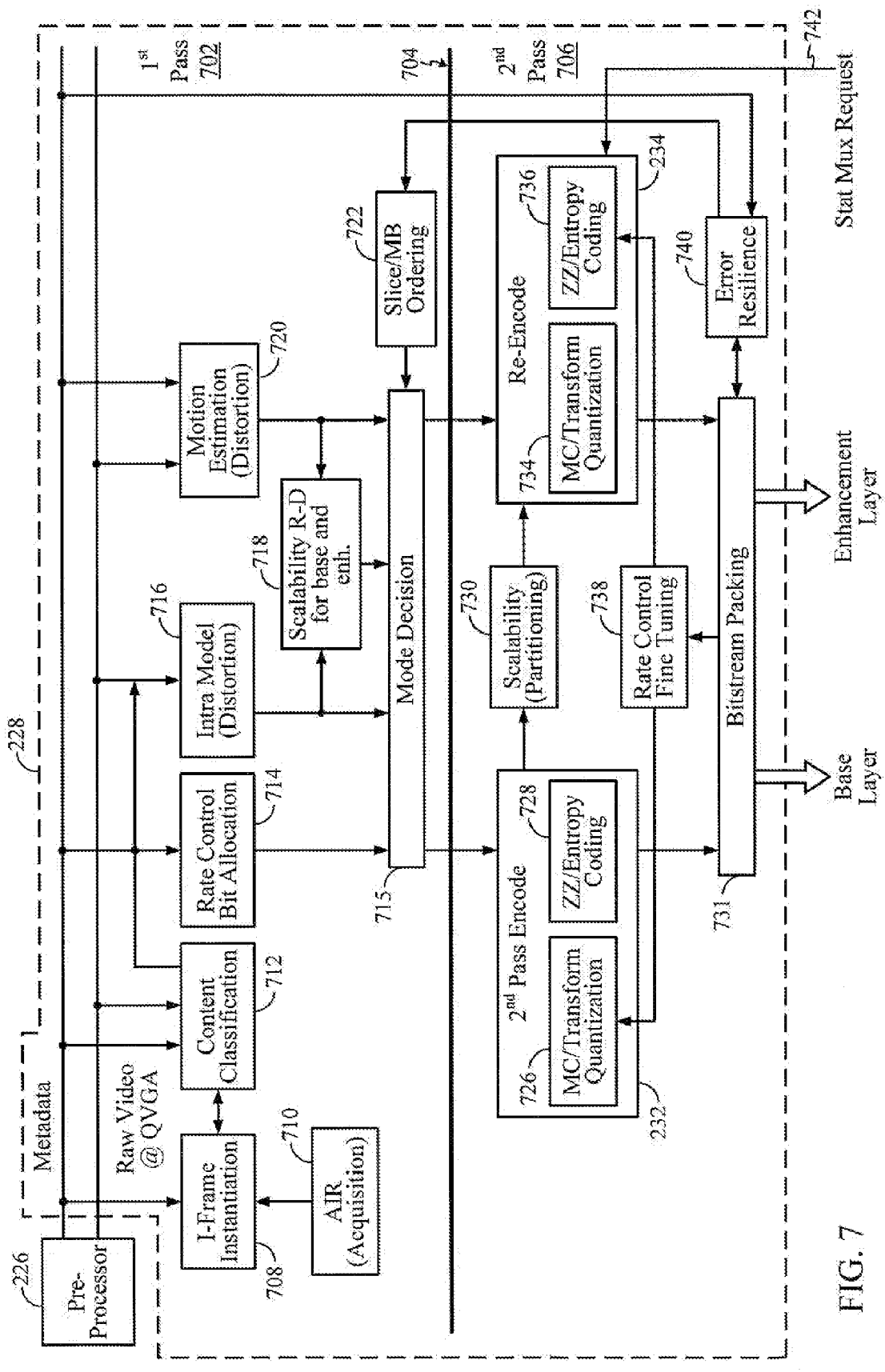
FIG. 7 is a block diagram of an exemplary 2-pass encoder that may be used in the transcoder of FIG. 2.

FIG. 7 illustrates a block diagram of functional modules that can be included in an exemplary two-pass encoder that may be used for the encoder 228 illustrated in FIG. 2. Various aspects of the functional modules are shown in FIG. 7, although FIG. 7 and the description herein does not necessarily address all functionality that can be incorporated into an encoder. Accordingly, certain aspects of the functional modules are described below following the discussion of base and enhancement layer encoding below.

Base Layer and Enhancement Layer Encoding

The encoder 228 can be a SNR scalable encoder, which can encode the raw video and the metadata from the preprocessor 226 into a first group of encoded data, also referred to herein as a base layer, and one or more additional groups of encoded data, also referred to herein as enhancement layers. An encoding algorithm generates base layer and enhancement layer coefficients which, when decoded, may be combined at the decoder when both layers are available for decoding. When both layers are not available, the encoding of the base layer allows it to be decoded as a single layer.

Figure 31:
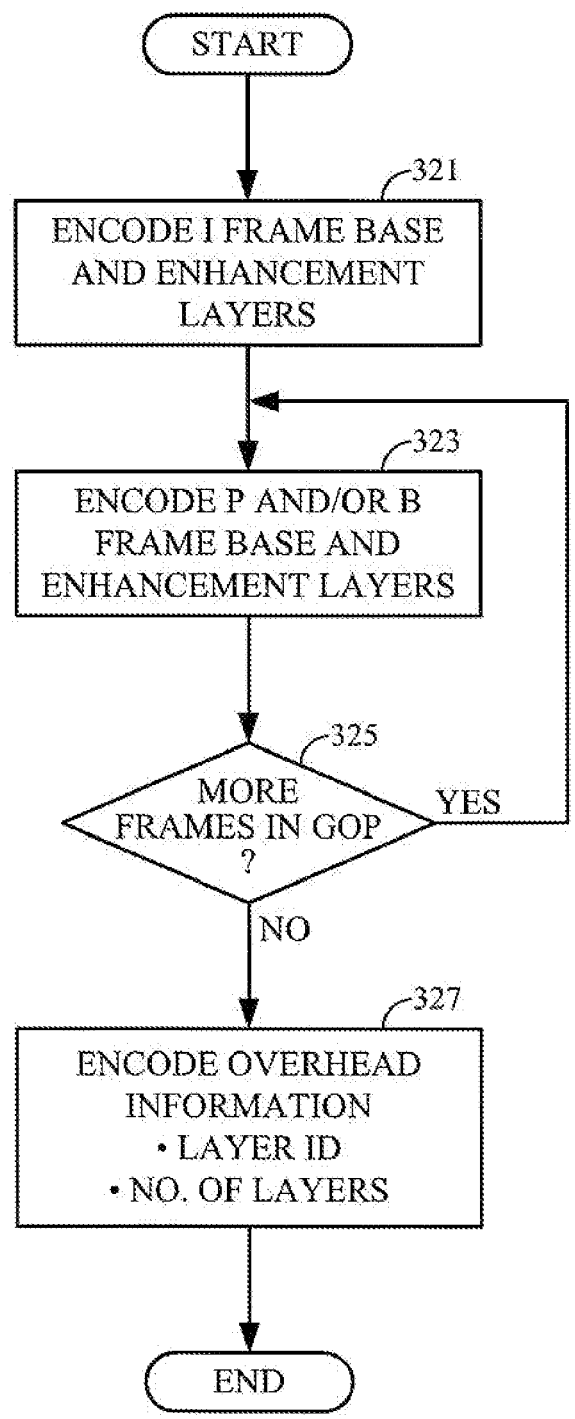
FIG. 31 is a flow diagram illustrating encoding base and enhancement layers.

One aspect of a such a multilayer encoding process is described in reference to FIG. 31. At block 321, an I frame is encoded with entirely intra-coded macroblocks (intra-coded MBs). In H.264, intra-coded MBs in I frames are encoded with fully exploited spatial prediction, which provides a significant amount of coding gain. There are two sub-modes: Intra4×4 and Intra16×16. If the base layer is to take advantage of the coding gain provided by spatial prediction, then the base layer needs to be encoded and decoded before encoding and decoding the enhancement layer. A two pass encoding and decoding of I frames is used. In the base layer, a base layer quantization parameter $QP_b$ affords the transform coefficients a coarse quantization step size. The pixel-wise difference between the original frame and the reconstructed base layer frame will be encoded at the enhancement layer. The enhancement layer uses a quantization parameter $QP_e$ which affords a finer quantization step size. Encoding means, such as encoder 228 of FIG. 2 can perform the encoding at block 321.

At block 323, an encoder encodes base layer data and enhancement layer data for P and/or B-frames in the GOP being processed. Encoding means, such as encoder 228 can perform the encoding at block 323. At block 325, the encoding process checks if there are more P or B-frames to encode. Encoding means, such as SNR scalable encoder 228 can perform act 325. If more P or B-frames remain, step 323 is repeated until all the frames in the GOP are finished being encoded. P and B-frames are comprised of inter-coded macroblocks (inter-coded MBs), although there can be intra-coded MB's in P and B-frames as will be discussed below.

In order for a decoder to distinguish between base layer and enhancement layer data, the encoder 228 encodes overhead information, block 327. The types of overhead information include, for example, data identifying the number of layers, data identifying a layer as a base layer, data identifying a layer as an enhancement layer, data identifying inter-relationships between layers (such as, layer 2 is an enhancement layer for base layer 1, or layer 3 is an enhancement layer for enhancement layer 2), or data identifying a layer as a final enhancement layer in a string of enhancement layers. The overhead information can be contained in headers connected with the base and/or enhancement layer data that it pertains to, or contained in separate data messages. Encoding means, such as encoder 228 of FIG. 2 can perform the process at block 327.

To have single layer decoding, the coefficients of two layers must be combined before inverse quantization. Therefore the coefficients of the two layers have to be generated interactively; otherwise this could introduce a significant amount of overhead. One reason for the increased overhead is that the base layer encoding and the enhancement layer encoding could use different temporal references. An algorithm is needed to generate base layer and enhancement layer coefficients, which can be combined at the decoder before dequantization when both layers are available. At the same time, the algorithm should provide for acceptable base layer video when the enhancement layer is not available or the decoder decides not to decode the enhancement layer for reasons such as, for example, power savings. The details of an illustrative example of such a process are discussed further below in context of the brief discussion of standard predictive coding immediately below.

P-frames (or any inter-coded sections) can exploit temporal redundancy between a region in a current picture and a best matching prediction region in a reference picture. The location of the best matching prediction region in the reference frame can be encoded in a motion vector. The difference between the current region and the best matching reference prediction region is known as residual error (or prediction error).

Figure 32:
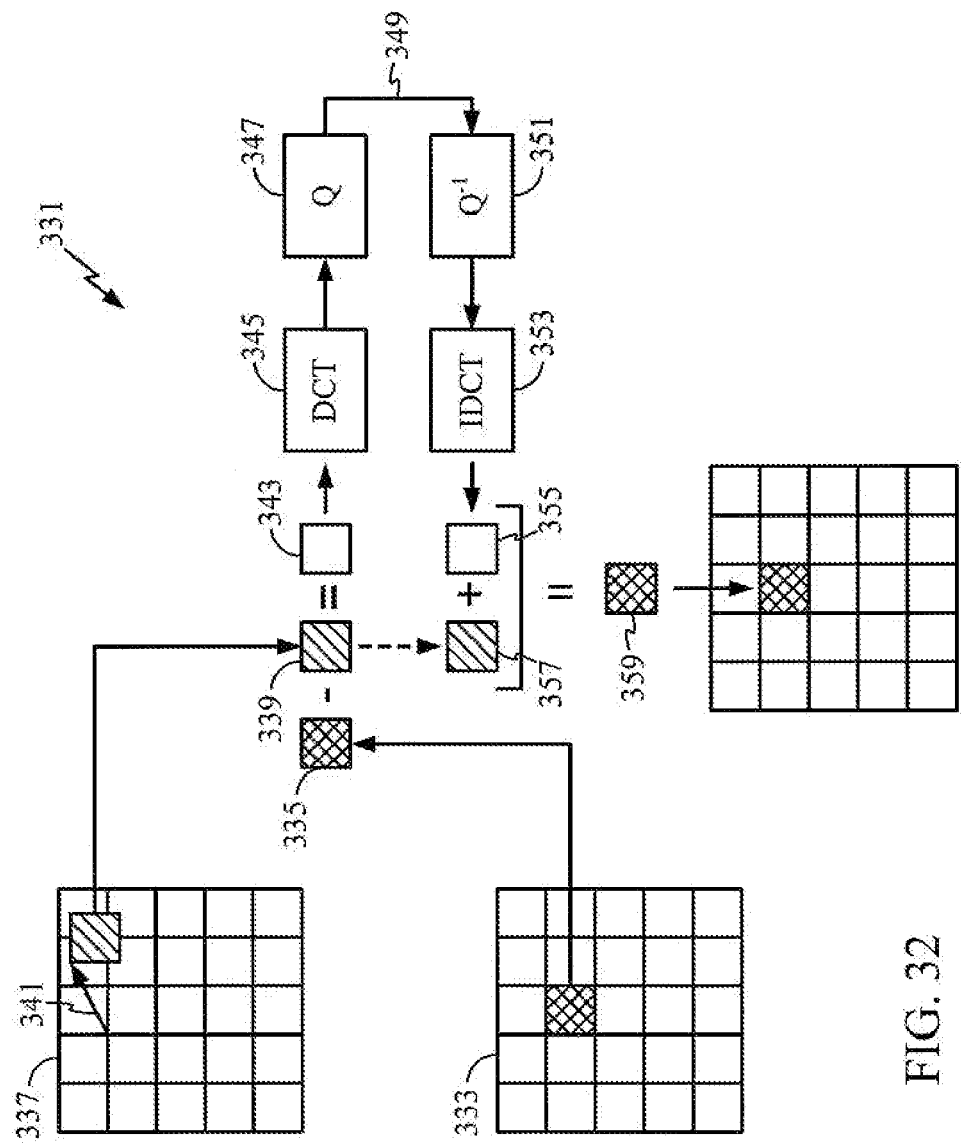
FIG. 32 is a schematic illustrating encoding a macroblock.

FIG. 32 is an illustration of an example of a P-frame construction process in, for example, MPEG-4. Process 331 is a more detailed illustration of an example process that could take place in block 323 of FIG. 31. Process 331 includes current picture 333 made up of 5×5 macroblocks, where the number of macroblocks in this example is arbitrary. A macroblock is made up of 16×16 pixels. Pixels can be defined by an 8-bit luminance value (Y) and two 8-bit chrominance values (Cr and Cb). In MPEG, Y, Cr and Cb components can be stored in a 4:2:0 format, where the Cr and Cb components are down-sampled by 2 in the X and the Y directions. Hence, each macroblock would consist of 256 Y components, 64 Cr components and 64 Cb components. Macroblock 335 of current picture 333 is predicted from reference picture 337 at a different time point than current picture 333. A search is made in reference picture 337 to locate best matching macroblock 339 that is closest, in terms of Y, Cr and Cb values to current macroblock 335 being encoded. The location of best matching macroblock 339 in reference picture 337 is encoded in motion vector 341. Reference picture 337 can be an I-frame or P Frame that a decoder will have reconstructed prior to the construction of current picture 333. Best matching macroblock 339 is subtracted from current macroblock 335 (a difference for each of the Y, Cr and Cb components is calculated) resulting in residual error 343. Residual error 343 is encoded with 2D Discrete Cosine Transform (DCT) 345 and then quantized 347. Quantization 347 can be performed to provide spatial compression by, for example, allotting fewer bits to the high frequency coefficients while allotting more bits to the low frequency coefficients. The quantized coefficients of residual error 343, along with motion vector 341 and reference picture 333 identifying information, are encoded information representing current macroblock 335. The encoded information can be stored in memory for future use or operated on for purposes of, for example, error correction or image enhancement, or transmitted over network 349.

The encoded quantized coefficients of residual error 343, along with encoded motion vector 341 can be used to reconstruct current macroblock 335 in the encoder for use as part of a reference frame for subsequent motion estimation and compensation. The encoder can emulate the procedures of a decoder for this P Frame reconstruction. The emulation of the decoder will result in both the encoder and decoder working with the same reference picture. The reconstruction process, whether done in an encoder, for further inter-coding, or in a decoder, is presented here. Reconstruction of a P Frame can be started after the reference frame (or a portion of a picture or frame that is being referenced) is reconstructed. The encoded quantized coefficients are dequantized 351 and then 2D Inverse DCT, or IDCT, 353 is performed resulting in a decoded or reconstructed residual error 355. Encoded motion vector 341 is decoded and used to locate the already reconstructed best matching macroblock 357 in the already reconstructed reference picture 337. Reconstructed residual error 355 is then added to reconstructed best matching macroblock 357 to form reconstructed macroblock 359. Reconstructed macroblock 359 can be stored in memory, displayed independently or in a picture with other reconstructed macroblocks, or processed further for image enhancement.

B-frames (or any section coded with bi-directional prediction) can exploit temporal redundancy between a region in a current picture and a best matching prediction region in a previous picture and a best matching prediction region in a subsequent picture. The subsequent best matching prediction region and the previous best matching prediction region are combined to form a combined bi-directional predicted region. The difference between the current picture region and the best matching combined bi-directional prediction region is a residual error (or prediction error). The locations of the best matching prediction region in the subsequent reference picture and the best matching prediction region in the previous reference picture can be encoded in two motion vectors.

Figure 33:
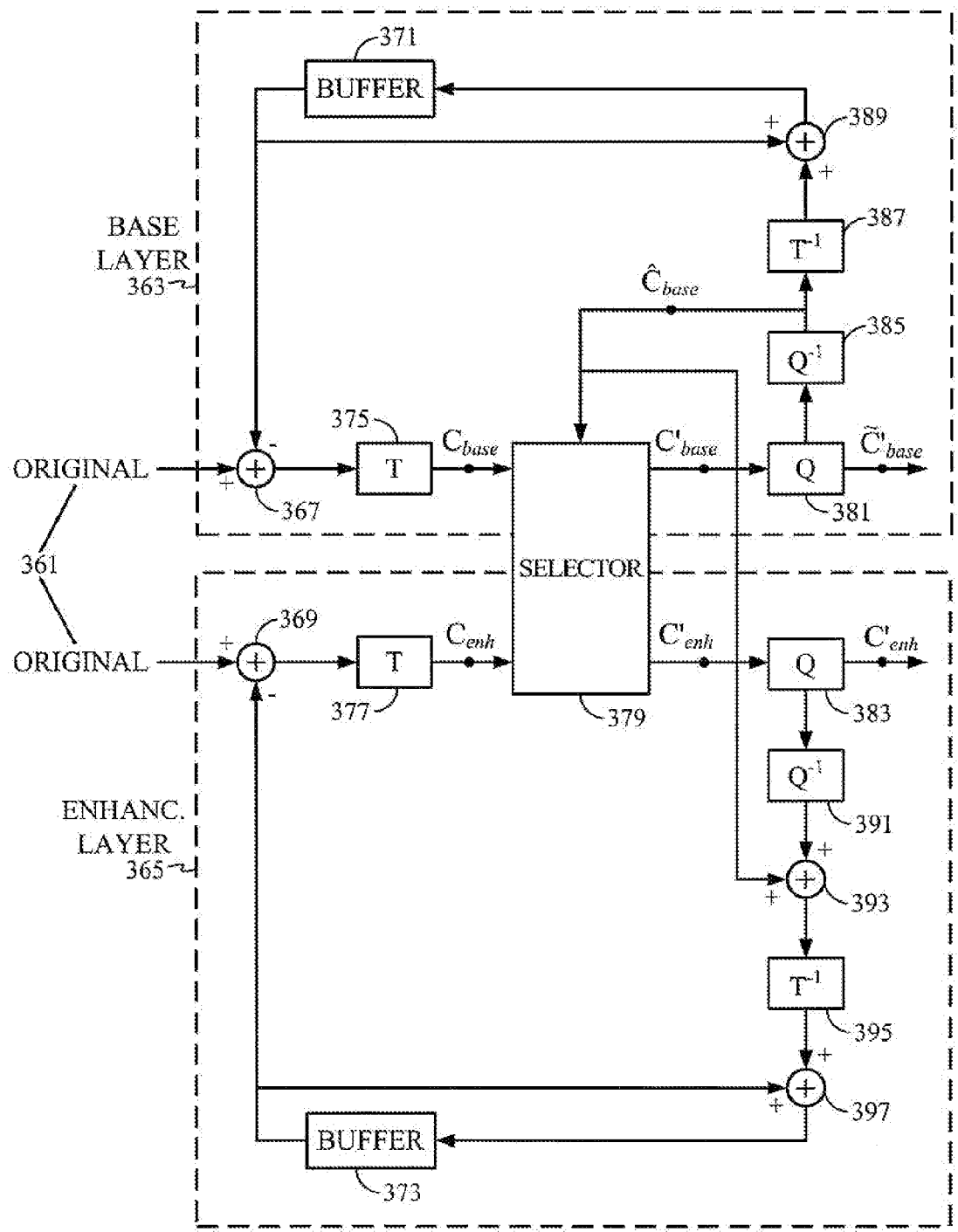
FIG. 33 is a schematic illustrating modules for encoding a base layer and an enhancement layer.

FIG. 33 illustrates an example of an encoder process for encoding of base layer and enhancement layer coefficients that can be performed by encoder 228. The base and enhancement layers are encoded to provide an SNR scalable bitstream. FIG. 33 depicts an example for encoding inter MB residual error coefficients such as would be done in step 323 of FIG. 31. However, similar methods could be used to encode intra MB coefficients as well. Encoding means such as encoder component 228 of FIG. 2 can perform the process illustrated in FIG. 33 and step 323 of FIG. 32. Original (to be encoded) video data 406 (video data comprises luma and chroma information in this example) is input to a base layer best matching macroblock loop 302 and an enhancement layer best matching macroblock loop 365. The object of both loops 363 and 365 is to minimize the residual error that is calculated at adders 367 and 369 respectively. Loops 363 and 365 can be performed in parallel, as shown, or sequentially. Loops 363 and 365 include logic for searching buffers 371 and 373, respectively, which contain reference frames, to identify the best matching macroblock that minimizes the residual error between the best matching macroblock and original data 361 (buffers 371 and 373 can be the same buffer). The residual errors of loop 363 and loop 365 will be different since base layer loop 363 will generally utilize a coarser quantization step size (a higher QP value) than the enhancement layer loop 365. Transform blocks 375 and 377 transform the residual errors of each loop.

The transformed coefficients are then parsed into base layer and enhancement layer coefficients in selector 379. The parsing of selector 379 can take on several forms, as discussed below. One common feature of the parsing techniques is that the enhancement layer coefficient, $C'_{enh}$, is calculated such that it is a differential refinement to the base layer coefficient $C'_{base}$. Calculating the enhancement layer to be a refinement to the base layer allows a decoder to decode the base layer coefficient by itself and have a reasonable representation of the image, or to combine the base and enhancement layer coefficients and have a refined representation of the image. The coefficients selected by selector 379 are then quantized by quantizers 381 and 383. The quantized coefficients $\tilde{C}'_{base}$ and $\tilde{C}'_{enh}$ (calculated with quantizers 381 and 383 respectively) can be stored in memory or transmitted over a network to a decoder.

To match the reconstruction of the macroblock in a decoder, dequantizer 385 dequantizes the base layer residual error coefficients. The dequantized residual error coefficients are inverse transformed 387 and added 389 to the best matching macroblock found in buffer 371, resulting in a reconstructed macroblock that matches what will be reconstructed in the decoder. Quantizer 383, dequantizer 391, inverse transformer 393, adder 397 and buffer 373 perform similar calculations in enhancement loop 365 as were done in base layer loop 363. In addition, adder 393 is used to combine the dequantized enhancement layer and base layer coefficients used in the reconstruction of the enhancement layer. The enhancement layer quantizer and dequantizer will generally utilize a finer quantizer step size (a lower QP) than the base layer.

Figure 34:
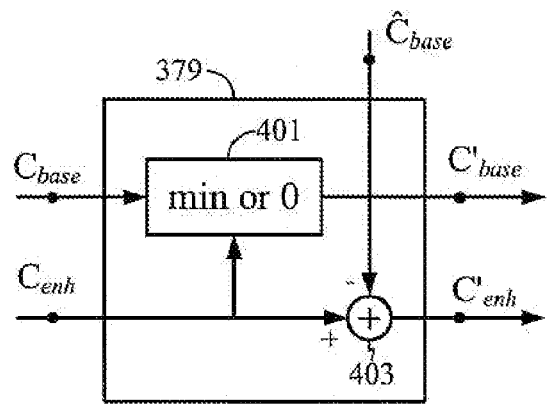
FIG. 34 shows an example of a base layer and enhancement layer coefficient selector process.
Figure 35:
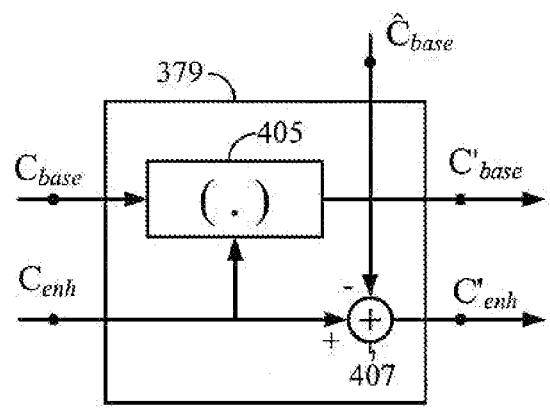
FIG. 35 shows another example of a base layer and enhancement layer coefficient selector process.
Figure 36:
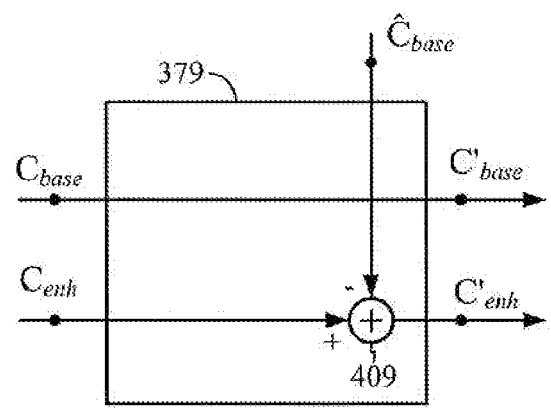
FIG. 36 shows another example of a base layer and enhancement layer coefficient selector process.
Figure 37:
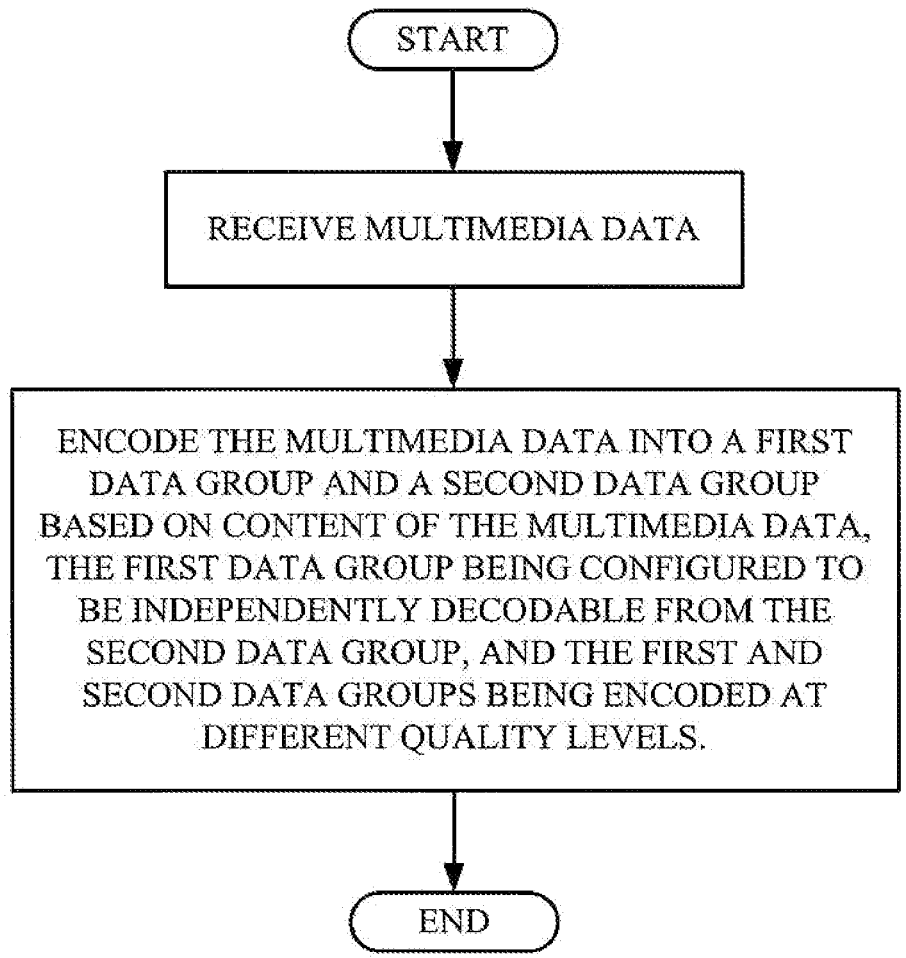
FIG. 37 is a flow diagram illustrating encoding multimedia data based on content information.

FIGS. 34, 35 and 36 show examples of base layer and enhancement layer coefficient selector processes that can be employed in selector 379 of FIG. 33. Selecting means such as encoder 228 of FIG. 2 can perform the processes depicted in FIGS. 34, 35 and 35. Using FIG. 34 as an example, the transformed coefficients are parsed into base and enhancement layer coefficients as shown in the following equations:

$$C'_{base} = \begin{cases} 0, & \text{if } C_{base} \text{ and } C_{enh} \text{ are opposite signs} \\ \min(C_{base}, C_{enh}), & \text{otherwise} \end{cases} \quad [25]$$

$$C'_{enh} = C_{enh} - Q_b^{-1}(Q_b(C'_{base})) \quad [26]$$

where the "min" function can be either a mathematical minimum or a minimum magnitude of the two arguments. Equation 25 is depicted as block 401 and Equation 26 is depicted as adder 510 in FIG. 34. In Equation 26, $Q_b$ stands for the base layer quantizer 381, and $Q_b^{-1}$ stands for dequantizer 385 of the base layer. Equation 26 converts the enhancement layer coefficient into a differential refinement of the base layer coefficient calculated with Equation 25.

FIG. 35 is an illustration of another example of a base layer and enhancement layer coefficient selector 379. In this example the Equation (.) contained in block 405 represents the following:

$$C'_{base} = \begin{cases} C_{base}, & \text{if } |Q_b^{-1}Q_b(C_{base}) - C_{enh}| < |C_{enh}| \\ 0, & \text{otherwise} \end{cases} \quad [27]$$

Adder 407 computes the enhancement layer coefficient as shown in the following two equations:

$$C'_{enh} = C_{enh} - Q_b^{-1}(Q_b(C'_{base})) \quad [28]$$

where $C'_{base}$ is given by Equation 27.

FIG. 36 is an illustration of another example of a base layer and enhancement layer selector 379. In this example, the base layer coefficient is unchanged and the enhancement layer is equal to the difference between the quantized/dequantized base layer coefficient and the original enhancement layer coefficient.

In addition to the base and enhancement layer residual error coefficients, the decoder needs information identifying how MB's are encoded. Encoding means such as encoder component 228 of FIG. 2 can encode overhead information that can include a map of intra-coded and inter-coded portions, such as, for example a MB map where macroblocks (or sub-macroblocks) are identified as being intra-coded or inter-coded (also identifying which type of inter-coding including, for example forward, backward or bi-directional) and to which frame(s) inter-coded portions are referenced. In an example aspect, the MB map and base layer coefficients are encoded in the base layer, and the enhancement layer coefficient are encoded in the enhancement layer.

P-frames and B-frames can contain intra-coded MBs as well as inter MBs. It is common for hybrid video encoders to use rate distortion (RD) optimization to decide to encode certain macroblocks in P or B-frames as intra-coded MBs. In order to have single layer decoding where intra-coded MB's do not depend on enhancement layer inter MB's, any neighboring inter MBs are not used for spatial prediction of base layer intra-coded MBs. In order to keep the computational complexity unchanged for the enhancement layer decoding, for the intra-coded MBs in the base layer P or B-frame, the refinement at the enhancement layer could be skipped.

Intra-coded MBs in P or B-frames require many more bits than inter MBs. For this reason, intra-coded MBs in P or B-frames could be encoded only at base layer quality at a higher QP. This will introduce some deterioration in video quality, but this deterioration should be unnoticeable if it is refined in a later frame with the inter MB coefficients in the base and enhancement layer as discussed above. Two reasons make this deterioration unnoticeable. The first is a feature of the human visual system (HVS) and the other one is that Inter MBs refine intra MBs. With objects that change position from a first frame to a second frame, some pixels in the first frame are invisible in the second frame (to-be-covered information), and some pixels in the second frame are visible for the first time (uncovered information). Human eyes are not sensitive to the uncovered and to-be-covered visual information. So for the uncovered information, even though it is encoded at a lower quality, the eyes may not tell the difference. If the same information remains in the following P frame, there will be a high chance that the following P frame at the enhancement layer can refine it because the enhancement layer has lower QP.

Another common technique that introduces intra-coded MBs in P or B-frames is known as Intra Refresh. In this case, some MBs are coded as intra-coded MBs, even though standard R-D optimization would dictate that they should be Inter-coded MBs. These intra-coded MBs, contained in the base layer, can be encoded with either $QP_b$ or $QP_e$. If $QP_e$ is used for the base layer, then no refinement is needed at the enhancement layer. If $QP_b$ is used for the base layer, then refinement may be needed. Otherwise, at the enhancement layer the drop of quality will be noticeable. Since inter-coding is more efficient than intra-coding in the sense of coding efficiency, these refinements at the enhancement layer will be inter-coded. This way, the base layer coefficients will not be used for the enhancement layer. Therefore the quality gets improved at the enhancement layer without introducing new operations.

B-frames are commonly used in enhancement layers because of the high compression qualities they offer. However, B-frames may have to reference intra-coded MBs of a P frame. If the pixels of the B-frame were to be encoded at enhancement layer quality, it may require too many bits due to the lower quality of the P frame intra-coded MBs, as discussed above. By taking advantage of the qualities of the HVS, as discussed above, the B-frame MBs could be encoded at a lower quality when referencing lower quality intra-coded MB's of P frames.

One extreme case of intra-coded MBs in P or B-frames is when all MBs in a P or B-frame are encoded at Intra mode due to the presence of a scene change in the video being encoded. In this case the whole frame can be coded at the base layer quality and no refinement at the enhancement layer. If a scene change occurs at a B-frame, and assume that B-frames are only encoded in the enhancement layer, then the B-frame could be encoded at base layer quality or simply dropped. If a scene change occurs at a P frame, no changes are necessary, but the P frame could be dropped or encoded at base layer quality. Scalable layer encoding is further described in co-pending U.S. patent application Ser. No. [Attorney docket/ref. no. 050078] entitled "SCALABLE VIDEO CODING WITH TWO LAYER ENCODING AND SINGLE LAYER DECODING" and owned by the assignee hereof, and which is incorporated by reference in its entirety herein.

Encoder First Pass Portion

FIG. 7 shows an illustrative example of the encoder 228 of FIG. 2. The blocks shown illustrate various encoder processing that can be included in encoder 228. In this example, the encoder 228 includes a first pass portion 706 above a demarcation line 704, and a second pass portion 706 (including functionality of second pass encoder 232 and re-encoder 234 in FIG. 2) below the line 704.

The encoder 228 receives metadata and raw video from the preprocessor 226. The metadata can include any metadata received or calculated by the preprocessor 226, including metadata related to content information of the video. The first pass portion 702 of encoder 228 illustrates exemplary processes that can be included in first pass encoding 702, which is described below in terms of its functionality. As one of skill in the art will know, such functionality can be embodied in various forms (e.g., hardware, software, firmware, or a combination thereof).

FIG. 7 illustrates an adaptive intra refresh (AIR) module. The AIR module 710 provides an input to an I-frame instantiation module 708 which instantiates an I-frame based on the metadata. The first-pass portion 702 can also include a content classification module 712 configured to receive the metadata and video and determine content information relating to the video. Content information can be provided to a rate control bit allocation module 714, which also receives the metadata and the video. The control bit allocation module 714 determines rate bit control information and provides it to the mode decision module 715. Content information and video can be provided to a intra-model (distortion) module 716, which provides intra-coding distortion information to the mode decision module 715 and a scalability rate-distortion for base and enhancement layer module 718. Video and metadata are provided to a motion estimation (distortion) module 720 which provides inter-coding distortion information to the scalability rate-distortion for base and enhancement layer module 718. The scalability rate-distortion for base and enhancement layer module 718 determines scalability rate-distortion information using distortion estimations from motion estimation module 720 and intra-model distortion module 716 which is provided to the mode decision module 715. The mode decision module 715 also receives input from the slice/MB ordering module 722. The slice/MB ordering module 722 receives input from an error resilience module 740 (shown in the second pass portion 706), and provides information on aligning independently encodable portions of video (slices) with access unit boundaries for error resilience to the mode decision module 715. The mode decision module 715 determines encoding mode information based on its inputs and provides the "best" coding mode to the second pass portion 706. Further illustrative explanation of some examples of such first pass portion 702 encoding is described below.

As stated above, the content classification module 712 receives the metadata and raw video supplied by the preprocessor 226. In some examples, the preprocessor 226 calculates content information from the multimedia data and provides the content information to the content classification module 712 (e.g., in the metadata), which can use the content information to determine a content classification for the multimedia data. In some other aspects, the content classification module 712 is configured to determine various content information from the multimedia data, and can also be configured to determine a content classification.

The content classification module 712 can be configured to determine a different content classification for video having different types of content. The different content classification can result in different parameters used in aspects of encoding the multimedia data, for example, determining a bit rate (e.g., bit allocation) for determining quantization parameters, motion estimation, scalability, error resiliency, maintaining optimal multimedia data quality across channels, and for fast channel switching schemes (e.g., forcing I-frames periodically to allow fast channel switching. According to one example, the encoder 228 is configured to determine rate-distortion (R-D) optimization and bit rate allocations based on the content classification. Determining a content-classification allows multimedia data to be compressed to a given quality level corresponding to a desired bit rate based on a content classification. Also, by classifying the content of the multimedia data (e.g., determining a content classification based on the Human Visual System), the resulting perceptive quality of communicated multimedia data on a display of a receiving device is made dependent on the video content.

Figure 9:
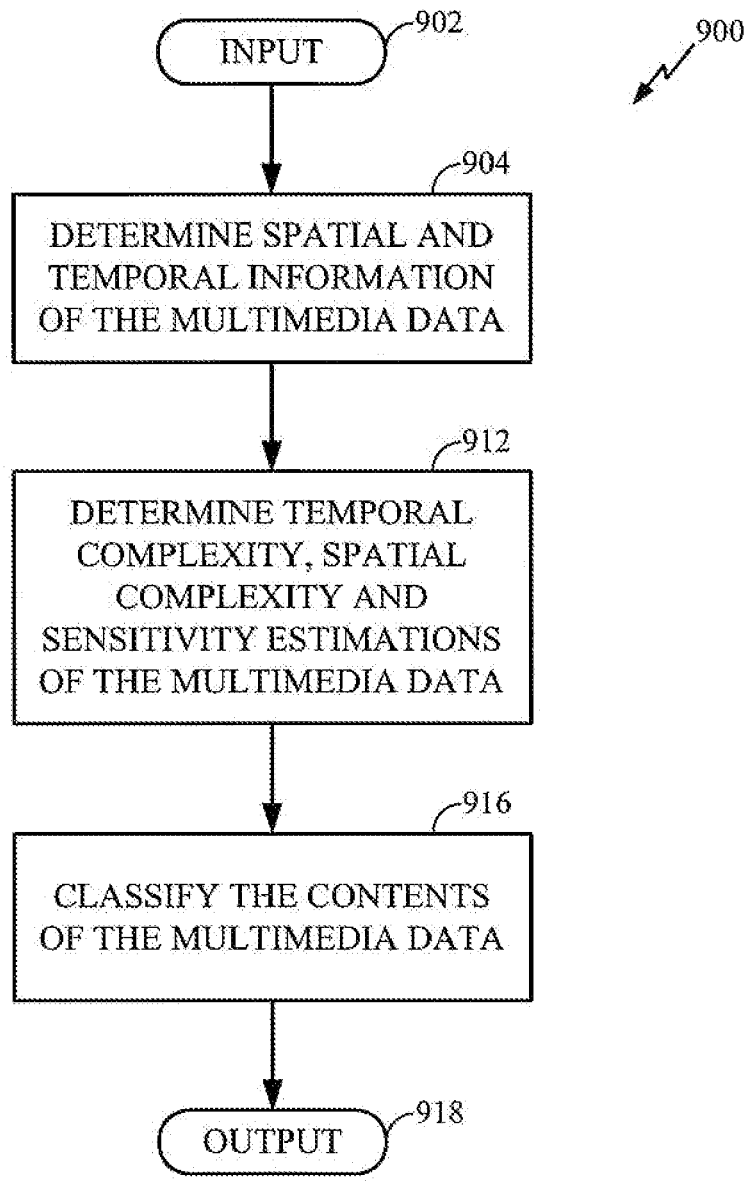
FIG. 9 is a flow diagram illustrating an exemplary operation for content classification, such as for use in the encoder of FIG. 7.

As an example of a procedure that content classification module 712 undergoes to classify content, FIG. 9 shows a process 900 illustrating an exemplary process by which the content classification module 712 may operate. As shown, the process 900 begins at input block 902 where the content classification module 712 receives of raw multimedia data and metadata. The process 900 then proceeds to block 904 where the content classification module 712 determines spatial information and temporal information of the multimedia data. In some aspects, the spatial and temporal information is determined by spatial and temporal maskings (e.g., filtering). The spatial and temporal information can be determined based on metadata that includes scene change data and motion vector (MV) smoothing. Process 900 then proceeds to block 912 which performs spatial complexity, temporal complexity, and sensitivity estimations. Process 900 then proceeds to block 916 where the content of the multimedia data is classified based on the results of the determined spatial, temporal, and sensitivity data in blocks 904 and 912. Also in block 916 a particular rate-distortion (R-D) curve can be selected and/or R-D curve data can be updated. The process 900 then proceeds to output block 918, where the output can include a complexity-distortion map or value indicating spatial and temporal activity (e.g., a content classification), and/or the selected R-D curves. Referring back to FIG. 7, the content classification module 712 provides an output to a rate control bit allocation module 714, an intra model (distortion) module 716, and also to the I-Frame Instantiation module 708, discussed above.

Content Information

The content classification module 712 can be configured to calculate a variety of content information from the multimedia data, including a variety of content related metrics, including spatial complexity, temporal complexity, contrast ratio values, standard deviations and frame difference metrics, described further below.

The content classification module 712 can be configured to determine spatial complexity and temporal complexity of the multimedia data, and also to associate a texture value to the spatial complexity and a motion value to the temporal complexity. The content classification module 712 receives preprocessed content information relating to the contents of the multimedia data being encoded from the preprocessor 226, or alternatively, the preprocessor 226 can be configured to calculate the content information. As described above, the content information can include, for example, one or more $D_{csat}$ values, contrast ratio values, motion vectors (MVs), and sum of absolute differences (SADs).

In general, multimedia data includes one or more sequences of images, or frames. Each frame can be broken up into blocks of pixels for processing. Spatial complexity is a broad term which generally describes a measure of the level of spatial details within a frame. Scenes with mainly plain or unchanging or low changing areas of luminance and chrominance will have low spatial complexity. The spatial complexity is associated with the texture of the video data. Spatial complexity is based on, in this aspect, a human visual sensitivity metric called $D_{csat}$, which is calculated for each block as a function of local spatial frequency and ambient lighting. Ordinary skilled artisans are aware of techniques for using spatial frequency patterns and lighting and contrast characteristics of visual images to take advantage of the human visual system. A number of sensitivity metrics are known for taking advantage of the perspective limitations of the human visual system and could be used with method described herein.

Temporal complexity is a broad term which is used to generally describe a measure of the level of motion in multimedia data as referenced between frames in a sequence of frames. Scenes (e.g., sequences of frames of video data) with little or no motion have a low temporal complexity. Temporal complexity can be calculated for each macroblock, and can be based on the $D_{csat}$ value, motion vectors and the sum of absolute pixel differences between one frame and another frame (e.g., a reference frame).

The frame difference metric gives a measure of the difference between two consecutive frames taking into account the amount of motion (example, motion vector or MV) along with the residual energy represented as sum of absolute difference (SAD) between a predictor and the current macroblock. Frame difference also provides a measure of bidirectional or unidirectional prediction efficiencies.

One example of a frame difference metric based on the motion information received from a pre-processor potentially performing motion compensated de-interlacing is as follows. The deinterlacer performs a bidirectional motion estimation and thus bidirectional motion vector and SAD information is available. A frame difference represented by SAD_MV for each macroblock can be derived as follows:

$$SAD\_MV = \log_{10}[SAD*exp(-\min(1, MV))] \quad [29]$$

where MV=Square_root $(MV_x^2+MV_y^2)$, SAD=min($SAD_N$, $SAD_P$), where $SAD_N$ is the SAD computed from the backward reference frame, and $SAD_P$ is the SAD computed from the forward reference frame.

Another approach of estimating a frame difference was described above in reference to Equations 6-8. A SAD ratio (or contrast ration) γ can be calculated as earlier described above in Equation 6. A luminance histogram of every frame can also be determined, the histogram difference λ being calculated using Equation 7. The frame difference metric D can be calculated as shown in Equation 8.

In one illustrative example, a contrast ratio and a frame difference metric are utilized in the following manner to obtain a video content classification, which could reliably predict the features in a given video sequence. Although described here as occurring in the encoder 228, a preprocessor 226 can also be configured to determine a content classification (or other content information) and pass the content classification to the encoder 228 via metadata. The process described in the example below classifies the content into eight possible classes, similar to the classification obtained from the R-D curve based analysis. The classification process outputs a value in the range between 0 and 1 for each superframe depending on the complexity of the scene and the number of scene change occurrences in that superframe. The content classification module in the preprocessor can execute the following steps (1)-(5) for each superframe to obtain a content classification metric from the frame contrast and frame difference values.

1. Calculate Mean Frame Contrast and Frame Contrast Deviation from the macroblock contrast values.

2. Normalize Frame Contrast and Frame Difference values using the values obtained from simulations, which are 40 and 5 respectively.

3. Compute a content classification metric using, e.g., the generalized equation:

$$CCMetric = \quad [30]$$
$$CCW1 * I\_Frame\_Contrast\_Mean + *Frame\_Difference\_Mean -$$
$$CCW3 * I\_Contrast\_Deviation\hat{\,}2 *$$
$$\exp(CCW4 * Frame\_Difference\_Deviation\hat{\,}2)$$

where CCW1, CCW2, CCW3 and CCW4 are weighting factors. In this example, the values are chosen to be 0.2 for CCW1, 0.9 for CCW2, 0.1 for CCW3 and −0.00009 for CCW4.

4. Determine the number of scene changes in the super frame. Generally, a super frame refers to a group of pictures or frames that can be displayed in a particular time period. Typically, the time period is one second. In some aspects, a super frame comprises 30 frames (for 30/fps video). In other aspects a super frame comprises 24 frames (24/fps video). Depending upon the number of scene changes, one of the following cases gets executed.

(a) No Scene Changes: When there are no scene changes in a super frame, the metric is entirely dependent only on the frame difference values as shown in the following equation:

$$CCMetric = (CCW2 + (CCW1/2)) * Frame\_Difference\_Mean - \quad [31]$$
$$(CCW3 - (CCW1/2)) * 1 *$$
$$\exp(-CCW4 * Frame\_Difference\_Deviation\hat{\,}2)$$

(b) Single Scene Change: When there is a single scene change frame observed in the superframe, the default equation would be used to compute the metric, as shown below:

$$CCMetric = CCW1 * I\_Frame\_Contrast\_Mean + \quad [32]$$
$$CCW2 * Frame\_Difference\_Mean - CCW3 * I\_Contrast$$
$$\_Deviation\hat{\,}2 * \exp(CCW4 * Frame\_Difference\_Deviation\hat{\,}2)$$

(c) Two Scene Changes: When it is observed that there are at most 2 scene changes in the given superframe, the last superframe is accorded more weight than the first one as the first one would be anyway refreshed by the latter quickly, as shown in the following equation:

$$CCMetric = 0.1 * I\_Frame\_Contrast\_Mean1 + \quad [33]$$
$$CCW1 * I\_Frame\_Contrast\_Mean2 +$$
$$(CCW2 - 0.1) * Frame\_Difference\_Mean -$$
$$CCW3 * I\_Contrast\_Deviation1\hat{\,}2 * I\_Contrast\_Deviation2\hat{\,}2 *$$
$$\exp(CCW4 * Frame\_Difference\_Deviation\hat{\,}2)$$

(d) Three or more Scene Changes: If the given superframe is observed to have more than 3 I frames (say N), the last I frame is given more weight and all other I frames are given a weight of 0.05, as shown in the following equation:

$$CCMetric = 0.05 * I\_Frame\_Contrast\_Mean_{(1 \ldots N-1)} + \quad [34]$$
$$CCW1 * I\_Frame\_Contrast\_Mean_{(N)} +$$
$$(CCW2 - (0.05 * (N-1))) * Frame\_Difference\_Mean - CCW3 *$$
$$I\_Contrast\_Deviation_{(N)}\hat{\,}2 * I\_Contrast\_Deviation_{1 \ldots N-1}\hat{\,}$$
$$2 * \exp(CCW4 * Frame\_Difference\_Deviation\hat{\,}2)$$

5. A correction may be used for the metric in the case of low motion scenes when the Frame Difference mean is less than 0.05. An offset of (CCOFFSET) 0.33 would be added to the CCMetric.

The content classification module 712 uses the $D_{csat}$ value, motion vectors and/or the sum of absolute differences to determine a value indicating a spatial complexity for the macroblock (or designated amount of video data). The temporal complexity is determined by a measure of the frame difference metric (the difference between two consecutive frames taking into account the amount of motion, with motion vectors, and the sum of absolute differences between the frames).

In some aspects, the content classification module 712 can be configured to generate a bandwidth map. For example, bandwidth map generation can be performed by the content classification module 712 if the preprocessor 226 does not generate a bandwidth map.

Determining Texture and Motion Values

For each macroblock in the multimedia data, the content classification module 712 associates a texture value with the spatial complexity and a motion value with the temporal complexity. The texture value relates to the luminescence values of the multimedia data, where a low texture value indicates small changes in luminescence values of neighboring pixels of the data, and a high texture value indicates large changes in the luminescence values of neighboring pixels of the data. Once the texture and motion values are calculated, the content classification module 712 determines a content classification by considering both the motion and texture information. The content classification module 712 associates the texture for the video data being classified with a relative texture value, for example, "Low" texture, "Medium" texture, or "High" texture, which generally indicates the complexity of luminance values of the macroblocks. Also, the content classification module 712 associates the motion value calculated for the video data being classified with a relative motion value, for example, "Low" motion, "Medium" motion, or "High" motion which generally indicates the amount of motion of the macroblocks. In alternative aspects, fewer or more categories for motion and texture can be used. Then, a content classification metric is then determined by considering the associated texture and motion values.

FIG. 8 illustrates an example of a classification chart that illustrates how texture and motion values are associated with an content classification. A person of ordinary skill in the art is familiar with many ways to implement such a classification chart, for example, in a look-up table or a database. The classification chart is generated based on predetermined evaluations of video data content. To determine the video data classification, a texture value of "Low," "Medium," or "High" (on the "x-axis") is cross-referenced with a motion value of "Low," "Medium," or "High" (on the "y-axis"). A content classification indicated in the intersecting block is assigned to the video data. For example, a texture value of "High" and a motion value of "Medium" results in a classification of seven (7). FIG. 8 illustrates various combinations of relative texture and motion values that are associated with eight different content classifications, in this example. In some other aspects, more or fewer classifications can be used. Further description of an illustrative aspect of content classification is disclosed in co-pending U.S. patent application Ser. No. 11/373,577 entitled "CONTENT CLASSIFICATION FOR MULTIMEDIA PROCESSING" filed on Mar. 10, 2006, assigned to the assignee hereof and hereby expressly incorporated by reference herein.

Rate Control Bit Allocation

As described herein, a multimedia data content classification can be used in encoding algorithms to effectively improve the bit management while maintaining a constant the perceptive quality of video. For example, the classification metric can be used in algorithms for scene-change detection, encoding bit rate allocation control, and frame rate up conversion (FRUC). Compressor/decompressor (codec) systems and digital signal processing algorithms are commonly used in video data communications, and can be configured to conserve bandwidth, but there is a trade-off between quality and bandwidth conservation. The best codecs provide the most bandwidth conservation while producing the least degradation of video quality.

In one illustrative example, the rate control bit allocation module 714 uses the content classification to determine a bit rate (e.g., the number of bits allocated for encoding the multimedia data) and stores the bit rate into memory for use by other process and components of the encoder 228. A bit rate determined from the classification of the video data can help conserve bandwidth while providing multimedia data at a consistent quality level. In one aspect, a different bit rate can be associated with each of the eight different content classifications and then that bit rate is used to encode the multimedia data. The resulting effect is that although the different content classifications of multimedia data are allocated a different number of bits for encoding, the perceived quality is similar or consistent when viewed on a display.

Generally, multimedia data with a higher content classification are indicative of a higher level of motion and/or texture and is allocated more bits when encoded. Multimedia data with a lower classification (indicative of less texture and motion) is allocated less bits. For multimedia data of a particular content classification, the bit rate can be determined based on a selected target perceived quality level for viewing the multimedia data. Determining multimedia data quality can be determined by humans viewing and grading the multimedia data. In some alternative aspects, estimates of the multimedia data quality can be made by automatic test systems using, for example, signal to noise ratio algorithms. In one aspect, a set of standard quality levels (e.g., five) and a corresponding bit rate needed to achieve each particular quality level are predetermined for multimedia data of each content classification. To determine a set of quality levels, multimedia data of a particular content classification can be evaluated by generating a Mean Opinion Score (MOS) that provides a numerical indication of a visually perceived quality of the multimedia data when it is encoded using a certain bit rate. The MOS can be expressed as a single number in the range 1 to 5, where 1 is lowest perceived quality, and 5 is the highest perceived quality. In other aspects, the MOS can have more than five or fewer than five quality levels, and different descriptions of each quality level can be used.

Determining multimedia data quality can be determined by humans viewing and grading the multimedia data. In some alternative aspects, estimates of the multimedia data quality can be made by automatic test systems using, for example, signal to noise ratio algorithms. In one aspect, a set of standard quality levels (e.g., five) and a corresponding bit rate needed to achieve each particular quality level are predetermined for multimedia data of each content classification.

Knowing the relationship between the visually perceived quality level and a bit rate for multimedia data of a certain content classification can be determined by selecting a target (e.g., desired) quality level. The target quality level used to determine the bit rate can be preselected, selected by a user, selected through an automatic process or a semi-automatic process requiring an input from a user or from another process, or be selected dynamically by the encoding device or system based on predetermined criteria. A target quality level can be selected based on, for example, the type of encoding application, or the type of client device that will be receiving the multimedia data.

In the illustrated example in FIG. 7, the rate control bit allocation module 714 receives both data from the content classify classification module 712 and metadata directly from the preprocessor 226. The rate control bit allocation module 714 resides in the first pass portion of the encoder 228, and a rate control fine tuning module 738 resides in the second pass portion 706. This two-pass rate control aspect is configured such that the first-pass (rate control bit allocation module 714) performs context adaptive bit allocation with one superframe look-ahead (e.g., targeting long term average bit rates of 256 kbps) and limits the peak rate, and the second-pass (rate control fine tuning module 738) refines the first-pass results for two-layer scalability and performs rate adaptation. The rate control operates on four levels: (1) GOP level—controls bit distribution of I, P, B, and F frames to be non-uniform inside a GOP; (2) super frame level—controls hard limits on maximum super frame size; (3) frame level—controls bit requirements according to the spatial and temporal complexity of the multimedia data frames, which are based on the content information (e.g., a content classification); and (4) macroblock level—controls bit allocation of macroblocks based on spatial and temporal complexity maps, which are based on the content information (e.g., a content classification).

Figure 10:
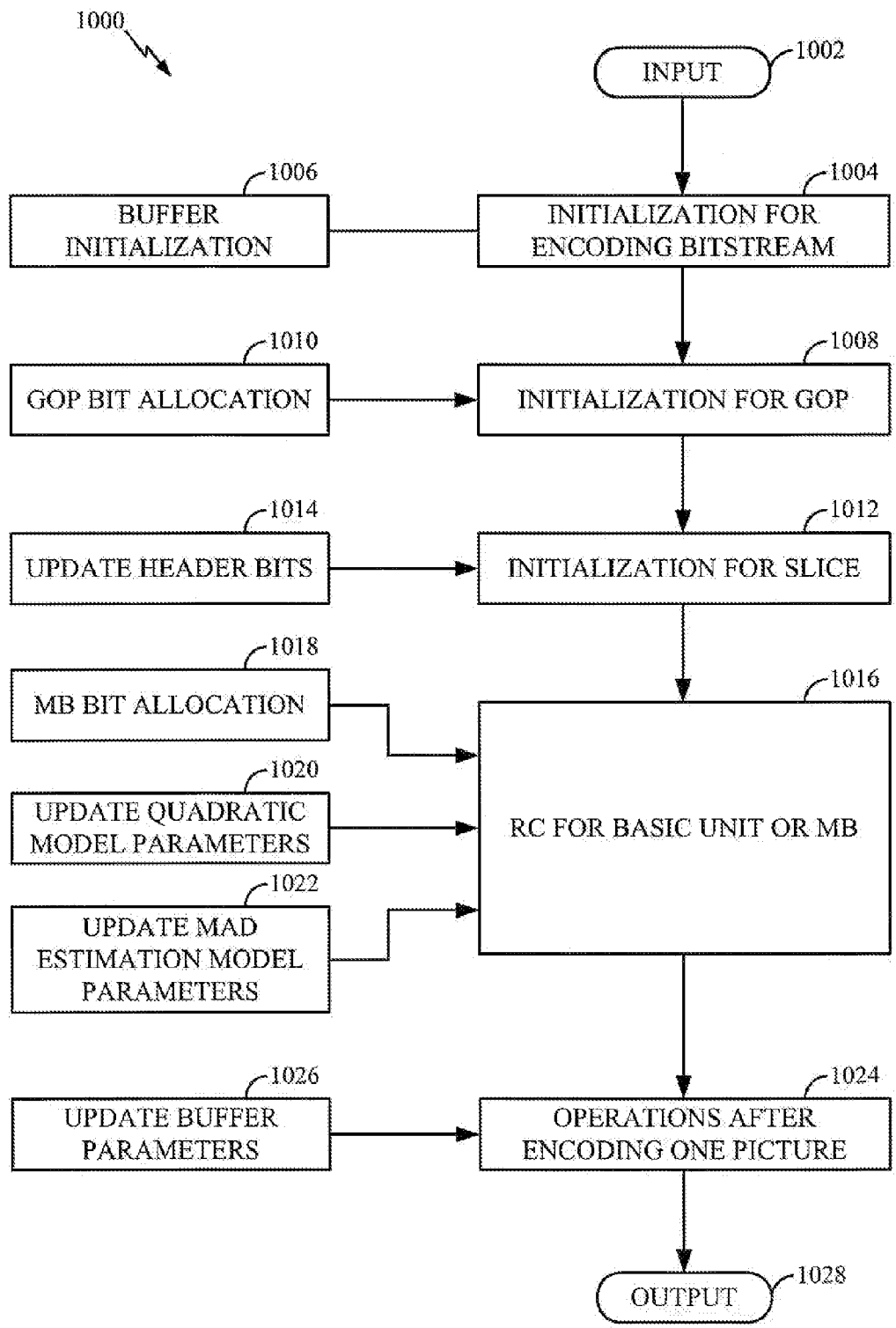
FIG. 10 is a flow diagram illustrating the operation of a rate control, such as for use with the encoder of FIG. 7.

An exemplary flow diagram of the operation of the rate control module 714 is illustrated in FIG. 10. As shown in FIG. 10, the process 1000 begins at an input 1002 block. The rate control module 714 receives various inputs, not all of which are necessarily illustrated by FIG. 7. For example, input information can include metadata from the preprocessor 226 a target bitrate, encoder buffer size (or, as an equivalent, the maximum delay time for rate control), an initial rate control delay, and frame rate information. Further input information can include inputs at the group of pictures (GOP) level, including, for example, maximum super frame size, length and P/B-frame distribution of the GOP (including scene change information), arrangement of base and enhancement layers desired, a complexity-distortion metric for pictures in the GOP for a future 30 frames. Other input information includes inputs at the picture level, including complexity-distortion map for the current picture (received from the content classification module 712), quantization parameters (QP), and bit breakdown of past 30 frames (fit over a sliding window). Finally, input information at the macroblock (MB) level includes, for example, the mean absolute difference (MAD) of collocated macroblocks (MB) in a reference picture, and a coded block pattern (CBP) of macroblocks after quantization (whether skipped or not).

After the inputs at block 1002, process 1000 proceeds to block 1004 for initialization for encoding the bitstream. Concurrently, a buffer initialization 1006 is performed. Next, a GOP is initialized as shown in block 1008, with GOP bit allocation 1010 received as part of the initialization. After GOP initialization, flow proceeds to block 1012, where a slice is initialized. This initialization includes an update of the header bits as shown by block 1014. After the initializations of block 1004, 1008 and 1012 are performed, rate control (RC) for a basic unit or macroblock (MB) is carried out as shown by block 1016. As part of the rate control determination of a macroblock in block 1016, inputs are received via interfaces in the encoder 228. These inputs can include macroblock (MB) bit allocation 1018, an update of quadratic model parameters 1020, and an update of median absolute deviation from the median ("MAD," a robust estimate of dispersion) parameters 1022. Next process 1000 proceeds to block 1024 for execution of operations after encoding one picture 1024. This procedure includes receiving an update of buffer parameters as shown by block 1026. Process 1000 then proceeds to output block 1028 where the rate control module 714 outputs quantization parameters QP for each macroblock MB to be used by a mode decision module 715 as shown in FIG. 7

Motion Estimation

Figure 11:
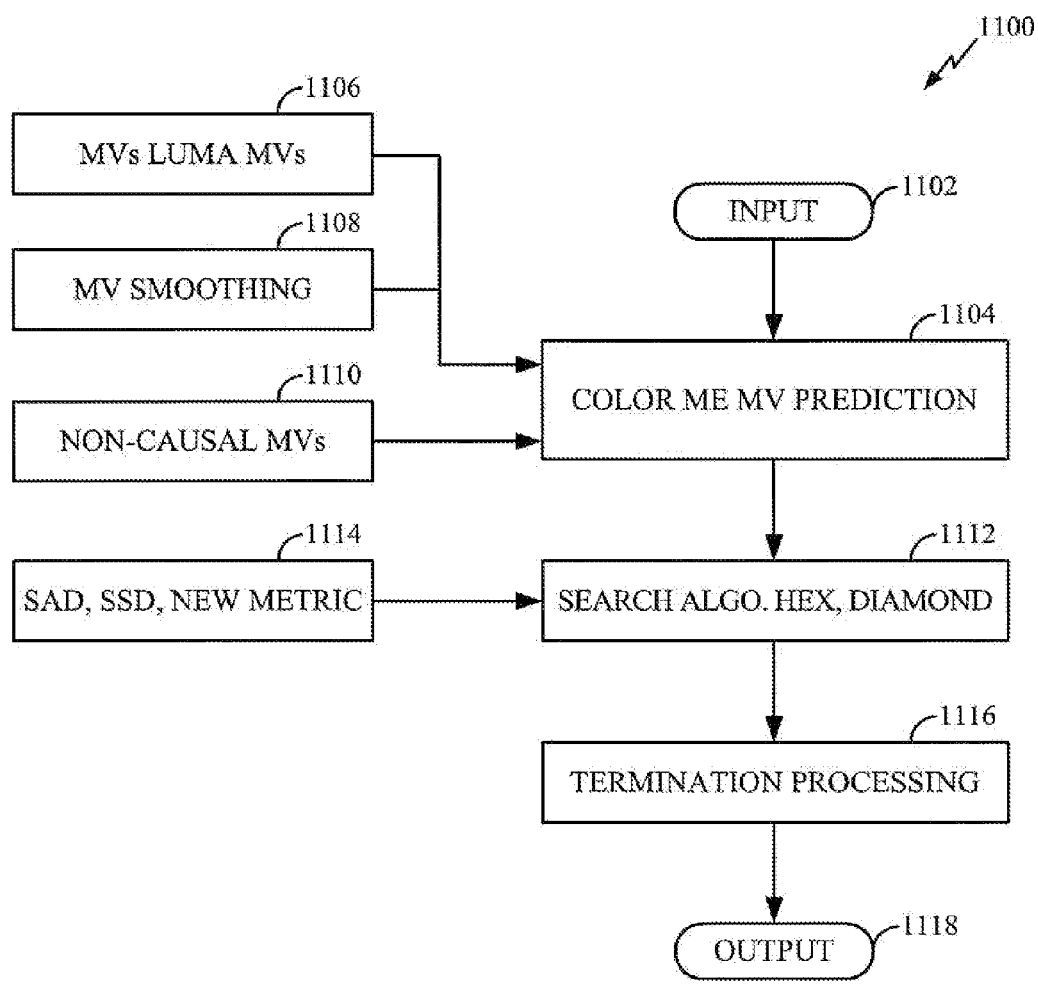
FIG. 11 is a flow diagram illustrating the operation of an exemplary motion estimator, such as for use with the encoder of FIG. 7.

Motion estimation module 720 receives inputs of metadata and raw video from the preprocessor 226, and provides output that can include block size, motion vectors distortion metrics, and reference frame identifiers to a mode decision module 715. FIG. 11 illustrates an exemplary operation of the motion estimation module 720. As shown, process 1100 begins with an input 1102. At the frame level, the module 720 receives input of the reference frame ID and motion vectors. At the macroblock level, input 1102 includes input pixels and reference frame pixels. Process 1100 continue to step 1104 wherein color motion estimation (ME) and motion vector prediction are performed. In order to carry out this process, various inputs are received including MPEG-2 motion vectors, and luma motion vectors MVs 1106, motion vector smoothing 1108, and non-causal motion vectors 1110. Next, process 1100 proceeds to block 1112 where a motion vector search algorithm or methodology is performed, such as hexagonal or diamond search methods. Inputs to the process at block 1112 may include sum of absolute difference (SAD), sum of squared difference (SSD), and/or other metrics as shown by block 1114. Once a motion vector search is performed, process 1100 proceeds to termination block 1116, where termination processing is performed. The process 100 then ends at output block 1118, which yields an output of block size, motion vector (MV), distortion metrics, and Reference Frame identifiers.

Scalability R-D for Base and Enhancement Layer

Figure 13:
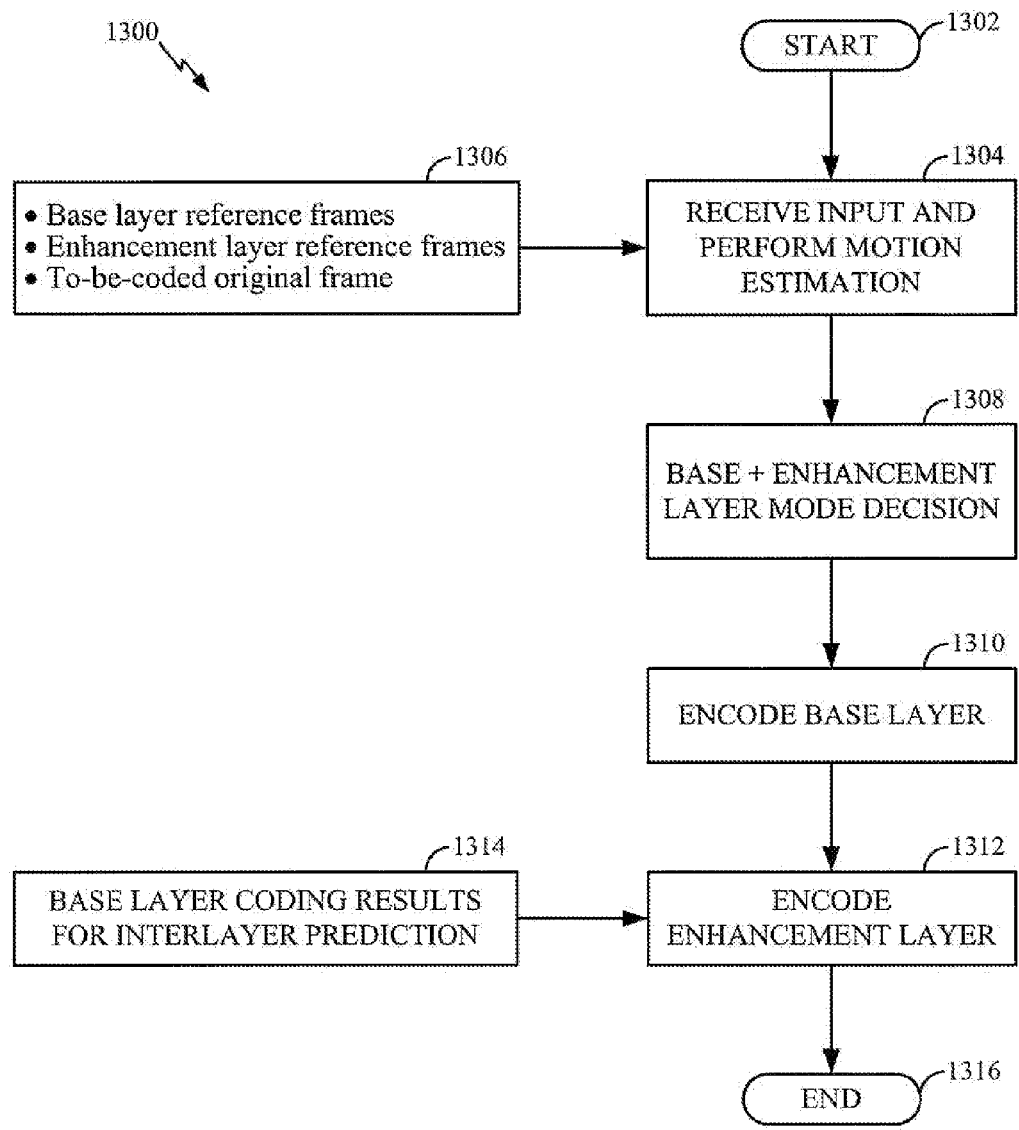
FIG. 13 is a flow diagram illustrating an exemplary operation effecting scalability for use in the encoder of FIG. 7.

FIG. 13 illustrates an exemplary flow diagram of a scalability process 1300 that can be performed by the scalability R-D module 718. Process 1300 begins at start block 1302 and proceeds to block 1304 where the scalability R-D module 718 it receives an input from motion estimation module 720 and performs motion estimation. Motion estimation relies on input of base layer reference frames, enhancement layer reference frames, and the to-be-coded original frame as indicated by block 1306. Such information can be calculated by the GOP partitioner 612 and communicated to the scalability R-D module 718 via, e.g., metadata. The process 1300 proceeds to block 1308 to determine scalability information of the data base layer and enhancement layer data. Base layer encoding is next performed as shown in block 1310, followed by enhancement layer encoding in block 1312. The encoding of the enhancement layer can use the base layer coding results for interlayer prediction as in input, as illustrated by block1314, thus temporally it is performed after base layer encoding. This is further described in described in co-pending U.S. patent application Ser. No. entitled "SCALABLE VIDEO CODING WITH TWO LAYER ENCODING AND SINGLE LAYER DECODING." After encoding is complete, process 1300 ends at block1316.

Slice/Macroblock Ordering

The first pass portion 702 also includes a slice/macroblock ordering module 722, which receives an input from an error resilience module 740 in the second pass portion and provides an slice alignment information to the mode decision module 715. Slices are chunks of independently decodable (entropy decoding) coded video data. Access units (AU) are coded video frames each comprising a set of NAL units always containing exactly one primary coded picture. In addition to the primary coded picture, an access unit may also contain one or more redundant coded pictures or other NAL units not containing slices or slice data partitions of a coded picture. The decoding of an access unit always results in a decoded picture.

Frames can be time division multiplexed blocks of physical layer packets (called a TDM capsule) that offer the highest time diversity. A superframe corresponds to one unit of time (e.g., 1 sec) and contains four frames. Aligning slice and AU boundaries to frame boundaries in the time domain results in the most efficient separation and localization of corrupted data. During a deep fade, most of the contiguous data in a TDM capsule is affected by errors. Due to time diversity, the remaining TDM capsules have a high probability of being intact. The uncorrupted data can be utilized to recover and conceal the lost data from the affected TDM capsule. Similar logic applies to frequency domain multiplexing (FDM) where frequency diversity is attained through separation in frequency subcarriers that the data symbols modulate. Furthermore, similar logic applies to spatial (through separation in transmitters and receivers antennas) and other forms of diversity often applied in wireless networks.

Figure 20:
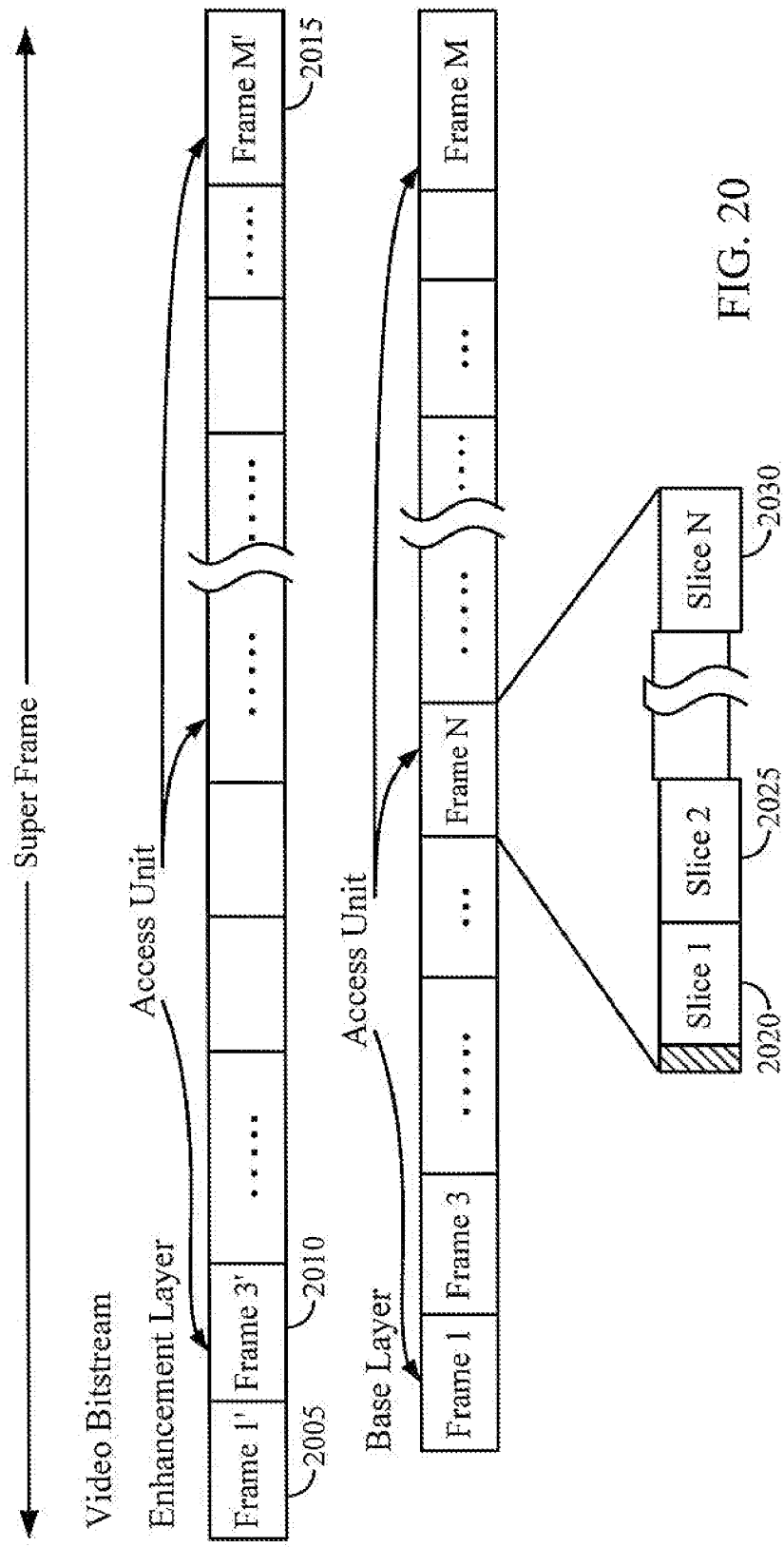
FIG. 20 is a diagram illustrating the organization of a video bitstream in an enhancement layer and a base layer.

In order to align slices and AU to frames, the outer code (FEC) code block creation and MAC layer encapsulation should align as well. FIG. 20 illustrates the organization of coded video data or a video bitstream in slices and AUs. The coded video may be constituted in one or more bitstreams, e.g., base layer bitstream and enhancement layer bitstream where layered video coding is applied.

The video bitstream comprises AUs as illustrated in FIG. 20 by Frame 1' 2005, Frame 3' 2010 and Frame M' 2015. The AUs comprise of slices of data, as illustrated by Slice 1 2020, slice 2 2025, and slice N 2030. Each start of slice is identified by a start code and provides to network adaptation. In general, I-frame or intra coded AUs are large, followed by P-frames or forward predicted frames followed by B-frames. Coding an AU into multiple slices incurs a significant overhead cost in terms of the coded bitrate because spatial prediction across slices is restricted and slice headers contribute to the overhead too. Because slice boundaries are resynchronization points, restricting contiguous physical layer packets to slices controls errors since when a PLP is corrupted, error is confined to the slice in the PLP whereas if the PLP contained multiple slices or parts of multiple slices, the error would impact all slices or portions of slices in the PLP.

Since I-frames are typically large, for example, on the order of 10's of kbits, the overhead due to multiple slices is not a large proportion of the total I-frame size or total bitrate. Also, having more slices in an intra-coded AU enables better and more frequent resynchronization and more efficient spatial error concealment. Also, I-frames carry the most important information in the video bitstream since P and B-frames are predicted off of I-frames. I-frames also serve as random access points for channel acquisition.

Figure 21:
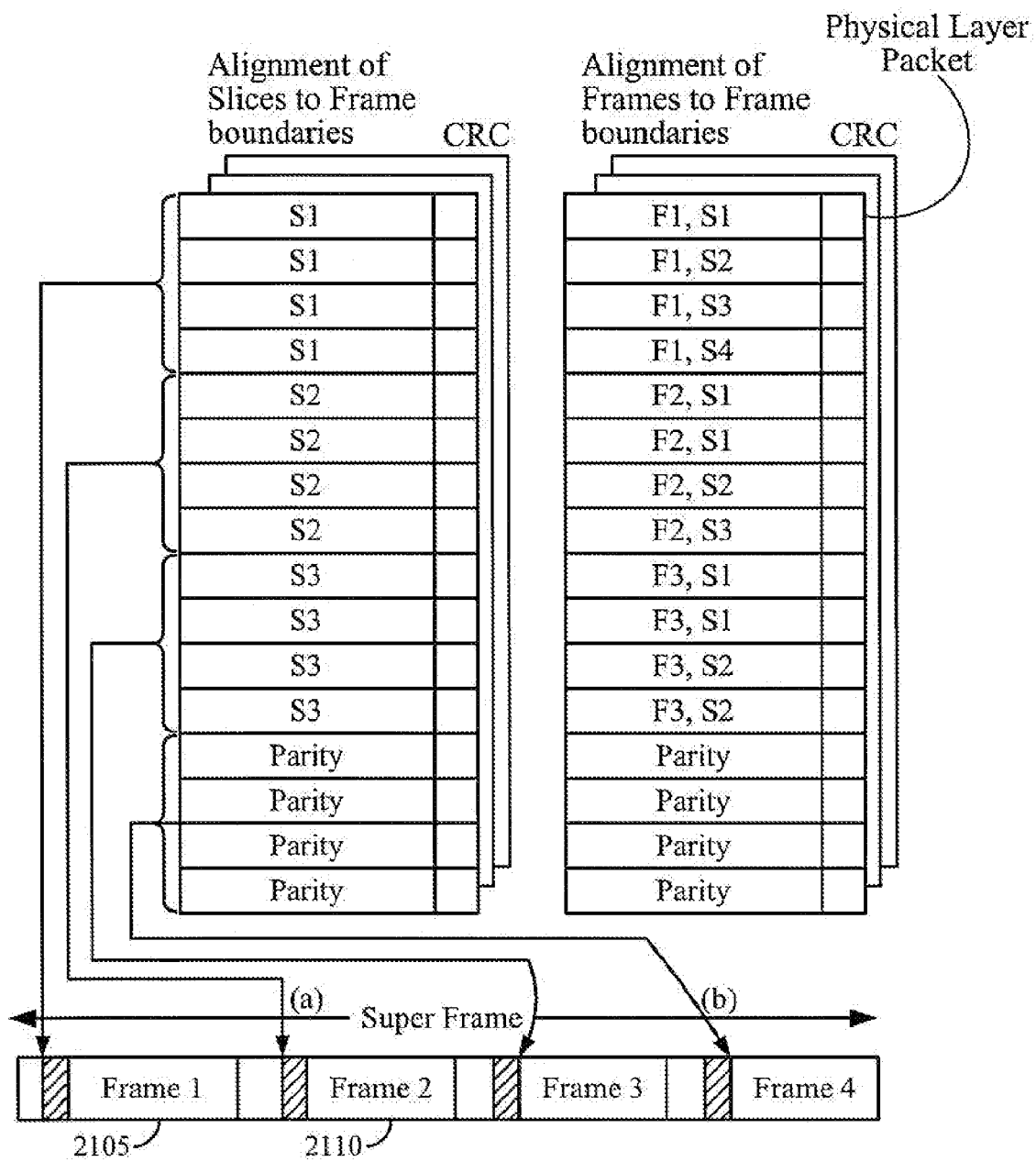
FIG. 21 is a diagram illustrating the alignment of slices to video frame boundaries.

Referring now to FIG. 21, carefully aligning the I-frames to frame boundaries and the slices with an I AU to frame boundaries as well, enables the most efficient error control, error protection (since if one slice that belonged to Frame 1 2105 is lost, slices that belong to Frame 2 2110 have a high probability of being intact because Frame 2 2110 has a significant time separation from Frame 1 2105 error recovery can be performed through resynchronization and error concealment.

Because P-frames are typically sized on the order of a few kbits, aligning slices of a P-frame and integer number of P-frames to frame boundaries enables error resilience without a detrimental loss of efficiency (for similar reasons as those for I-frames). Temporal error concealment can be employed in such aspects. Alternatively, dispersing consecutive P-frames such that they arrive in different frames provides added time diversity among P-frames, which can be because temporal concealment is based on motion vectors and data from previously reconstructed I or P frames. B-frames can be extremely small (100's of bits) to moderately large (few 1000 bits). Hence aligning integer number of B-frames to frame boundaries is desirable to achieve error resiliency without a detrimental loss of efficiency.

Mode Decision Module

Figure 12:
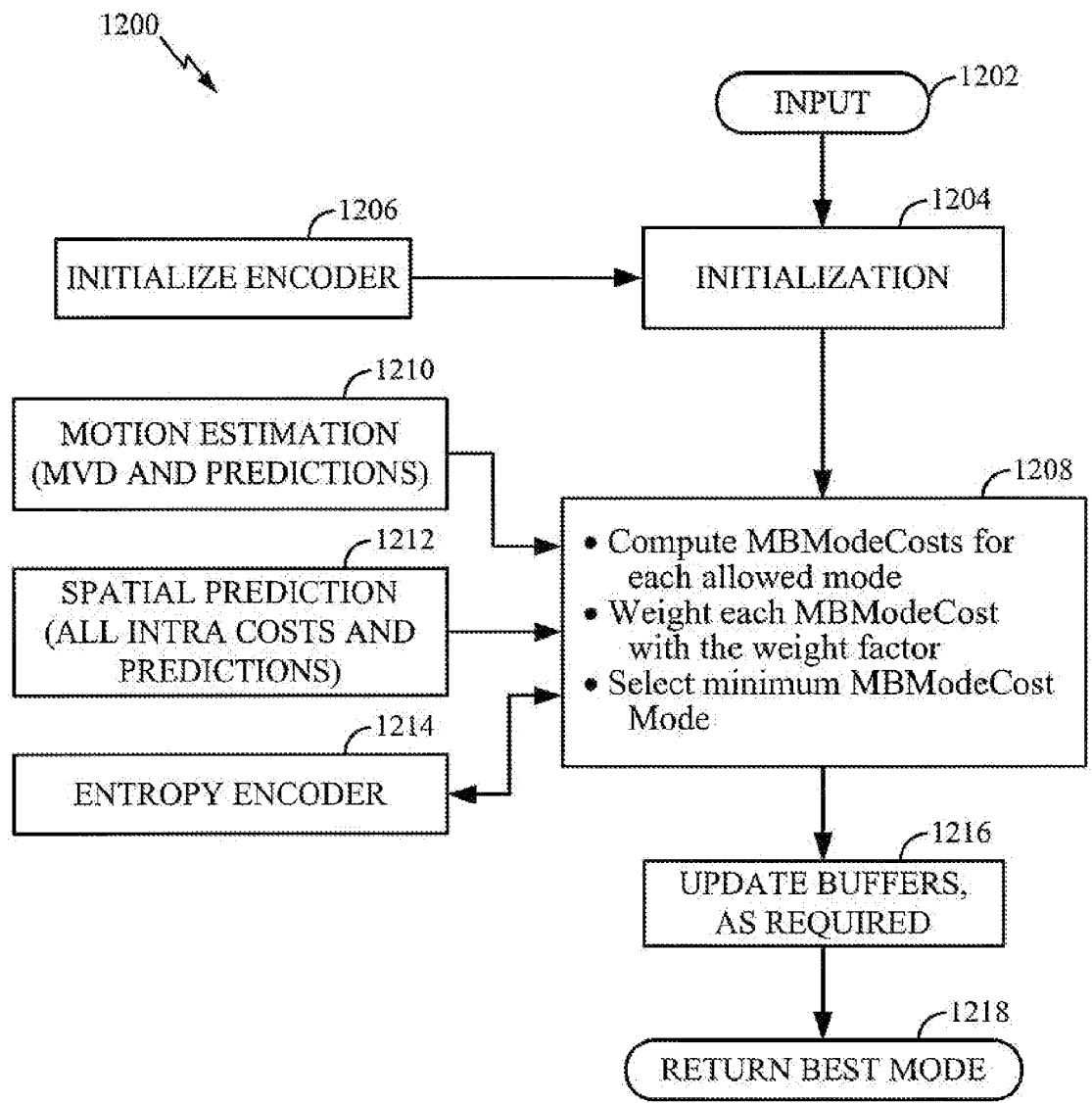
FIG. 12 is a flow diagram illustrating the operation of an exemplary mode decision encoder function, such as for use with the encoder of FIG. 7

FIG. 12 illustrates some examples of the operation of the mode decision module 715. As shown, the process 1200 begins at an input block 1202. In one illustrative example, the various information input to the mode decision module 715 include slice type, Intra 4×4cost, Intra 16×16cost, IntraUV 8×8cost, IntraY 16×16 Mode, IntraUV Mode, motion vector data (MVD), quantization parameters (QP), SpPredMB4× 4Y, SpPredMB16×16Y, SpPredMB8×8U, SpPredMB8×8V, Rate Distortion Flag, Raw YMB pixels, Raw UMB Pixels, and Raw VMB Pixels. Process 1200 then proceeds to block 1204 encoding initialization, which can be initiated by an input signal or interface directing encoder initialization as indicated by block 1206. The initialization can include setting allowed modes (including skip, direct), set mode weights (if required, the default will be equal weights for all modes), and setting buffers. After initialization, process 1200 proceeds to block 1208 where main processing for mode decision is performed, including: computing macroblock (MB) mode costs for each allowed mode, weighting of each MB mode cost with a weighting factor, and selecting a minimum MB mode cost mode. Inputs involved with these operations include motion estimation (e.g., MVD and predictions) and spatial prediction (e.g., all intra costs and predictions) as illustrated by blocks 1210 and 1212. Interfaced with the mode decision module 715 is entropy encoding in block 1214 that, among other things, improves the compression rate. Process 1200 the proceeds to block 1216 where buffers are updated to pass information to the encoder second pass portion 706. Finally, process 1200 proceeds to block 1218 where the "best" encoding mode can be communicated to the encoder second pass portion 706.

Encoder Second Pass Portion

Referring again to FIG. 7, the second pass portion 706 of the encoder 228 includes a second pass encoder module 232 for performing the second pass of encoding. The second pass encoder 232 receives the output from the mode decision module 715. The second pass encoder 232 includes a MC/Transform Quantization module 726 and a Zig Zag (ZZ)/Entropy encoder 728. The results of the second pass encoder 232 are output to a scalability module 730 and a bitstream packing module 731, which outputs a encoded base and enhancement layer for transmission by the transcoder 200 via a synchronizing layer 240 (illustrated in FIG. 2). As shown in FIG. 2, it is noted that base and enhancement layers from the second pass encoder 232 and the re-encoder 234 are assembled by the synchronizing layer 240 into a packetized PES 242 including base and enhanced layers, a data PES 244 (e.g., CC and other text data, and an audio PES 246. It is noted that the audio encoder 236 receives decoded audio information 218 and, in turn, encodes the information and outputs the encoded information 238 to the synch layer 240.

Re-Encoder

Referring again to FIG. 7, the encoder second pass portion 706 also includes a re-encoder 234, which corresponds to re-encoder 234 in FIG. 2. The re-encoder 234 also receives the output of first pass portion 702 and includes a MC/Transform Quantization 726 and ZZ/Entropy coding 728 portions. Additionally, the scalability module 730 outputs to the re-encoder 234. The re-encoder 234 outputs the resultant base and enhanced layer from re-encoding to the bitstream packing module 731 for transmission to a synchronizer (e.g., sync. layer 240 shown in FIG. 2). The encoder 228 example in FIG. 7 also includes a rate control fine tuning module 738 which provides bitstream packing feedback to both the MC/transform quantization module 234 in the second pass encoder 232 and to the ZZ/Entropy module 736 in the re-encoder 234 to help tune the second pass encoding (e.g., to increase compression efficiency).

Error Resilience Module

The encoder 228 example illustrated in FIG. 7 also includes an error resilience module 740 in the second pass portion 706. The error resilience module 740 communicates with the bitstream packing module 731 and the slice/MB ordering module 722. The error resilience module 740 receives metadata from the preprocessor 228 and selects an error resilience scheme, for example, aligning slice and access units to frame boundaries, predictive hierarchy and adoptive intra refresh. The selection of the error resilience scheme can be based on information received in the metadata, or from information communicated to the error resilience module from the bitstream packing module 731 and the slice/MB ordering module 722. The error resilience module 740 provides information to the slice/macroblock (MB) ordering module in first pass portion 702 to implement the selected error resiliency processes. Video transmissions over error prone environments can employ error resilience strategies and algorithms that can result in presenting clearer and less error-filled data to a viewing user. The error resiliency description below can apply to any individual or combination of existing or future application, transport and physical layer or other technologies. Effective error robustness algorithms integrates an understanding of error susceptibility properties and error protection capabilities among the OSI layers in conjunction with desirable properties of the communication system such as low latency and high throughput. Error resiliency processing can be based on the content information of the multimedia data, for example, on the content classification of the multimedia data. One of the primary advantages is recoverability from fading and multi-path channel errors. The error resilience approaches described below pertain specifically to processes that can be incorporated in the encoder 228 (e.g., in particular in error resilience module 740 and slice/MB ordering module 722), and can be extended generically to data communication in error prone environments.

Error Resilience

For a prediction based hybrid compression system, intra-coded frames are independently coded without any temporal prediction. Inter-coded frames can be temporally predicted from past frames (P-frames) and future frames (B-frames). The best predictor can be identified through a search process in the reference frame (one or more) and a distortion measure such as SAD is used to identify the best match. The predictive coded region of the current frame can be a block of varying size and shape (16×16, 32×32, 8×4 etc) or a group of pixels identified as an object through, for example, segmentation.

Temporal prediction typically extends over many frames (e.g., 10 to 10's of frames) and is terminated when a frame is coded as an I-frame, the GOP typically being defined by the I-frame frequency. For maximum coding efficiency, a GOP is a scene, for example, GOP boundaries are aligned with scene boundaries and scene change frames are coded as I-frames. In low motion sequences comprise a relatively static background and motion is generally restricted to the foreground object. Examples of content of such low motion sequences include news and weather forecasts programs where more than 30% of most viewed content is of this nature. In low motion sequences, most of the regions are inter-coded and the predicted frames refer back to the I-frame through intermediate predicted frames.

Figure 22:
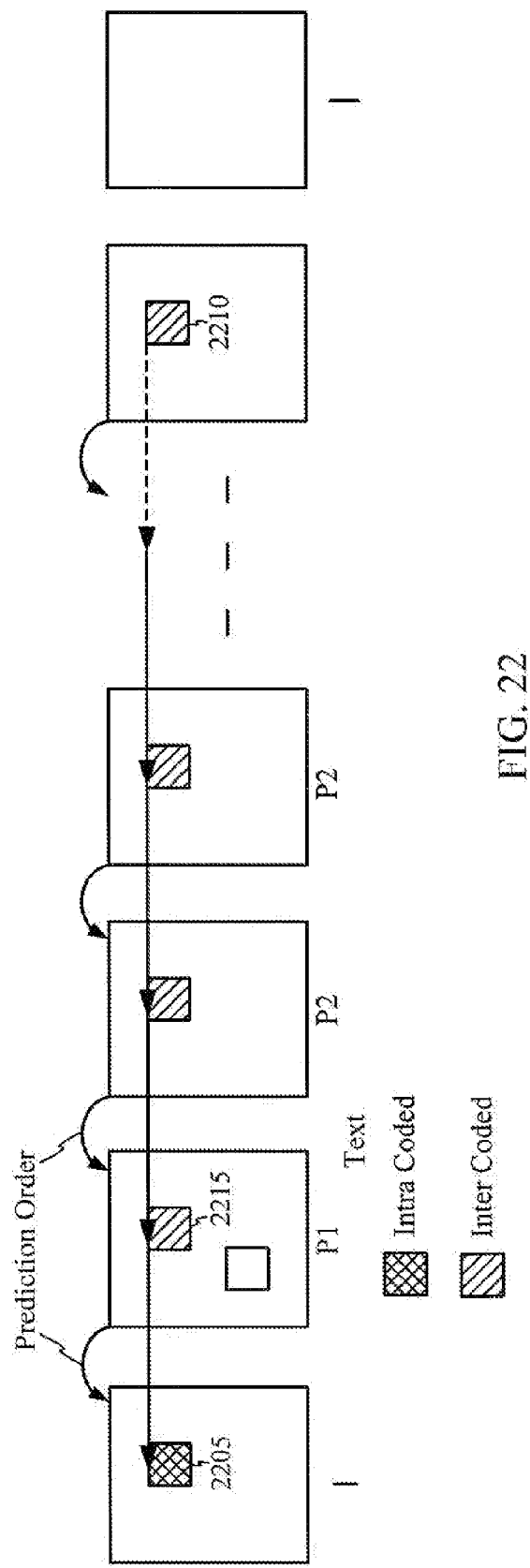
FIG. 22 is a block diagram illustrating prediction hierarchy.

Referring to FIG. 22, the intra-coded block 2205 in the I-frame is the predictor for the inter-coded block 2210 in coded frame (or AU) P1. In this example, the region of these blocks is a stationary part of the background. Through consecutive temporal prediction, the sensitivity of the intra-coded block 2205 to errors goes up since it is a "good" predictor which also implies that its "importance" is higher. Additionally, the intra-coded block 2205, by virtue of this chain of temporal prediction called the prediction chain, persists longer in the display (for the duration of the scene in the example in the figure).

Prediction hierarchy is defined as the tree of blocks created based on this importance level or measure of persistence with the parent at the top (intra coded block 2205) and the children at the bottom. Note that the inter coded block 2215 in P1 is on the second level of the hierarchy and so on. Leaves are blocks that terminate a prediction chain.

Prediction hierarchy can be created for video sequences irrespective of content type (such as music and sports as well and not just news) and is applicable to prediction based video (and data) compression in general (this applies to all the inventions described in this application). Once the prediction hierarchy is established, error resilience algorithms such as adaptive intra refresh, described below, can be applied more effectively. The importance measure can be based on recoverability of a given block from errors such as through concealment operations and applying adaptive intra refresh to enhance resilience of the coded bitstream to errors. An estimate of the importance measure can be based on number of times a block is used as a predictor also referred to as the persistence metric. The persistence metric is also used to improve coding efficiency by arresting prediction error propagation. The persistence metric also increases bit allocation for the blocks with higher importance.

Adaptive Intra Refresh

Adaptive intra refresh is an error resilience technique that can be based on content information of the multimedia data. In an intra refresh process, some MBs are intra- coded even though standard R-D optimization would dictate that they should be inter-coded MBs. AIR employs motion-weighted intra refresh to introduce intra-coded MBs in P or B-frames. These intra-coded MBs, contained in the base layer, can be encoded with either $QP_b$ or $QP_e$. If $QP_e$, is used for the base layer, then no refinement should be done at the enhancement layer. If $QP_b$, is used for the base layer, then refinement may be appropriate, otherwise at the enhancement layer, the drop of quality will be noticeable. Since inter-coding is more efficient than intra-coding in the sense of coding efficiency, these refinements at the enhancement layer will be inter-coded. This way, the base layer coefficients will not be used for the enhancement layer, and the quality is improved at the enhancement layer without introducing new operations.

In some aspects, adaptive intra refresh can be based on content information of the multimedia data (e.g., a content classification) instead of, or in addition to, a motion weighted basis. For example, if the content classification is relatively high (e.g., scenes having high spatial and temporal complexity) adaptive intra refresh can introduce relatively more intra-coded MB's into P or B-frames. Alternatively, if the content classification was relatively low (indicating a less dynamic scene with low spatial and/or temporal complexity) Adaptive intra refresh can introduce fewer intra coded MB's in the P and B-frames. Such metrics and methods for improving error resiliency can be applied not just in the context of wireless multimedia communications but towards data compression and multimedia processing in general (e.g., in graphics rendering).

Channel Switch Frame

A channel switch frame (CSF) as defined herein is a broad term describing a random access frame inserted at an appropriate location in a broadcast stream for fast channel acquisition and thus fast channel change between streams in a broadcast multiplex. Channel switch frames also increase error robustness, as they provide redundant data that can be used if the primary frame is transmitted with an error. An I-frame or a progressive I-frame such as the progressive decoder refresh frame in H.264 is typically serves as a random access point. However, frequent I-frames (or short GOPs, shorter than scene durations) results in a significant reduction in compression efficiency. Since intra-coded block may be needed for error resilience, random access and error resilience can be effectively combined through prediction hierarchy to improve coding efficiency while increasing robustness to errors.

Improvement of random access switching and error robustness can be achieved in concert, and can be based on content information such as a content classification. For low motion sequences, prediction chains are long and a significant portion of the information required to reconstruct a superframe or scene is contained in the I-frame that occurred at the start of the scene. Channel errors tend to be bursty and when a fade strikes and FEC and channel coding fail, there is heavy residual error that concealment fails. This is particularly severe for low motion (and hence low bit rate) sequences since the amount of coded data is not significant enough to provide good time diversity within the video bitstream and because these are highly compressible sequences that renders every bit useful for reconstruction. High motion sequences are more robust to errors due to the nature of content—more new information in every frame increases the number of coded intra blocks which are independently decodable and more resilient to error inherently. Adaptive intra refresh based on prediction hierarchy achieves a high performance for high motion sequences and performance improvement is not significant for low motion sequences. Hence, a channel switch frame containing most of the I-frame is a good source of diversity for low motion sequences. When an error strikes a superframe, decoding in the consecutive frame starts from the CSF which recovers the lost information due to prediction and error resilience is achieved.

In the case of high motion sequences such as sequences having a relatively high content classification (e.g., 6-8), the CSF can consists of blocks that persist in the SF—those that are good predictors. All other regions of the CSF do not have to be coded since these are blocks that have short prediction chains which implies that they are terminated with intra blocks. Hence, CSF still serves to recover from lost information due to prediction when an error occurs. CSFs for low motion sequences are on par with the size of I-frames, and they can be coded at a lower bit rate through heavier quantization, where CSFs for high motion sequences are much smaller than the corresponding I-frames.

Error resilience based on prediction hierarchy can work well with scalability and can achieve a highly efficient layered coding. Scalability to support hierarchical modulation in physical layer technologies may require data partitioning of the video bitstream with specific bandwidth ratios. These may not always be the ideal ratios for optimal scalability (for example, with the least overhead). In some aspects, a 2-layer scalability with 1:1 bandwidth ratio is used. Partitioning video bitstream to 2-layers of equal size may not be as efficient for low motion sequences. For low motion sequences, the base layer containing all header and metadata information is larger than the enhancement layer. However, since CSFs for low motion sequences are larger, they fit nicely in the remaining bandwidth in the enhancement layer.

High motion sequences have sufficient residual information that data partitioning to 1:1 can be achieved with the least overhead. Additionally, a channel switch frame for such sequences are much smaller for high motion sequences. Hence, error resilience based on prediction hierarchy can work well with scalability for high motion sequences as well. Extending the concepts discussed above for moderate motion clips is possible based on the descriptions of these algorithms, and the proposed concepts apply for video coding in general.

Multiplexer

In some encoder aspects, a multiplexer can be used for encoding multiple multimedia streams produced by the encoder and used to prepare encoded bits for broadcast. For example, in the illustrative aspect of encoder 228 shown I FIG. 2, the synch layer 240 comprises a multiplexer. The multiplexer may be implemented to provide the bit rate allocation control. The estimated complexity can be provided to the multiplexer, which can then allocate the available bandwidth for a collection of multiplexed video channels according to the encoding complexity anticipated for those video channels, which then permits the quality of a particular channel to remain relatively constant even if the bandwidth for the collection of multiplexed video streams is relatively constant. This provides a channel within a collection of channels to have a variable bit rate and relatively constant visual quality, rather than a relatively constant bit rate and a variable visual quality.

Figure 18:
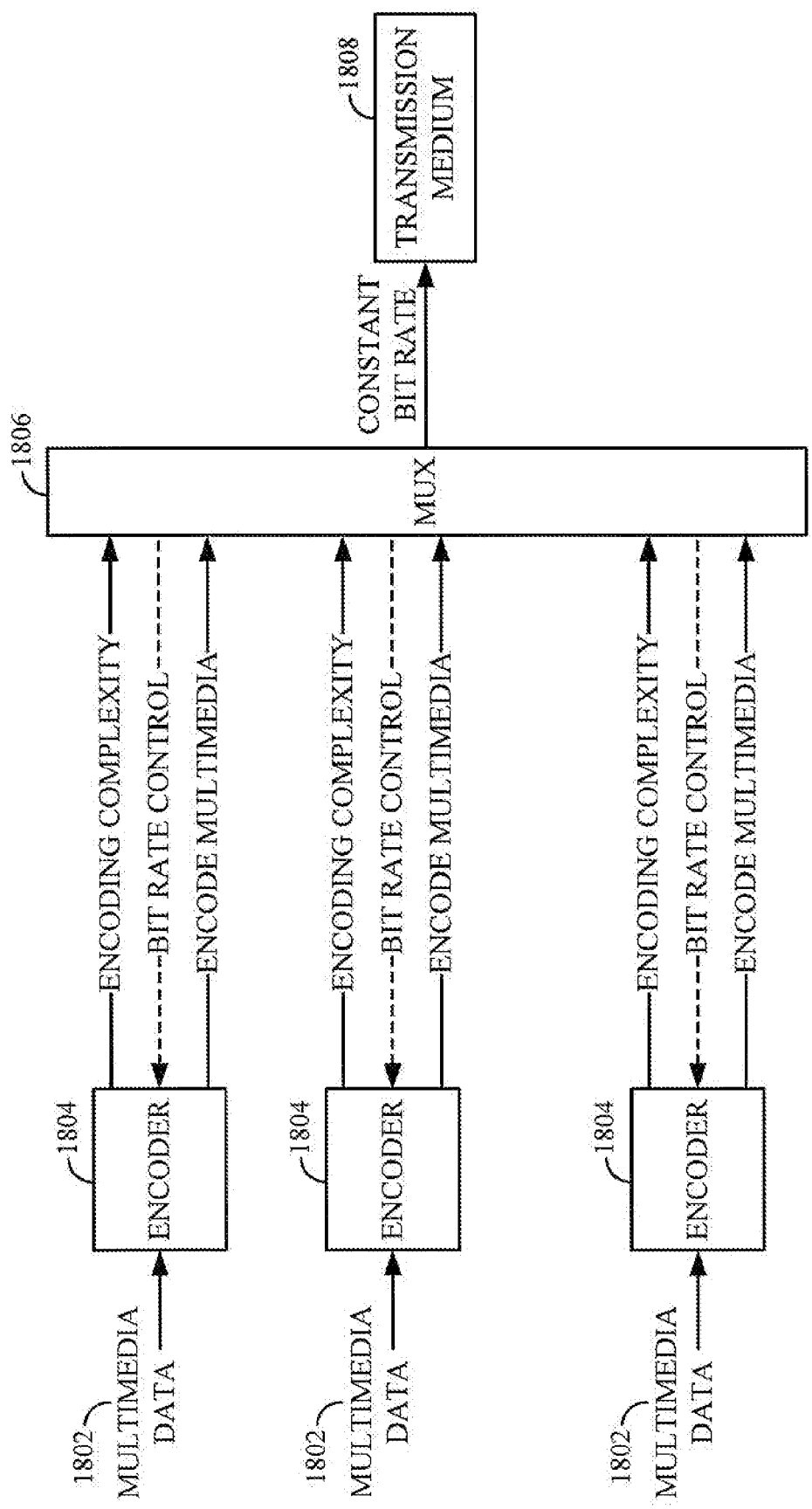
FIG. 18 is a diagram illustrating a deinterlacing process using motion estimation/compensation.

FIG. 18 is a block diagram illustrating a system of encoding multiple multimedia streams or channels 1802. The multimedia streams 1802 are encoded by respective encoders 1804, which are in communication when a multiplexer (MUX) 1806, which in turn is in communication with a transmission medium 1808. For example, the multimedia streams 1802 can correspond to various content channels, such as news channels, sports channels, movie channels, and the like. The encoders 1804 encode the multimedia streams 1802 to the encoding format specified for the system. While described in the context of encoding of video streams, the principles and advantages of the disclosed techniques are generally applicable to multimedia streams including, for example, audio streams. The encoded multimedia streams are provided to a multiplexer 1806, which combines the various encoded multimedia streams and sends the combined stream to the transmission medium 1808 for transmission.

The transmission medium 1808 can correspond to a variety of mediums, such as, but not limited to, digital satellite communication, such as DirecTV®, digital cable, wired and wireless Internet communications, optical networks, cell phone networks, and the like. The transmission medium 1808 can include, for example, modulation to radio frequency (RF). Typically, due to spectral constraints and the like, the transmission medium has a limited bandwidth and the data from the multiplexer 1806 to the transmission medium is maintained at a relatively constant bit rate (CBR).

In conventional systems, the use of constant bit rate (CBR) at the output of the multiplexer 1806 may require that the encoded multimedia or video streams that are inputted to the multiplexer 1806 are also CBR. As described in the background, the use of CBR when encoding video content can result in a variable visual quality, which is typically undesirable.

In the illustrated system, two or more of the encoders 1804 communicate an anticipated encoding complexity of input data. One or more of the encoders 1804 may receive adapted bit rate control from the multiplexer 1806 in response. This permits an encoder 1804 that expects to encode relatively complex video to receive a higher bit rate or higher bandwidth (more bits per frame) for those frames of video in a quasi-variable bit rate manner. This permits the multimedia stream 1802 to be encoded with a consistent visual quality. The extra bandwidth that is used by a particular encoder 1804 encoding relatively complex video comes from the bits that would otherwise have been used for encoding other video streams 1804 if the encoders were implemented to operate at constant bit rates. This maintains the output of the multiplexer 1806 at the constant bit rate (CBR).

While an individual multimedia stream 1802 can be relatively "bursty," that is, vary in used bandwidth, the cumulative sum of multiple video streams can be less bursty. The bit rate from channels that are encoding less complex video that can be reallocated by, for example, the multiplexer 1806, to channels that are encoding relatively complex video, and this can enhance the visual quality of the combined video streams as whole.

The encoders 1804 provide the multiplexer 1806 with an indication of the complexity of a set of video frames to be encoded and multiplexed together. The output of the multiplexer 1806 should provide an output that is no higher than the bit rate specified for the transmission medium 1808. The indications of the complexity can be based on the content classification as discussed above to provide a selected level of quality. The multiplexer 1006 analyzes the indications of complexity, and provides the various encoders 1004 with an allocated number of bits or bandwidth, and the encoders 1804 use this information to encode the video frames in the set. This permits a set of video frames to individually be variable bit rate, and yet achieve constant bit rate as a group.

Content Classification can also be used in enabling quality based compression of multimedia in general for any generic compressor. Content Classification and the methods and apparatuses described here may be used in quality based and/or content based multimedia processing of any multimedia data. One example is its use in compression of multimedia in general for any generic compressor. Another example is in decompression or decoding in any decompressor or decoder or post-processor such as interpolation, resampling, enhancement, restoration and presentation operations.

Figure 19:
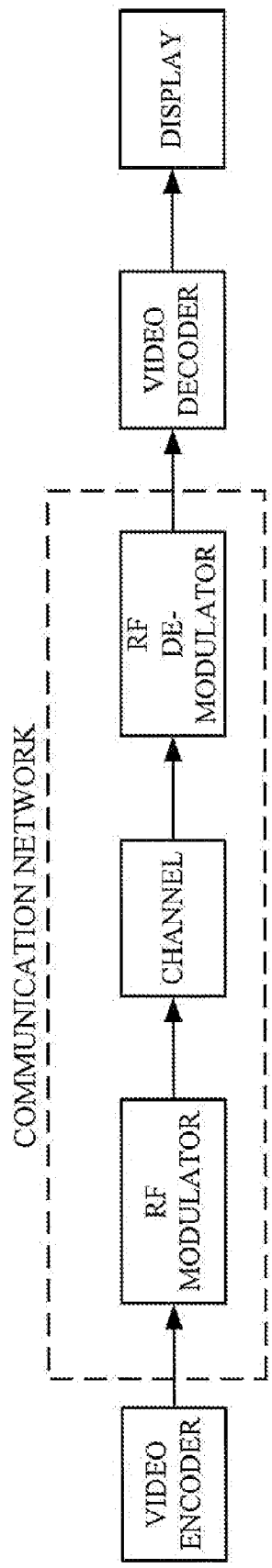
FIG. 19 is a block diagram of a multimedia communication system.

Referring now to FIG. 19, a typical video communication system includes a video compression system consisting of a video encoder and a video decoder connected by a communication network. Wireless networks are one class of error prone networks where the communication channel exhibits log-normal fading or shadowing and multi-path fading in mobile scenarios in addition to path loss. In order to combat channel errors and provide a reliable communications for application layer data, the RF modulator includes forward error correction including interleavers and channel coding such as convolutional or turbo coding.

Video compression reduces redundancy in the source video and increases the amount of information carried in each bit of the coded video data. This increases the impact in quality when even a small portion of the coded video is lost. Spatial and temporal prediction inherent in video compression systems aggravates the loss and causes errors to propagate resulting in visible artifacts in the reconstructed video. Error resilience algorithms at the video encoder and error recovery algorithms at the video decoder enhance the error robustness of the video compression system.

Typically, the video compression system is agnostic to the underlying network. However, in error prone networks, integrating or aligning error protection algorithms in the application layer with FEC and channel coding in the link/physical layers is highly desirable and provides the most efficiency in enhancing error performance of the system.

Figure 14:
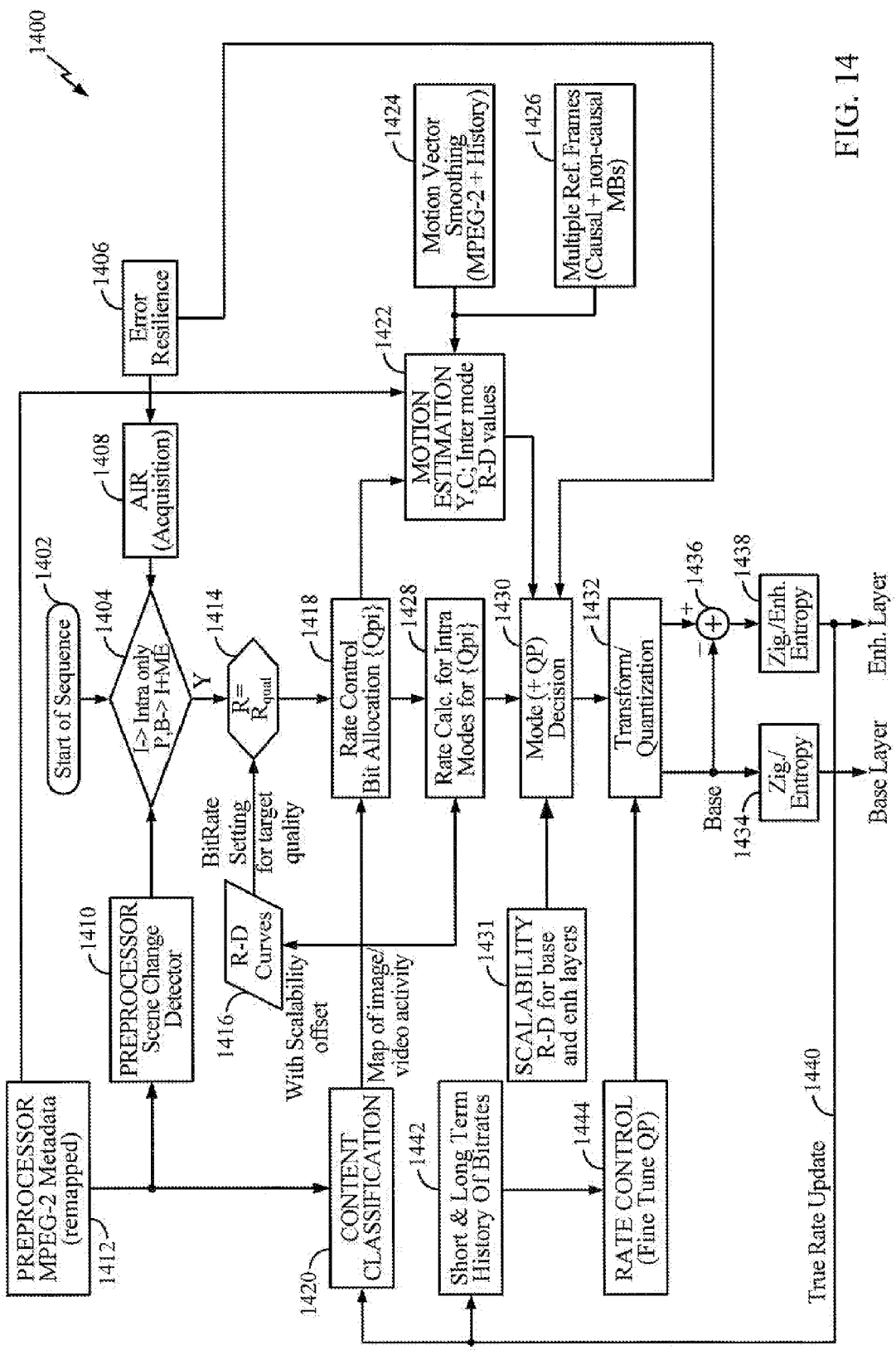
FIG. 14 is a flow diagram illustrating an exemplary operation effecting rate-distortion data flow as occurs in the encoder FIG. 7, for example.

FIG. 14 illustrates one example of a rate-distortion data flow that can occur in the encoder 228 to encode frames. Process 1400 begins at start 1402, and proceeds to decision block 1404, where it receives scene change detector input 1410 from the preprocessor 226 (e.g., via metadata) and error resilience input 1406 is acquired. If the information indicates a selected frame is an I frame, the process intra-encodes the frame. If the information indicates the selected frame is a P or B frame, the process uses intra-coding and motion estimation (inter) coding to encode the frame.

After an affirmative condition occurs for the conditions of block 1404, process 1400 proceeds to a preparation block 1414 where the rate R is set to value R=Rqual, the desired target quality based on R-D curves. This setting is received from a data block 1416 comprising R-D curves. Process 1400 then proceeds from to block 1418 where Rate Control Bit Allocation {Qpi} is performed based on image/video activity information (e.g., a content classification) from a content classification process at block1420.

The rate control bit allocation block 1418 is used, in turn, for motion estimation in block 1422. The motion estimation 1422 can also receive input of metadata from the preprocessor 1412, motion vector smoothing (MPEG-2+History) from block 1424 and multiple reference frames (causal+non-causal macroblock MBS) from block 1426. Process 1400 then proceeds to block 1428 where rate calculations for intra-coded modes are determined for the rate control bit allocation (Qpi). Process 1400 next proceeds to block 1430 where mode and quantization parameters are determined. The mode decision of block 1430 is made based on the motion estimation of block 1422 input, error resilience 1406 input, and scalability R-D, which is determined at block 1431. Once the mode is decided, flow proceeds to block 1432. It is noted that the flow from block 1430 to 1432 occurs when data is passed from the first pass to the second pass portions of the encoder.

At block 1432, transform and quantization is performed by the second pass of the encoder 228. The transform/quantization process is adjusted or fine tuned as indicated with block 1444. This transform/quantization process may be influenced by a rate control fine tuning module (FIG. 7). Process 1400 then proceeds to block 1434 for zigzag sorting and entropy coding to yield the encoded base layer. Zigzag sorting prepares the quantized data in an efficient format for encoding. Entropy coding is a compression technique that uses a series of bit codes to represent a set of possible symbols. The enhanced layer result of transform/quantization block 1432 is also sent to an adder 1436, which subtracts the base layer and sends the result to a ZZ/entropy coder 1438 for the enhanced layer, as previously described in reference to FIGS. 31-36. Of further note, the enhanced layer is fed back (see line 1440 true rate update) for updating the content classification 1420 of true rate and an operation for determining long and short term histories of bit rates for used by the rate control.

Figure 17A:
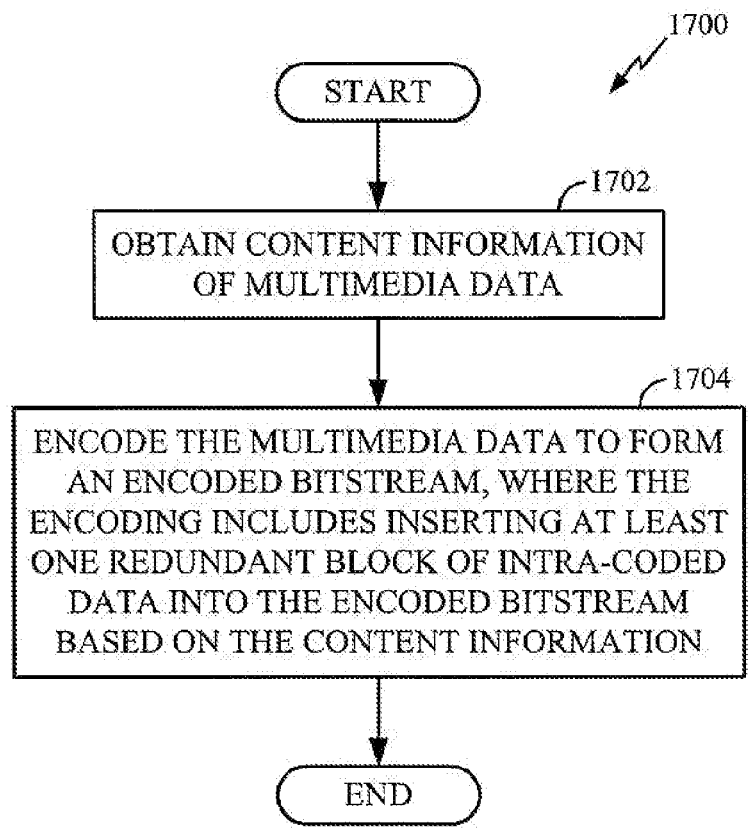
FIG. 17A is a flow diagram of a process for encoding multimedia data so as to insert redundant data in the encoded data for error resilience, where the encoding is based on the content information.

FIG. 17A is a flow diagram of a process for encoding multimedia data so as to insert redundant data in the encoded data for error resilience, where the encoding is based on the content information. Process 1700 can be performed by the apparatus illustrated in FIG. 17B and other components disclosed herein, including transcoder 200. Process 1700 starts and at block 1702 it obtains content information of the multimedia data. This can be performed by the content classifier means, module for obtaining content information of multimedia data 1712 (FIG. 17B) or another component such as content classifier 712 in FIG. 7. Process 1700 then proceeds to block 1704 where it encodes the multimedia data form an encoded bitstream, wherein the encoding includes inserting at least one redundant block of intra-coded data into the encoded bitstream based on the content information. This can be performed by the encoding means, module for encoding the multimedia data 1714 (FIG. 17B), or in another example by the transcoder 200 (FIG. 7). Aligning the data boundary with the time boundary can result in error resilience. The content classification can be based on a complexity of the multimedia data, wherein the complexity comprises a spatial complexity and a temporal complexity. The amount of redundant data inserted can be inversely proportional to the complexity of the multimedia data. The intra-coded data can include at least one frame of redundant data, wherein the at least one frame of redundant data comprises an I-frame, or substantially all of an I-frame. The at least one redundant frame of intra-coded data can also include a channel switch frame.

Figure 17B:
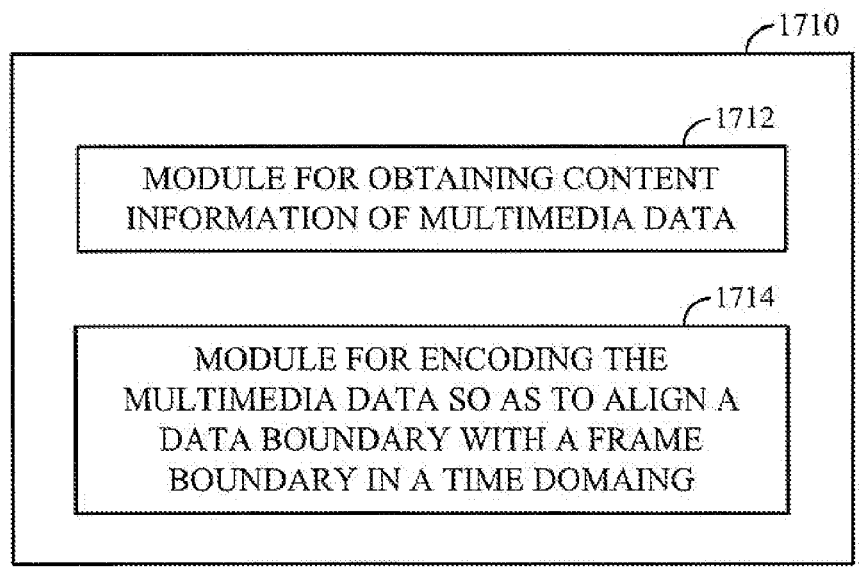
FIG. 17B is a block diagram of an encoding apparatus 1710 that can perform the process 1700 illustrated in FIG. 17A.

FIG. 17B is a block diagram of an encoding apparatus 1710 that can perform the process 1700 illustrated in FIG. 17A. Apparatus 1710 can include content classifying means such as the module for obtaining content information of multimedia data 1712. Examples of content classifying means are illustrated and described in reference to FIG. 7 (e.g., content classification module 714). In some aspects, the content classification means can be incorporated in a preprocessor, an encoder, or in a transcoder. The Apparatus 1710 also includes encoding means 1714, which is a module for encoding the multimedia data so as to align a data boundary with a frame boundary in the time domain, and that can perform the encoding described at block 1704 FIG. 17A. Such functionality can be included in an encoder or a transcoder. For example, transcoder 200 also includes encoding means that can perform the encoding described at block 1704 FIG. 17A.

Figure 23:
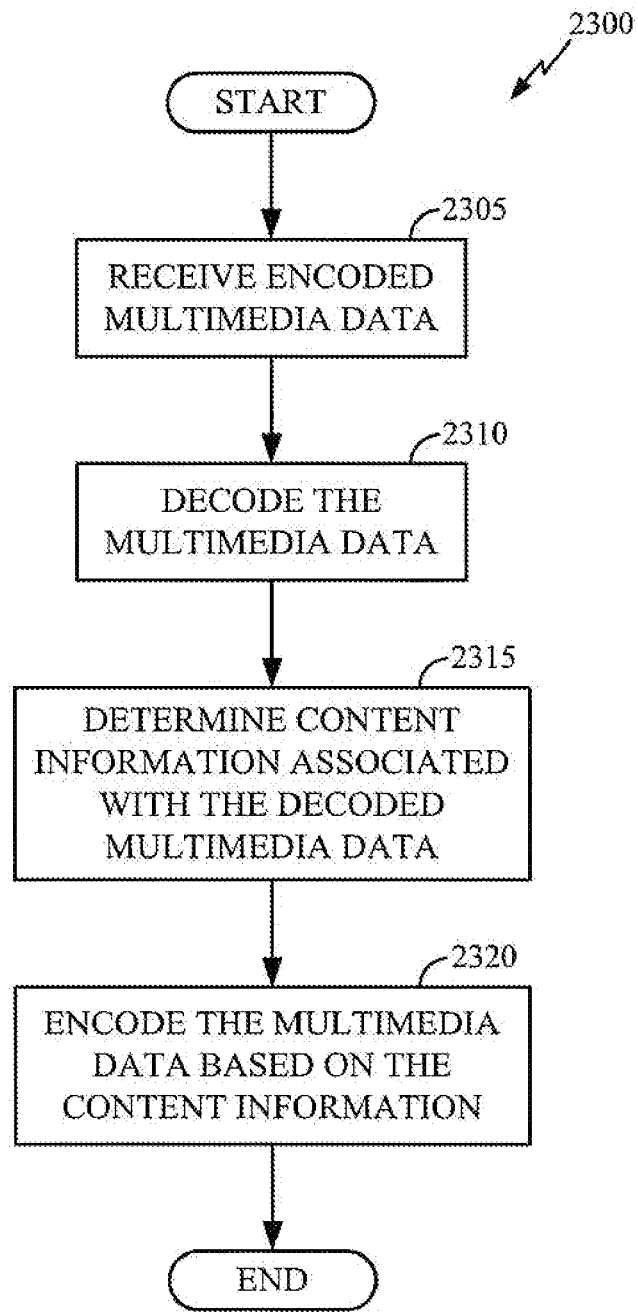
FIG. 23 is a flow diagram illustrating a method of encoding multimedia data based on the content information.

FIGS. 23, 24, 27 and 28 are process flow diagrams exemplifying methods of encoding multimedia data that embody the aspects described herein. FIG. 23 is a process flow diagram illustrating a process 2300 of encoding multimedia data based on the content information. At block 2305 process 2300 receives encoded multimedia data, and at block 2310 process 2300 decodes the multimedia data. At block 2315, process 2300 determines content information associated with the decoded multimedia data. At block 2320, process 2300 encodes the multimedia data based on the content information.

Figure 24:
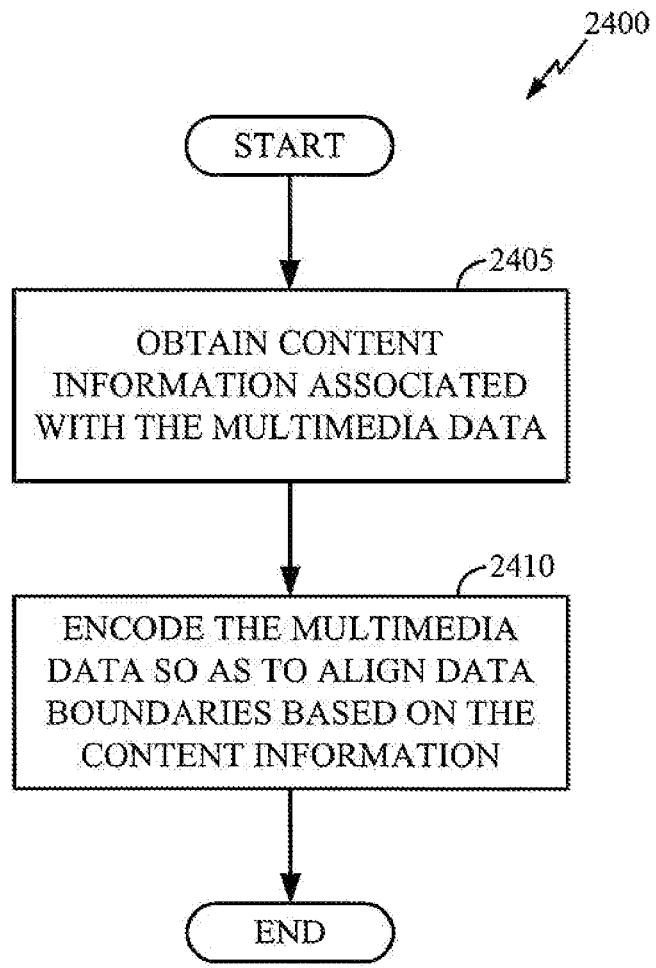
FIG. 24 is a flow diagram illustrating a method of encoding multimedia data so as to align data boundaries based on content information level.

FIG. 24 is a process flow diagram illustrating a process 2400 of encoding multimedia data so as to align data boundaries based on content information level. At block 2405, process 2400 obtains content information associated with the multimedia data, which can be done, for example, by the preprocessor 226 or the content classification module 712 shown in FIG. 7. At block 2410, process 2400 encodes the multimedia data so as to align data boundaries based on the content information. For example, slice boundaries and access unit boundaries are aligned with frame boundaries based on a content classification of the multimedia data being encoded. The encoded data is then available for subsequent processing and/or transmission to a mobile device, and process 2400 ends.

Figure 27:
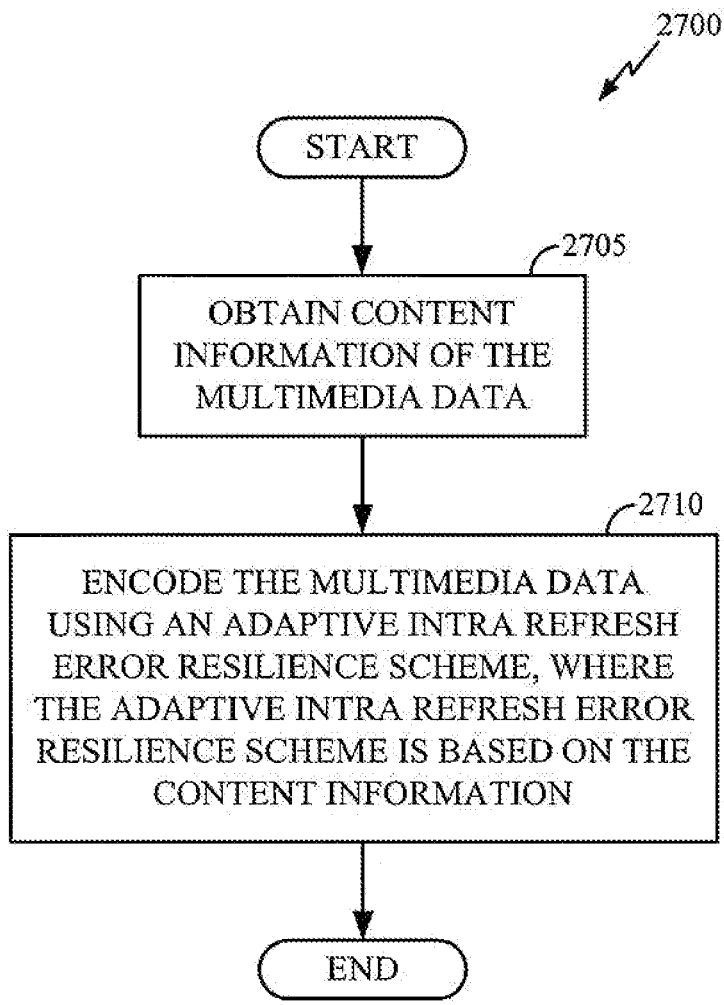
FIG. 27 is a flow diagram illustrating a process of encoding multimedia data using adaptive intra refresh based on multimedia content information.

FIG. 27 is a process flow diagram illustrating a process 2700 for encoding data using an adaptive intra refresh scheme based on content information. When process 2700 starts the multimedia data has been obtained. At block 2705, process 2700 obtains content information of the multimedia data. Obtaining the content information can be performed by, for example, preprocessor 226 or content classification module 712 as described above. Process 2700 proceeds to block 2710, where it encodes the multimedia data using an adaptive intra refresh error resilience scheme, where the adaptive intra refresh error resilience scheme is based on the content information. The functionality of block 2710 can be performed by the encoder 228. The encoded data is made available for subsequent processing and transmission, and process 2700 then ends.

Figure 28:
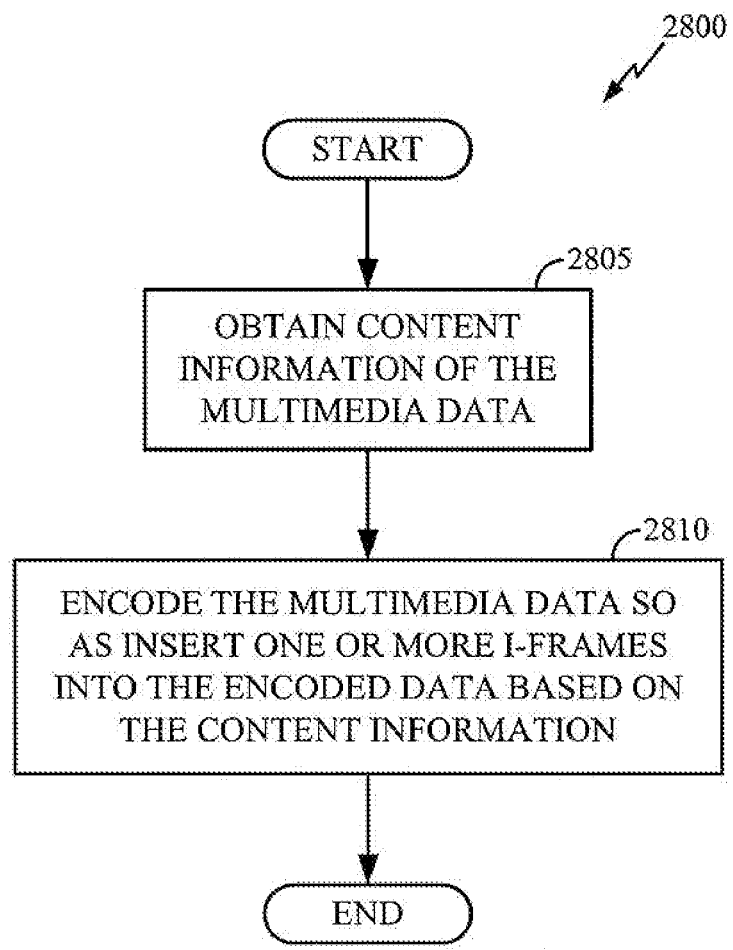
FIG. 28 is a flow diagram illustrating a process of encoding multimedia data using redundant I frames based on multimedia content information.

FIG. 28 is a process flow diagram illustrating a process of encoding multimedia data using redundant I frames based on multimedia content information. When process 2800 starts the multimedia data is available for processing. At block 2805, the process 2800 obtains content information of the multimedia data. As described above, this can be done by, for example, the preprocessor 226 and/or the encoder 228. At block 2810, process 2800 encodes the multimedia data so as to insert one or more additional I-frames into the encoded data based on the content information. This can be done by the encoder 228 as described above in connection with an error resiliency scheme, inserting the I-frames into the base layer or the enhancement layer depending on the error resiliency scheme employed. After block 2810, the encoded data is available for subsequent processing and/r transmission to a mobile device.

It should be noted that the methods described herein may be implemented on a variety of communication hardware, processors and systems known by one of ordinary skill in the art. For example, the general requirement for the client to operate as described herein is that the client has a display to display content and information, a processor to control the operation of the client and a memory for storing data and programs related to the operation of the client. In one aspect, the client is a cellular phone. In another aspect, the client is a handheld computer having communications capabilities. In yet another aspect, the client is a personal computer having communications capabilities. In addition, hardware such as a GPS receiver may be incorporated in the client to implement the various aspects. The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The disclosed methods and apparatus provide transcoding of video data encoded in one format to video data encoded to another format where the encoding is based on the content of the video data and the encoding is resilient to error. The methods or algorithms described in connection with the examples disclosed herein may be embodied directly in hardware, in a software module executed by a processor, firmware, or in a combination of two or more of these. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples. Accordingly, the novel aspects described herein is to be defined solely by the scope of the following claims.

The invention claimed is:

1. A method of processing multimedia data, comprising:
obtaining content information of multimedia data by a transcoder of a computing device; and
encoding the multimedia data to form an encoded bitstream, by the transcoder of the computing device, said encoding comprising inserting at least one redundant block of intra-coded data into the encoded bitstream based on the content information, wherein the intra-coded data comprises at least one frame of redundant data, wherein the at least one frame of redundant data comprises a channel switch frame.

2. The method of claim 1, wherein the content information comprises a content classification.

3. The method of claim 2, wherein the content classification is based on a complexity of the multimedia data.

4. The method of claim 3, wherein the complexity comprises a spatial complexity and a temporal complexity.

5. The method of claim 3, wherein the amount of redundant data inserted is inversely proportionally to the complexity of the multimedia data.

6. The method of claim 1, wherein the at least one frame of redundant data comprises an I-frame.

7. The method of claim 1, wherein the at least one redundant block of intra-coded data comprises substantially all of an I-frame.

8. The method of claim 1, wherein the encoding comprises encoding the multimedia data into a base layer and an enhancement layer, and wherein the intra-coded data is encoded using a quantization parameter for the base layer.

9. The method of claim 1, wherein the encoding comprises encoding the multimedia data into a base layer and an enhancement layer, and wherein the intra-coded data is encoded using a quantization parameter for the enhancement layer.

10. An apparatus for processing multimedia data comprising:
a content classifier of a computing device configured to obtain content information of multimedia data; and
an encoder of the computing device configured to encode the multimedia data to form an encoded bitstream, said encoding comprising inserting at least one redundant block of intra-coded data into the encoded bitstream based on the content information, wherein the intra-coded data comprises at least one frame of redundant data, wherein the at least one frame of redundant data comprises a channel switch frame.

11. An apparatus for processing multimedia data comprising:
means for obtaining content information of multimedia data; and
means for encoding the multimedia data to form an encoded bitstream, said encoding comprising inserting at least one redundant block of intra-coded data into the encoded bitstream based on the content information, wherein the intra-coded data comprises at least one frame of redundant data, wherein the at least one frame of redundant data comprises a channel switch frame.

12. The apparatus of claim 10, wherein the content information comprises a content classification.

13. The apparatus of claim 12, wherein the content classification is based on a complexity of the multimedia data.

14. The apparatus of claim 13, wherein the complexity comprises a spatial complexity and a temporal complexity.

15. The apparatus of claim 13, wherein the amount of redundant data inserted is inversely proportionally to a complexity of the multimedia data.

16. The apparatus of claim 10, wherein the at least one frame of redundant data comprises an I-frame.

17. The apparatus of claim 10, wherein the at least one redundant block of intra-coded data comprises substantially all of an I-frame.

18. The apparatus of claim 11, wherein the means for encoding comprises encoding the multimedia data into a base layer and an enhancement layer, and wherein the intra-coded data is encoded using a quantization parameter for the base layer.

19. The apparatus of claim 11, wherein the means for encoding comprises encoding the multimedia data into a base layer and an enhancement layer, and wherein the intra-coded data is encoded using a quantization parameter for the enhancement layer.

20. A processor configured to:
obtain content information of multimedia data; and
encode the multimedia data to form an encoded bitstream, said encoding comprising inserting at least one redundant block of intra-coded data into the encoded bitstream based on the content information, wherein the intra-coded data comprises at least one frame of redundant data, wherein the at least one frame of redundant data comprises a channel switch frame.

21. The processor of claim 20, wherein the content information comprises a content classification.

22. The processor of claim 21, wherein the content classification is based on a complexity of the multimedia data.

23. The processor of claim 22, wherein the complexity comprises a spatial complexity and a temporal complexity.

24. A non-transitory machine-readable medium comprising instructions that upon execution cause a machine to:
   obtain content information of multimedia data; and
   encode the multimedia data to form an encoded bitstream, said encoding comprising inserting at least one redundant block of intra-coded data into the encoded bitstream based on the content information, wherein the intra-coded data comprises at least one frame of redundant data, wherein the at least one frame of redundant data comprises a channel switch frame.

25. The non-transitory machine-readable medium of claim 24, wherein the content information comprises a content classification.

26. The non-transitory machine-readable medium of claim 25, wherein the content classification is based on a complexity of the multimedia data.

27. The non-transitory machine-readable medium of claim 26, wherein the complexity comprises a spatial complexity and a temporal complexity.

* * * * *